(12) United States Patent
Priddy

(10) Patent No.: US 11,655,883 B2
(45) Date of Patent: May 23, 2023

(54) AUTO-REVERSING DRIVESHAFT SYSTEM AND METHOD

(71) Applicant: Francis Wayne Priddy, Argyle, TX (US)

(72) Inventor: Francis Wayne Priddy, Argyle, TX (US)

( * ) Notice: Subject to any disclaimer, the term of this patent is extended or adjusted under 35 U.S.C. 154(b) by 371 days.

(21) Appl. No.: 17/167,249

(22) Filed: Feb. 4, 2021

(65) Prior Publication Data
US 2021/0156370 A1 May 27, 2021

Related U.S. Application Data

(60) Continuation-in-part of application No. 16/736,991, filed on Jan. 8, 2020, now Pat. No. 10,935,011, which is a continuation of application No. 15/955,936, filed on Apr. 18, 2018, now Pat. No. 10,570,894, which is a continuation of application No. 15/689,963, filed on Aug. 29, 2017, now Pat. No. 10,519,943, which is a division of application No. 14/339,189, filed on Jul. 23, 2014, now Pat. No. 9,765,768, which is a (Continued)

(51) Int. Cl.
| | |
|---|---|
| *F16H 25/12* | (2006.01) |
| *F04B 15/02* | (2006.01) |
| *F04B 7/00* | (2006.01) |
| *F04B 39/10* | (2006.01) |
| *F04B 9/04* | (2006.01) |

(52) U.S. Cl.
CPC ......... *F16H 25/122* (2013.01); *F04B 7/0026* (2013.01); *F04B 15/02* (2013.01); *F04B 15/023* (2013.01); *F04B 9/047* (2013.01); *F04B 39/1006* (2013.01); *Y10T 137/87804* (2015.04)

(58) Field of Classification Search
CPC .................................................... F16H 25/122
See application file for complete search history.

(56) References Cited

U.S. PATENT DOCUMENTS

| | | | | |
|---|---|---|---|---|
| 2,216,990 A | * | 10/1940 | Taylor, Jr. ............. | F16H 25/122 74/57 |
| 2,361,821 A | * | 10/1944 | Crowe .................. | F16H 25/122 74/57 |

(Continued)

*Primary Examiner* — Terence Boes
(74) *Attorney, Agent, or Firm* — Kevin Mark Klughart

(57) ABSTRACT

An auto-reversing driveshaft system/method configured to traverse in alternating longitudinal directions along a common driveshaft axis is disclosed. The system utilizes right-hand-thread (RHT) and left-hand-thread (LHT) channels along a target driveshaft (TDS) to engage dual drive pins (DDP) that are mechanically linked to an axial engagement collar (AEC) mechanically coupled to a motion driver platform (MDP). The AEC may be configured as a two-piece symmetric collar (TSC) in which the DDP are individually retained. The RHT and LHT are configured to implement a selected forward traverse rate (FTR) and reverse traverse rate (RTR) respectively for the DDP and AEC along the longitudinal axis of the TDS. The FTR and RTR may vary along the longitudinal axis of the TDS. The system and method are particularly applicable to the implementation of level winders, pumps, and/or situations where variable longitudinal traversal rates along the TDS are desired.

18 Claims, 96 Drawing Sheets

Related U.S. Application Data continuation-in-part of application No. 14/155,812, filed on Jan. 15, 2014, now Pat. No. 8,827,657.

(60) Provisional application No. 62/969,844, filed on Feb. 4, 2020, provisional application No. 61/933,929, filed on Jan. 31, 2014.

(56) References Cited

U.S. PATENT DOCUMENTS

| | | | | |
|---|---|---|---|---|
| 3,407,262 | A * | 10/1968 | Snyder, Jr. | B65H 54/2812 |
| | | | | 74/567 |
| 3,597,113 | A * | 8/1971 | Dumoulin | B01F 35/882 |
| | | | | 417/339 |
| 3,779,094 | A * | 12/1973 | La Barre | F16H 25/2261 |
| | | | | 74/25 |
| 3,952,604 | A * | 4/1976 | Baudler | F16H 25/122 |
| | | | | 74/57 |
| 4,023,421 | A * | 5/1977 | Berlier | F16H 25/122 |
| | | | | 74/57 |
| 4,031,765 | A * | 6/1977 | Metz | F16H 25/122 |
| | | | | 74/57 |
| 4,914,967 | A * | 4/1990 | Proulx | F16H 25/122 |
| | | | | 74/57 |
| 2019/0301501 | A1* | 10/2019 | Zhu | F16H 57/032 |

* cited by examiner

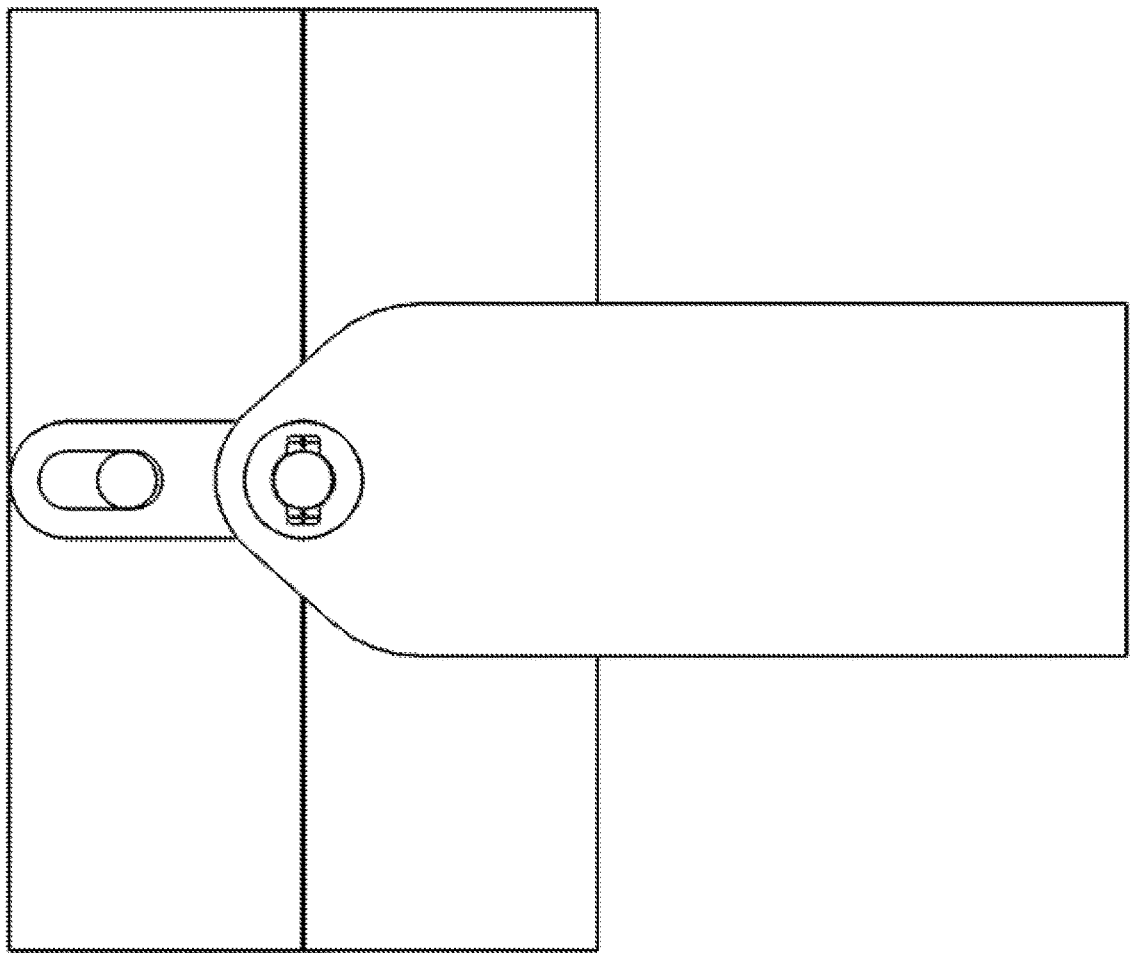
FIG. 19

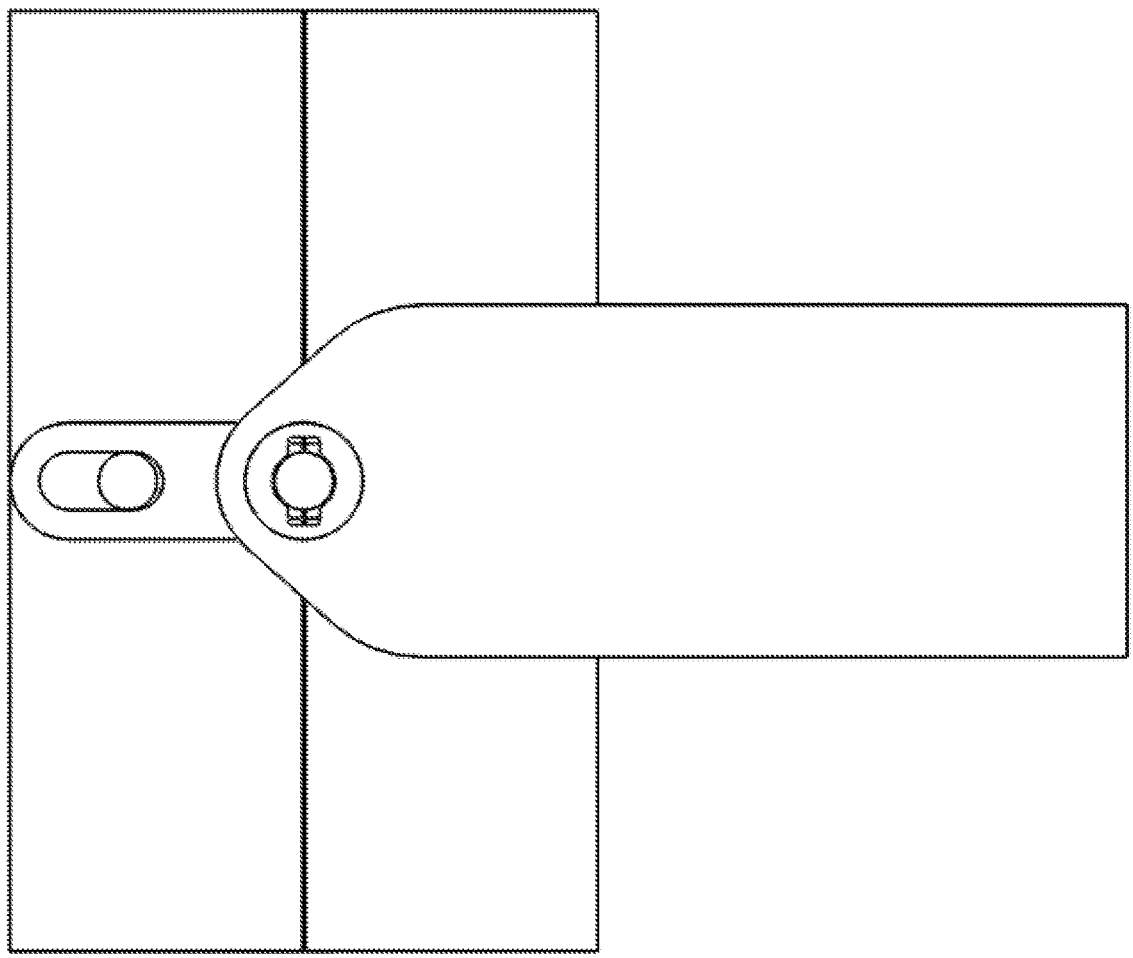
FIG. 20
2000

2300

2900

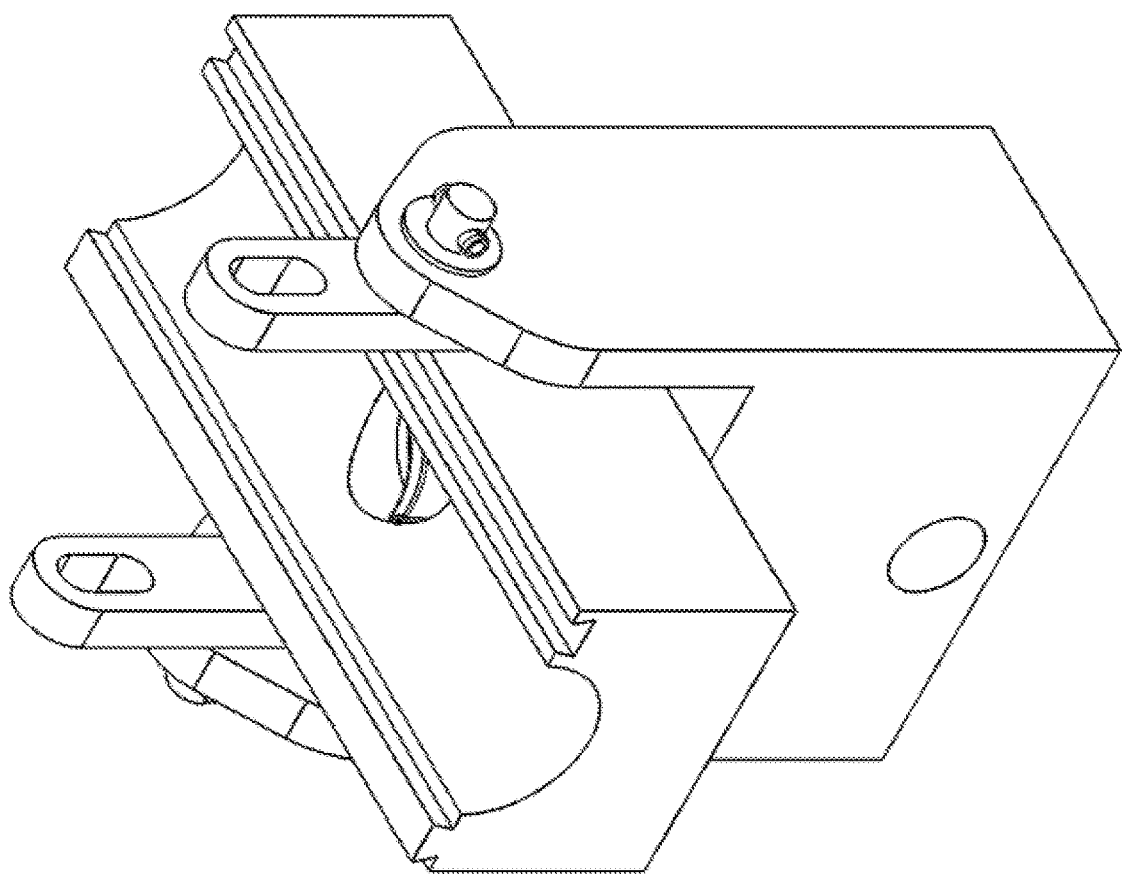
FIG. 31

3600

3700

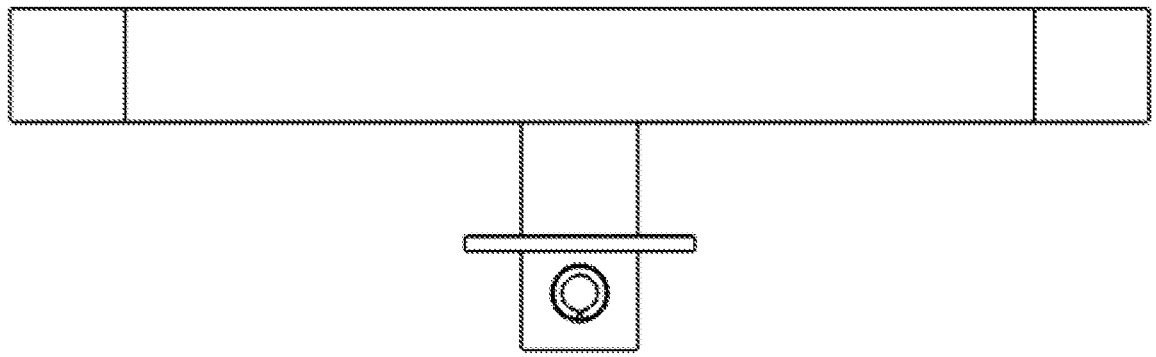
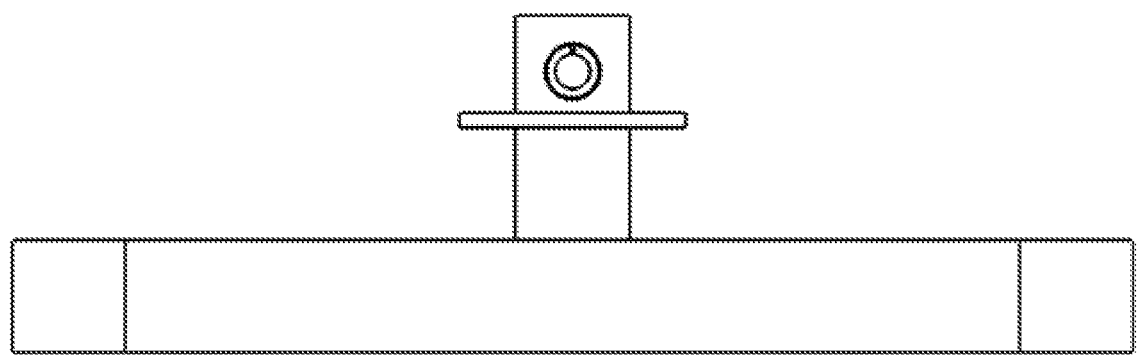
FIG. 49

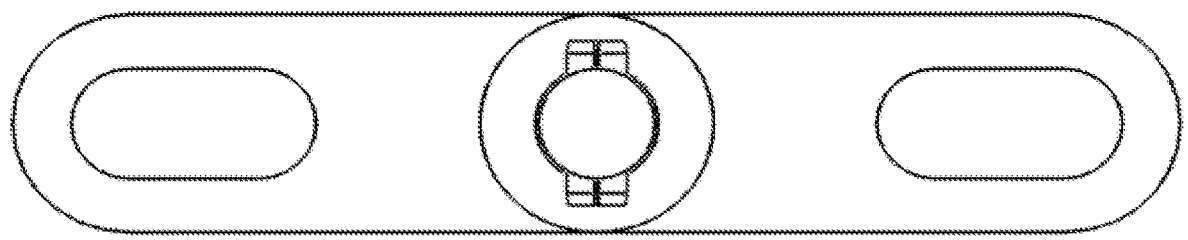
FIG. 50

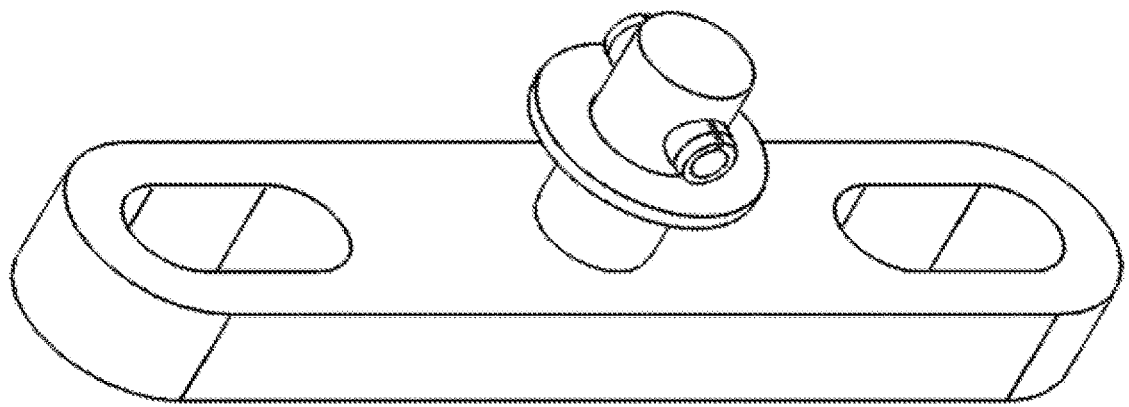
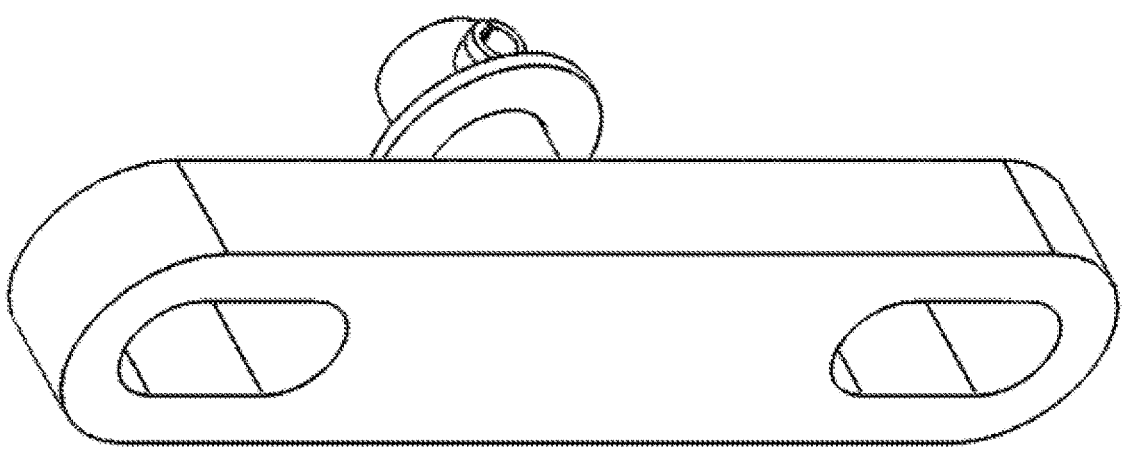
FIG. 52

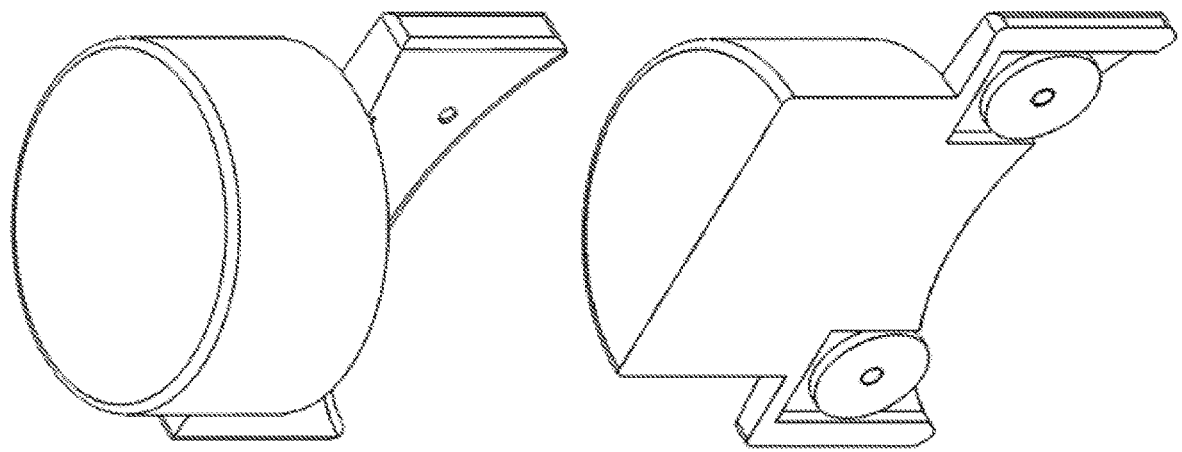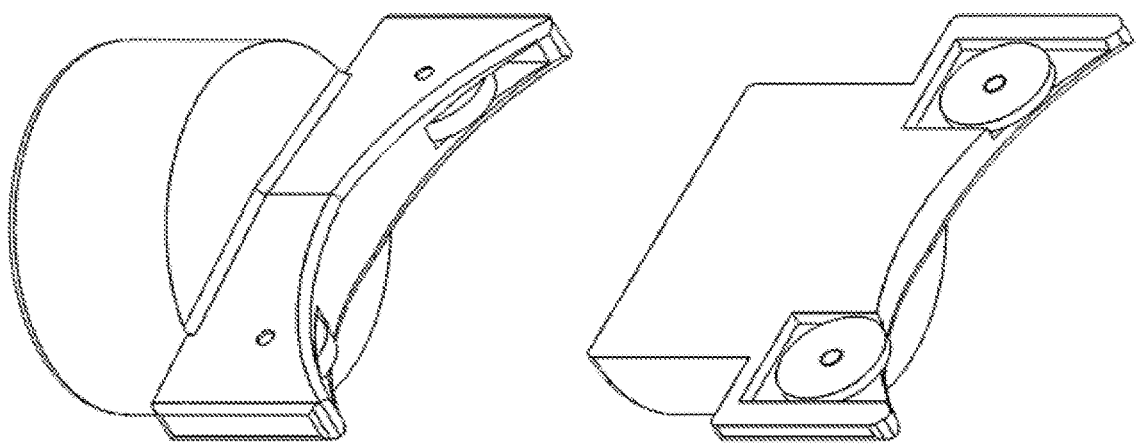
FIG. 56

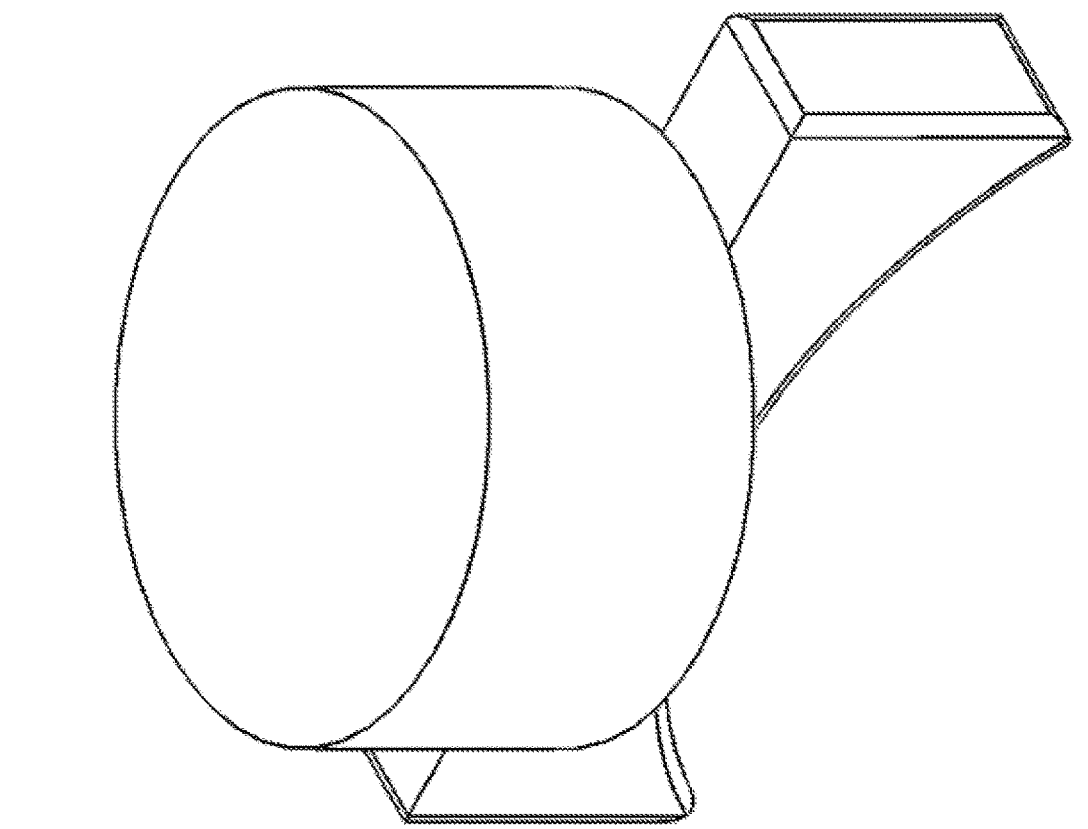
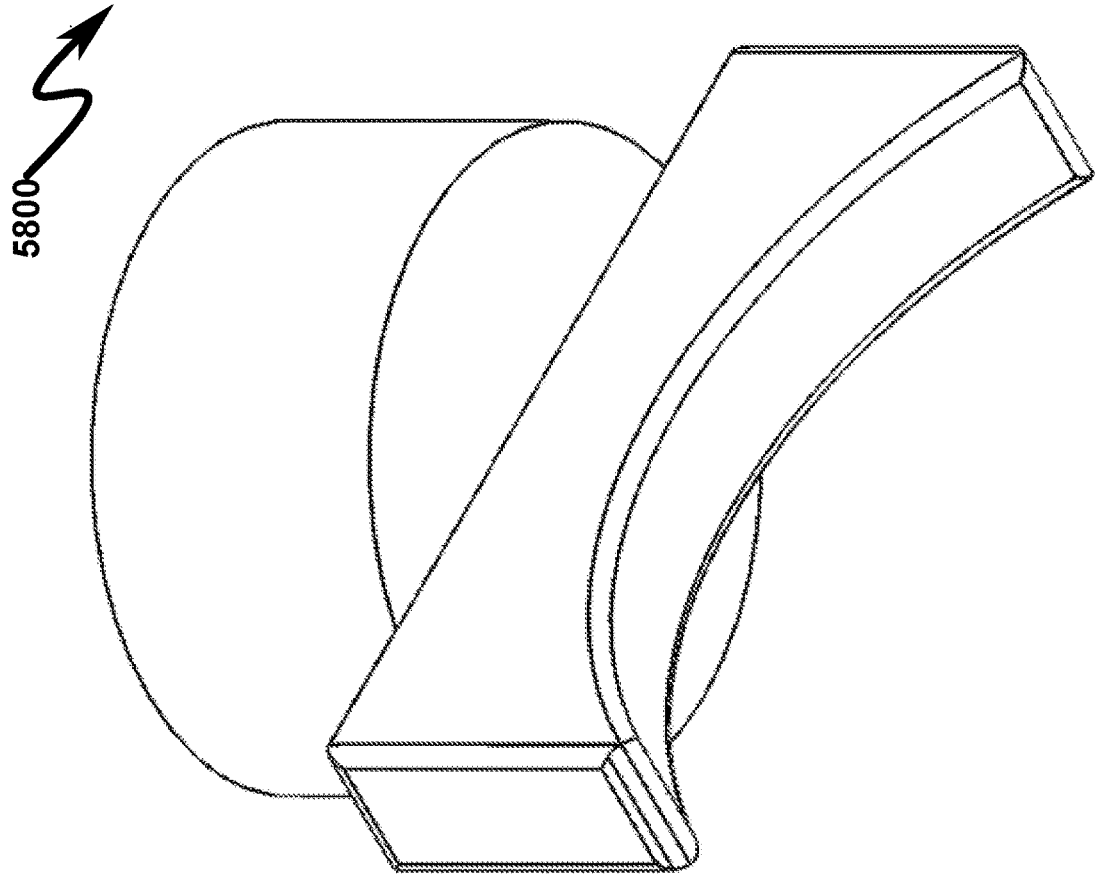
FIG. 58

8700

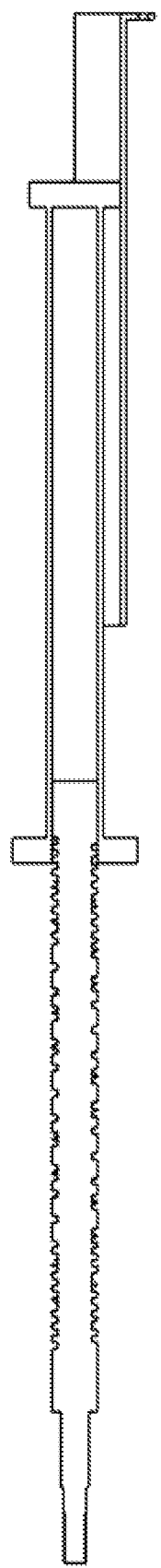
FIG. 90

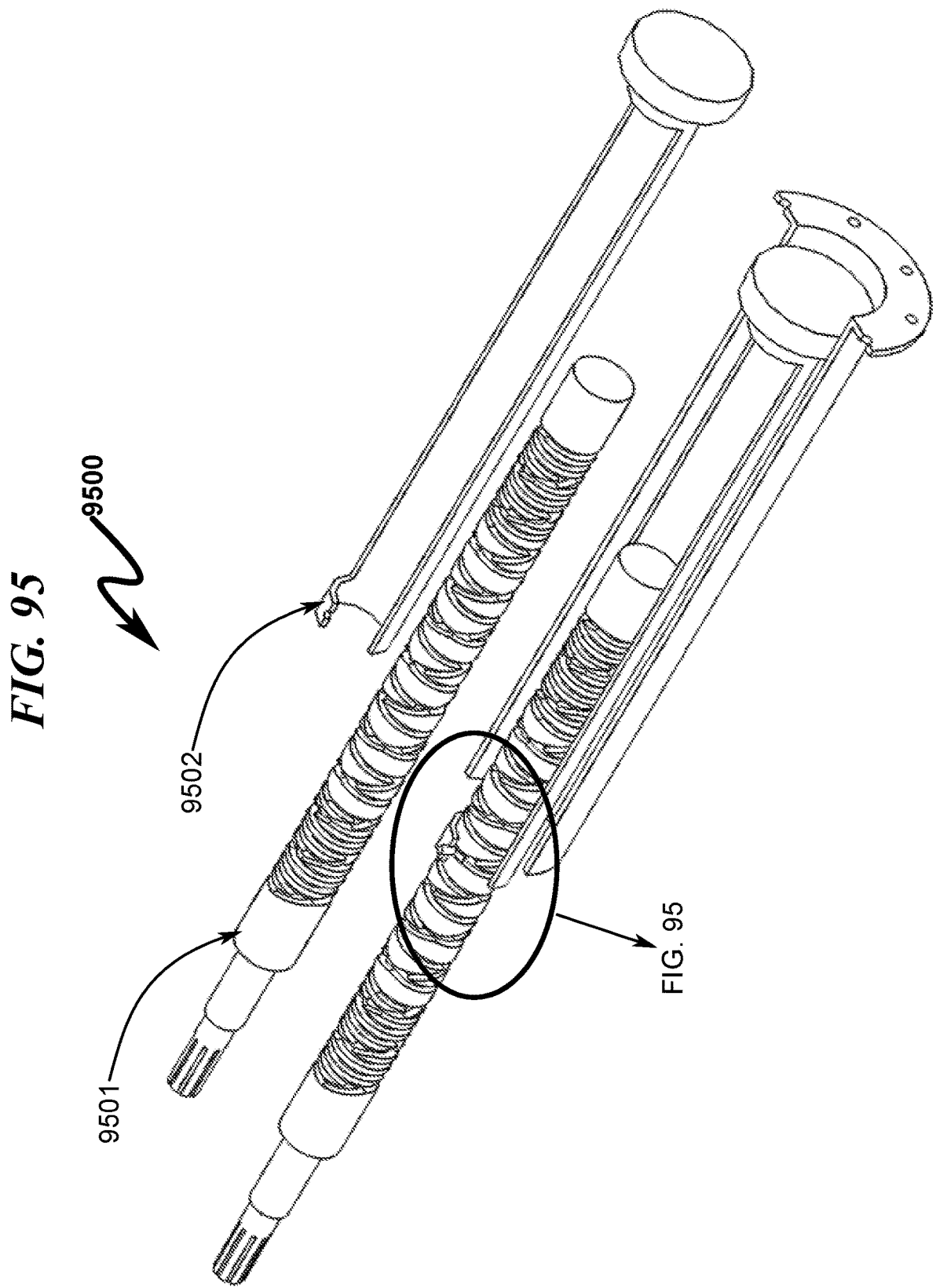

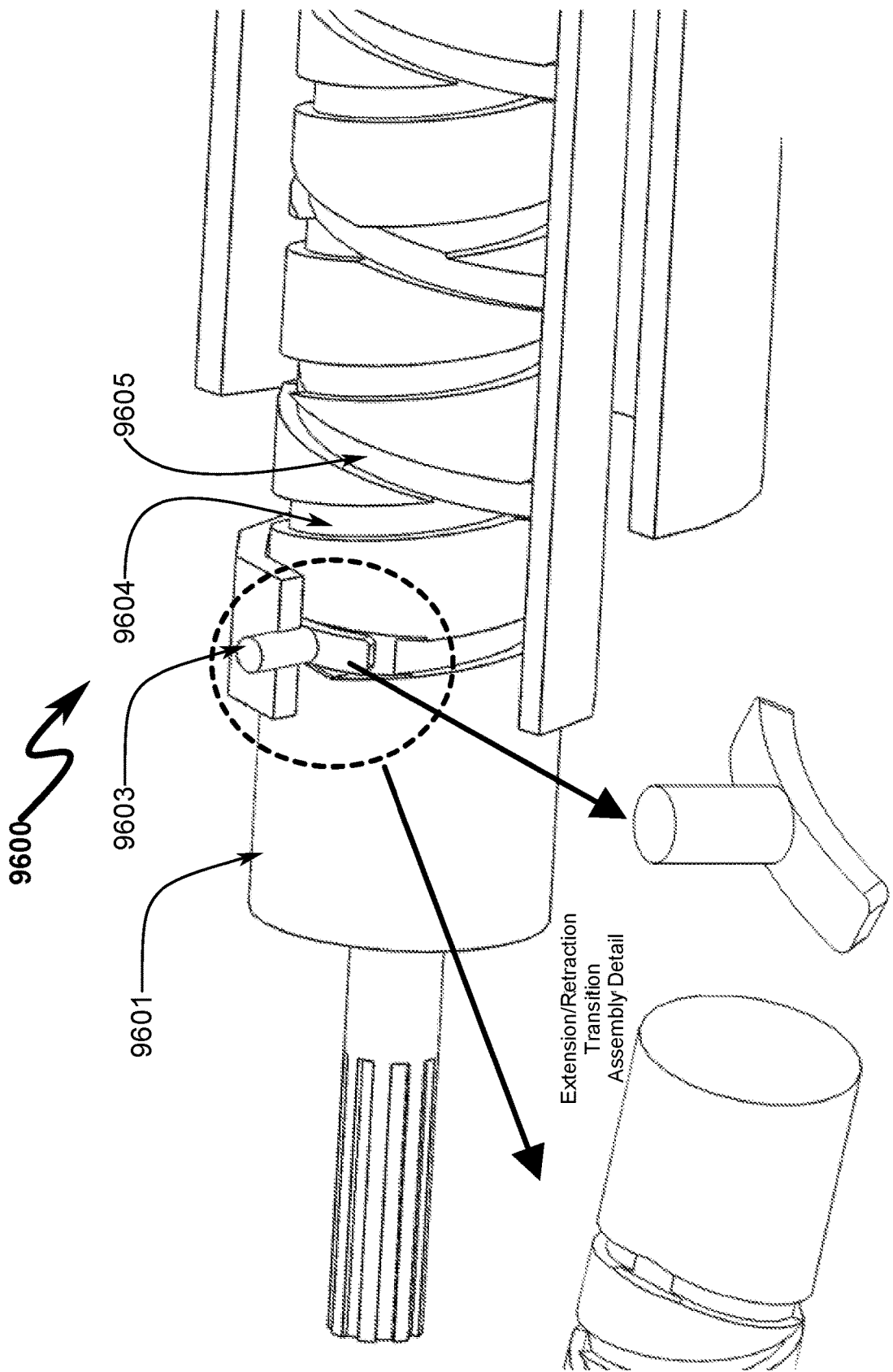

AUTO-REVERSING DRIVESHAFT SYSTEM AND METHOD

CROSS REFERENCE TO RELATED APPLICATIONS

U.S. Utility Patent Application Parent Priority

This is a continuation-in-part patent application (CIP) of United States Utility patent application for CONCRETE PUMP SYSTEM AND METHOD by inventor Francis Wayne Priddy, filed electronically with the USPTO on Jan. 8, 2020, with Ser. No. 16/736,991, EFS ID 38234870, confirmation number 1736, docket AZPRI.0102C2.

U.S. Continuation Utility Patent Application

United States Utility patent application for CONCRETE PUMP SYSTEM AND METHOD by inventor Francis Wayne Priddy, filed electronically with the USPTO on Jan. 8, 2020, with Ser. No. 16/736,991, EFS ID 38234870, confirmation number 1736, docket AZPRI.0102C2 is a continuation patent application (CPA) of United States Utility patent application for CONCRETE PUMP SYSTEM AND METHOD by inventor Francis Wayne Priddy, filed electronically with the USPTO on Apr. 18, 2018, with Ser. No. 15/955,936, EFS ID 32371558, confirmation number 3652, docket AZPRI.0102C1.

U.S. Utility Patent Application Parent Priority

United States Utility patent application for CONCRETE PUMP SYSTEM AND METHOD by inventor Francis Wayne Priddy, filed electronically with the USPTO on Apr. 18, 2018, with Ser. No. 15/955,936, EFS ID 32371558, confirmation number 3652, docket AZPRI.0102C1 is a continuation patent application (CPA) of United States Utility patent application for CONCRETE PUMP SYSTEM AND METHOD by inventor Francis Wayne Priddy, filed electronically with the USPTO on Aug. 29, 2017, with Ser. No. 15/689,963, EFS ID 30217665, confirmation number 1021, docket AZPRI.0102DIV.

United States Utility patent application for CONCRETE PUMP SYSTEM AND METHOD by inventor Francis Wayne Priddy, filed electronically with the USPTO on Aug. 29, 2017, with Ser. No. 15/689,963, EFS ID 30217665, confirmation number 1021, docket AZPRI.0102DIV is a divisional patent application of United States Utility patent application for CONCRETE PUMP SYSTEM AND METHOD by inventor Francis Wayne Priddy, filed electronically with the USPTO on Jul. 23, 2014, with Ser. No. 14/339,189, EFS ID 19664923, confirmation number 2521, docket AZPRI.0102.

U.S. Utility Patent Application Parent Priority

United States Utility patent application for CONCRETE PUMP SYSTEM AND METHOD by inventor Francis Wayne Priddy, filed electronically with the USPTO on Jul. 23, 2014, with Ser. No. 14/339,189, EFS ID 19664923, confirmation number 2521, docket AZPRI.0102 is a Continuation-In-Part patent application of United States Utility patent application for CONCRETE PUMP SYSTEM AND METHOD by inventor Francis Wayne Priddy, filed electronically with the USPTO on Jan. 15, 2014, with Ser. No. 14/155,812, EFS ID 17921037, confirmation number 4557, docket AZPRI.0101.

U.S. Utility Patent Application Parent Priority

This application claims benefit under 35 U.S.C. § 120 and incorporates by reference United States Utility patent application for CONCRETE PUMP SYSTEM AND METHOD by inventor Francis Wayne Priddy, filed electronically with the USPTO on Jul. 23, 2014, with Ser. No. 14/339,189, EFS ID 19664923, confirmation number 2521, docket AZPRI.0102.

U.S. Utility Patent Application Parent Priority

This application claims benefit under 35 U.S.C. § 120 and incorporates by reference United States Utility patent application for CONCRETE PUMP SYSTEM AND METHOD by inventor Francis Wayne Priddy, filed electronically with the USPTO on Jan. 15, 2014, with Ser. No. 14/155,812, EFS ID 17921037, confirmation number 4557, docket AZPRI.0101.

U.S. Provisional Patent Application Parent Priority

This application claims benefit under 35 U.S.C. § 119 and incorporates by reference United States Provisional patent application for CONCRETE PUMP SYSTEM AND METHOD by inventor Francis Wayne Priddy, filed electronically with the USPTO on Jan. 31, 2014, with Ser. No. 61/933,929, EFS ID 18078449, confirmation number 3967, docket AZPRI.0102P.

U.S. Provisional Patent Application Parent Priority

This application claims benefit under 35 U.S.C. § 119 and incorporates by reference United States Provisional patent application for AUTO-REVERSING DRIVESHAFT SYSTEM AND METHOD by inventor Francis Wayne Priddy, filed electronically with the USPTO on 2020 Feb. 4, with Ser. No. 62/969,844, EFS ID 38487909, confirmation number 1030, docket AZPRI.0102CIP1-P.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for actuating driveshafts. Specifically, but without limitation, the present invention in many preferred embodiments has application to situations in which driveshafts must be implemented in piston pumping and level winder applications.

BACKGROUND OF THE INVENTION (0100)-(1600)

Conventional level winder applications implementing an auto-reversing driveshaft utilize threaded shafts to accomplish their winding function as generally depicted in FIG. 1 (0100)-FIG. 16 (1600). As depicted in these figures and the section views of FIG. 7 (0700) and FIG. 8 (0800), the reversing driveshaft (0711, 0811) contains grooves (0712, 0812) that engage with a pin (0813) in the traverse sliding carriage (0714, 0814) to allow traversal of the guide carriage assembly (0715, 0815) within the winding assembly (0710, 0810). Unfortunately, these systems require large driveshafts (0711, 0811) as their single driveshaft engaging pin (0813) exerts significant stress on the pin and the driveshaft (0711, 0811) thus requiring these members to be large to support the load requirements of the system. Furthermore, these systems require that the movement rate of the traversing system be constant, a requirement that is undesirable in a variety of circumstances.

The auto-reversing driveshaft depicted in FIG. 1 (0100)-FIG. 16 (1600) is only typical of a wide variety of application contexts in which an auto-reversing driveshaft may be implemented. Other applications include but are not limited to pumping systems and specifically concrete pumping systems that exhibit high loading stresses on the driveshaft. These high load application contexts are not compatible with existing auto-reversing driveshafts due to their single-pin contact with the driveshaft.

OBJECTIVES OF THE INVENTION

Accordingly, the objectives of the present invention are (among others) to circumvent the deficiencies in the prior art and affect the following objectives in the context of an auto-reversing driveshaft system and method:
(1) Provide for an auto-reversing driveshaft system that allows for reduced driveshaft sizing requirements.
(2) Provide for an auto-reversing driveshaft system that allows for increased load bearing capability.
(3) Provide for an auto-reversing driveshaft system that supports variable forward/reverse traversal rates.
(4) Provide for an auto-reversing driveshaft system that allows for additional dwell time between reversing direction cycles.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention as embodied in a system and method utilizes an axial engagement collar (AEC) to support dual drive pins (DDP) that engage the target driveshaft (TDS). This multi-pin approach allows the driveshaft to be reduced in size for many applications and provides the ability to vary the traversing pitch along the length of the driveshaft and allows the driveshaft to support different forward and reverse traversal rates. The DDP in the present invention is contained within an axial engagement collar (AEC) that allows movement along a longitudinal axis of a target driveshaft (TDS) and allows for varying pitch threads in the TDS to engage the DDP within the AEC.

BRIEF DESCRIPTION OF THE DRAWINGS

For a fuller understanding of the advantages provided by the invention, reference should be made to the following detailed description together with the accompanying drawings wherein:

FIG. 19 illustrates a left side view of a preferred exemplary embodiment of a present invention axial engagement collar (AEC);

FIG. 20 illustrates a right side view of a preferred exemplary embodiment of a present invention axial engagement collar (AEC);

FIG. 31 illustrates a top rear left side perspective view of a preferred exemplary embodiment of a present invention axial engagement collar (AEC) with top half of AEC removed;

FIG. 49 illustrates front and rear views of a preferred exemplary embodiment of a present invention axial slotted strap (ASS) used to couple the AEC to the MDP;

FIG. 50 illustrates left and right side views of a preferred exemplary embodiment of a present invention axial slotted strap (ASS) used to couple the AEC to the MDP;

FIG. 52 illustrates top left side perspective and top right side perspective views of a preferred exemplary embodiment of a present invention axial slotted strap (ASS) used to couple the AEC to the MDP;

FIG. 56 illustrates bottom left side perspective and top right side perspective views of a preferred exemplary embodiment of a present invention dual drive pin (DDP) incorporating vertical roller bearings used to couple the AEC to the TDS;

FIG. 58 illustrates bottom left side perspective and top right side perspective views of a preferred exemplary embodiment of a present invention simplified dual drive pin (DDP) used to couple the AEC to the TDS;

FIG. 90 illustrates a front section view depicting a present invention auto-reversing driveshaft applied to a mechanical pumping system (isolation view of TDS, pump piston, and section of pump cylinder);

FIG. 95 illustrates a diagram depicting a previously disclosed auto-reversing driveshaft applied to a pump drive system; and FIG. 96 illustrates a detail diagram depicting a previously disclosed auto-reversing driveshaft applied to a pump drive system.

DESCRIPTION OF THE PRESENTLY PREFERRED EXEMPLARY EMBODIMENTS

Figure 1:
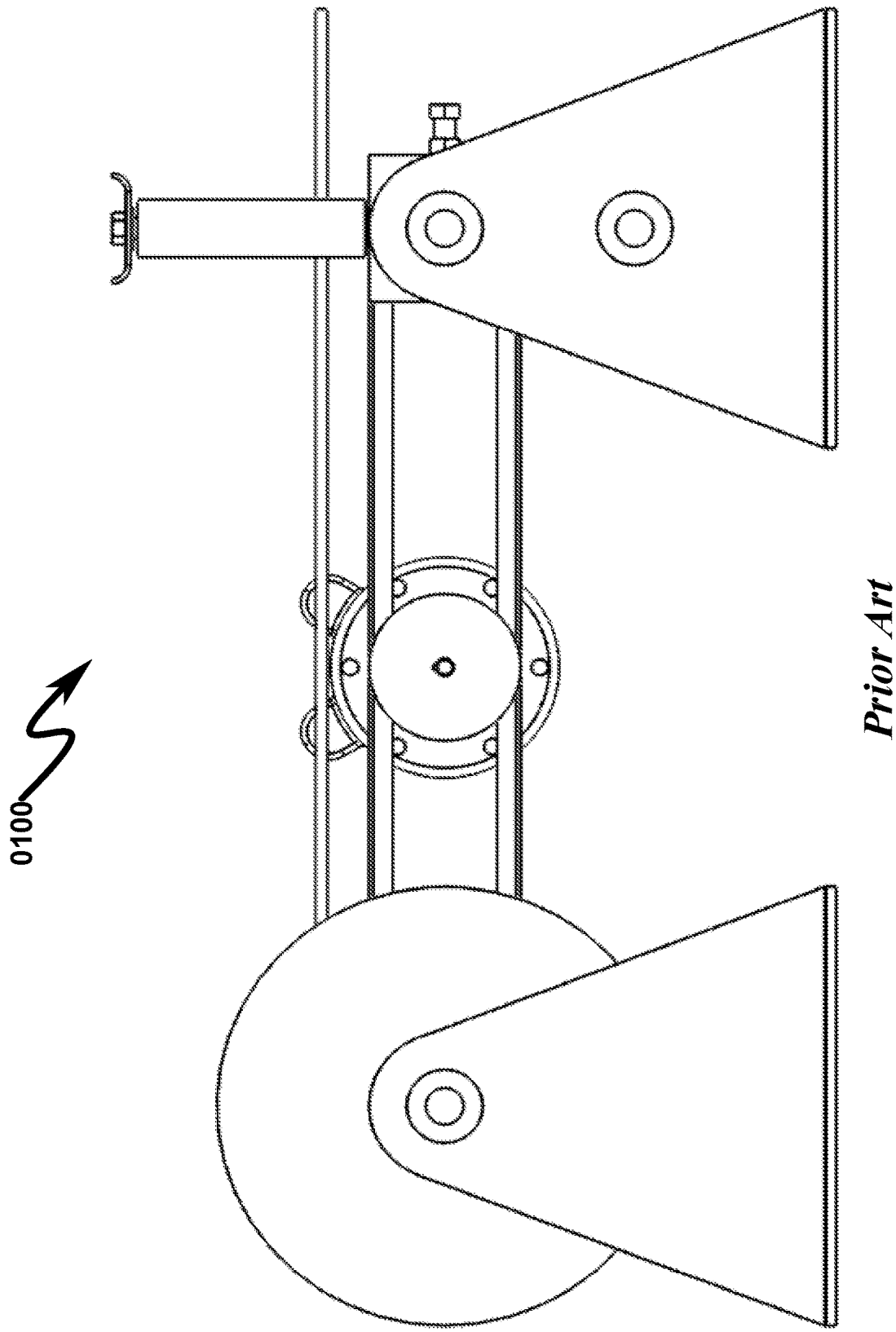
FIG. 1 illustrates a front view of a prior art level winder system.
Figure 2:
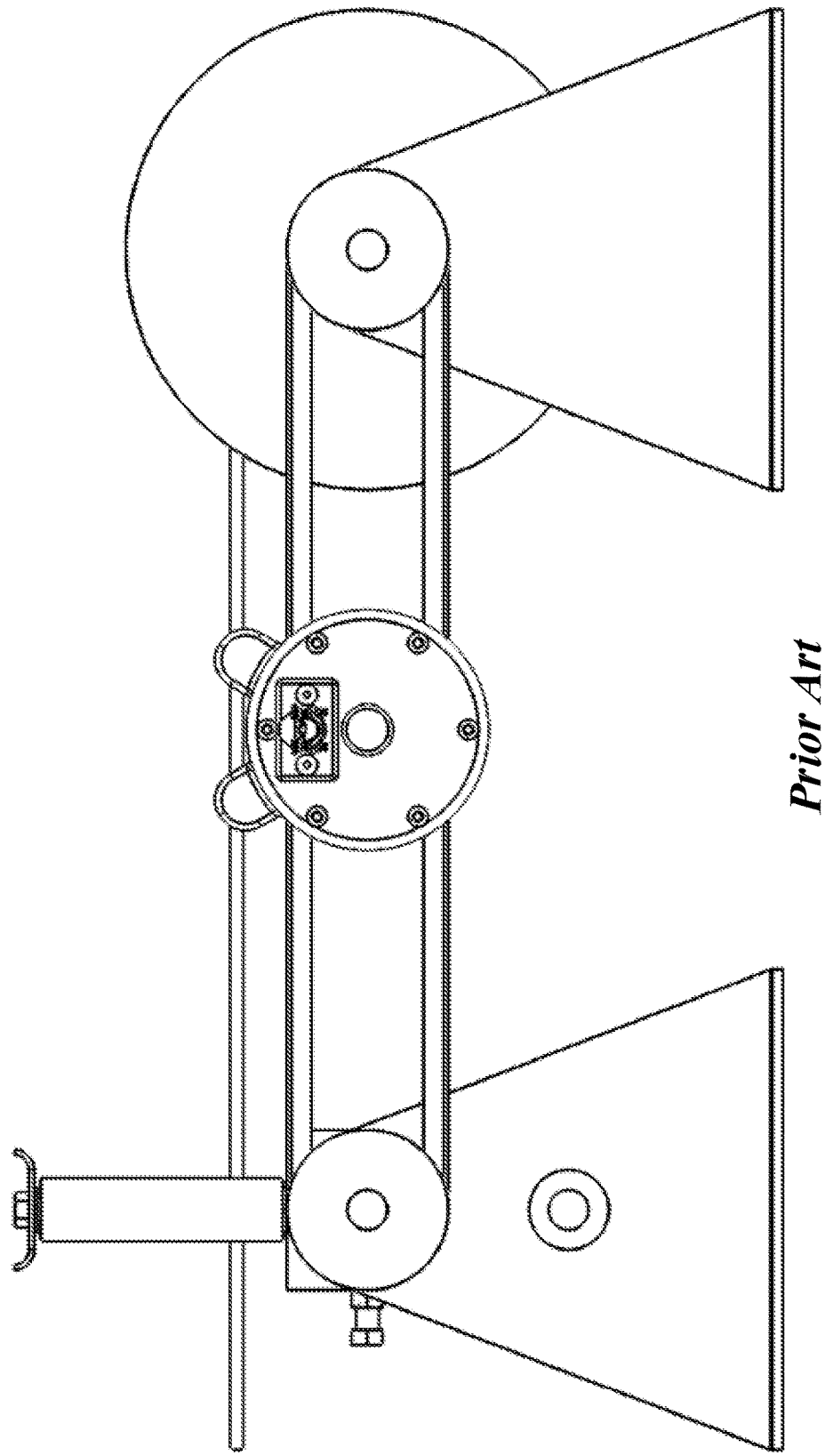
FIG. 2 illustrates a rear view of a prior art level winder system.
Figure 3:
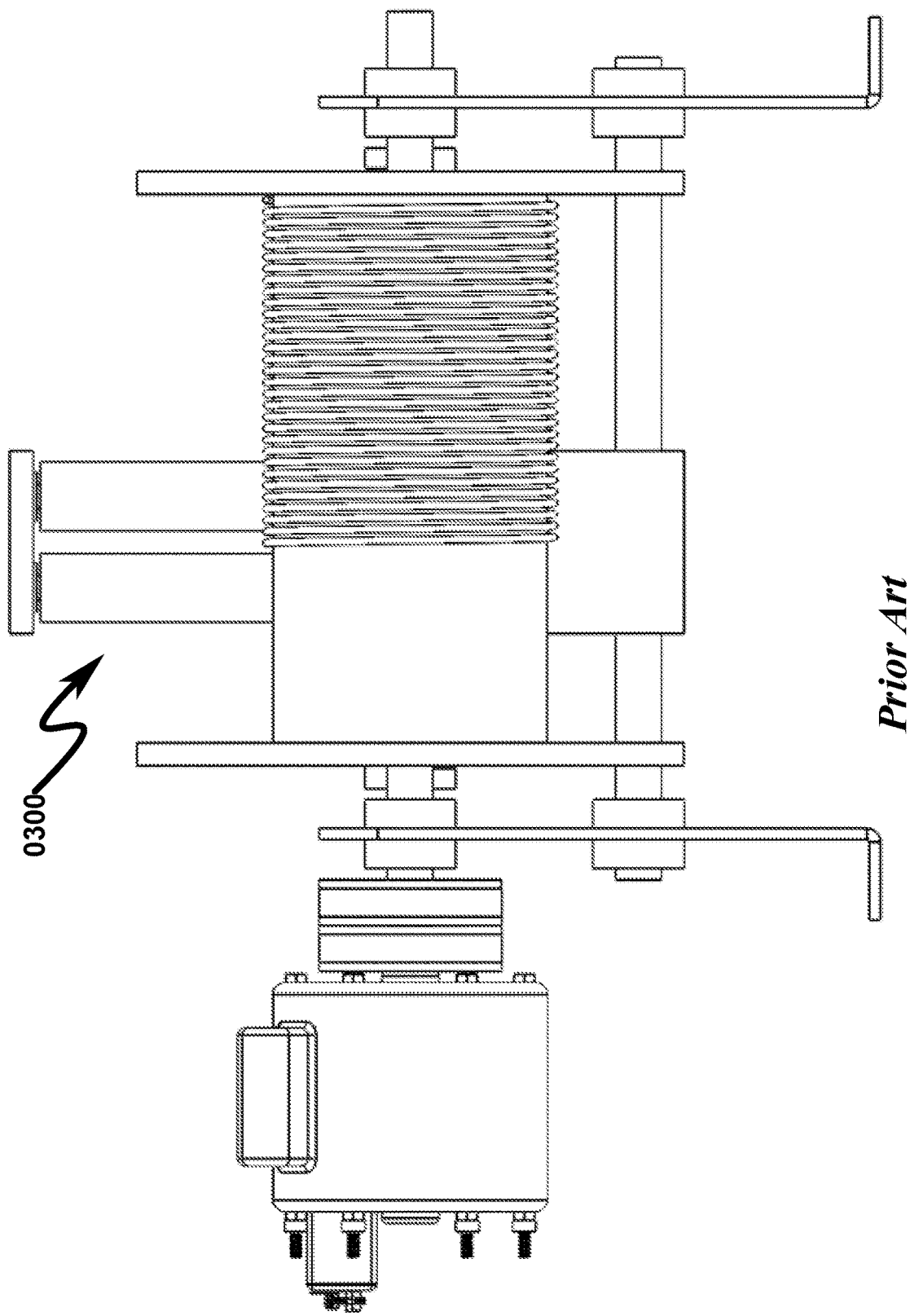
FIG. 3 illustrates a left side view of a prior art level winder system.
Figure 4:
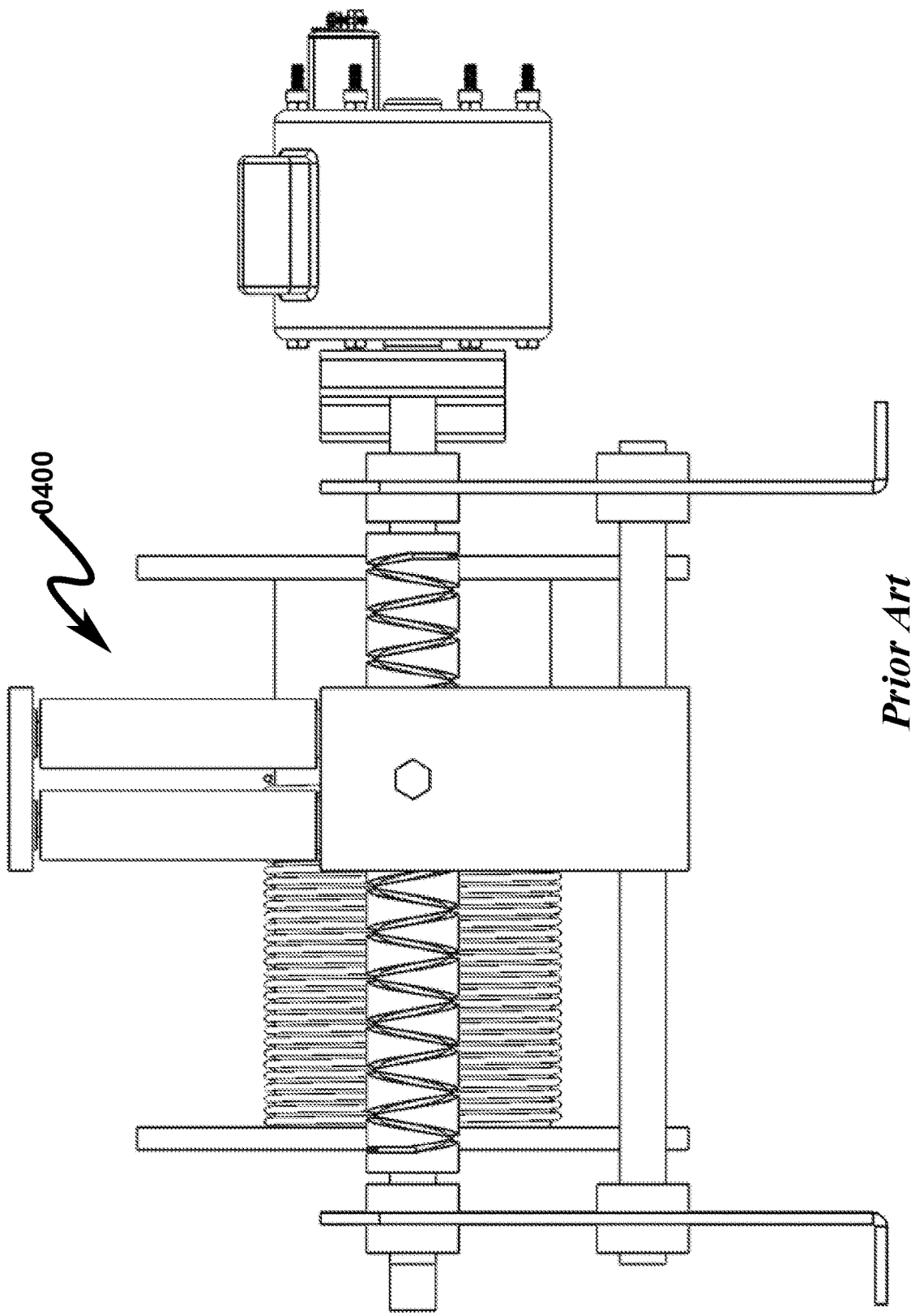
FIG. 4 illustrates a right side view of a prior art level winder system.
Figure 5:
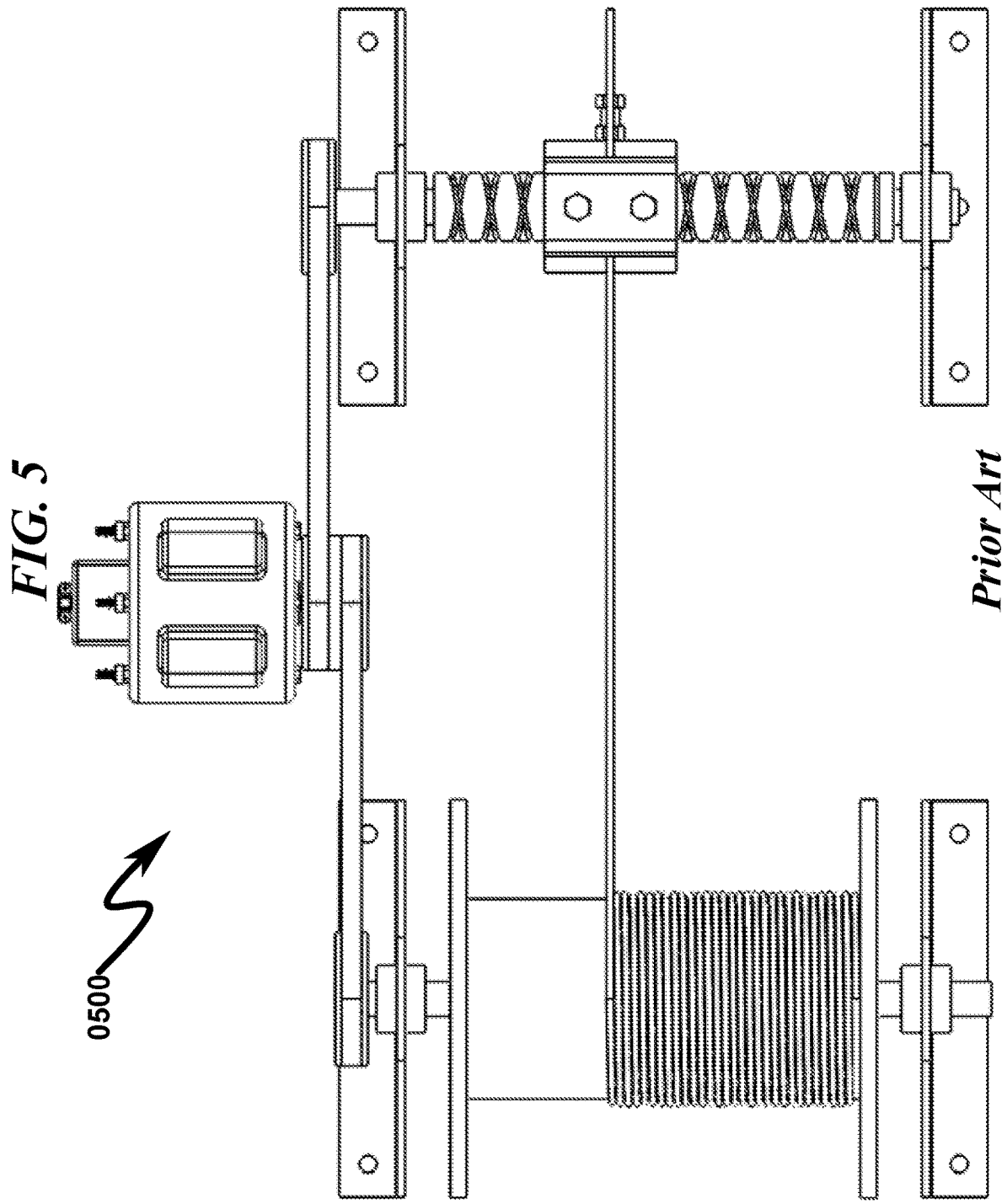
FIG. 5 illustrates a top view of a prior art level winder system.
Figure 6:
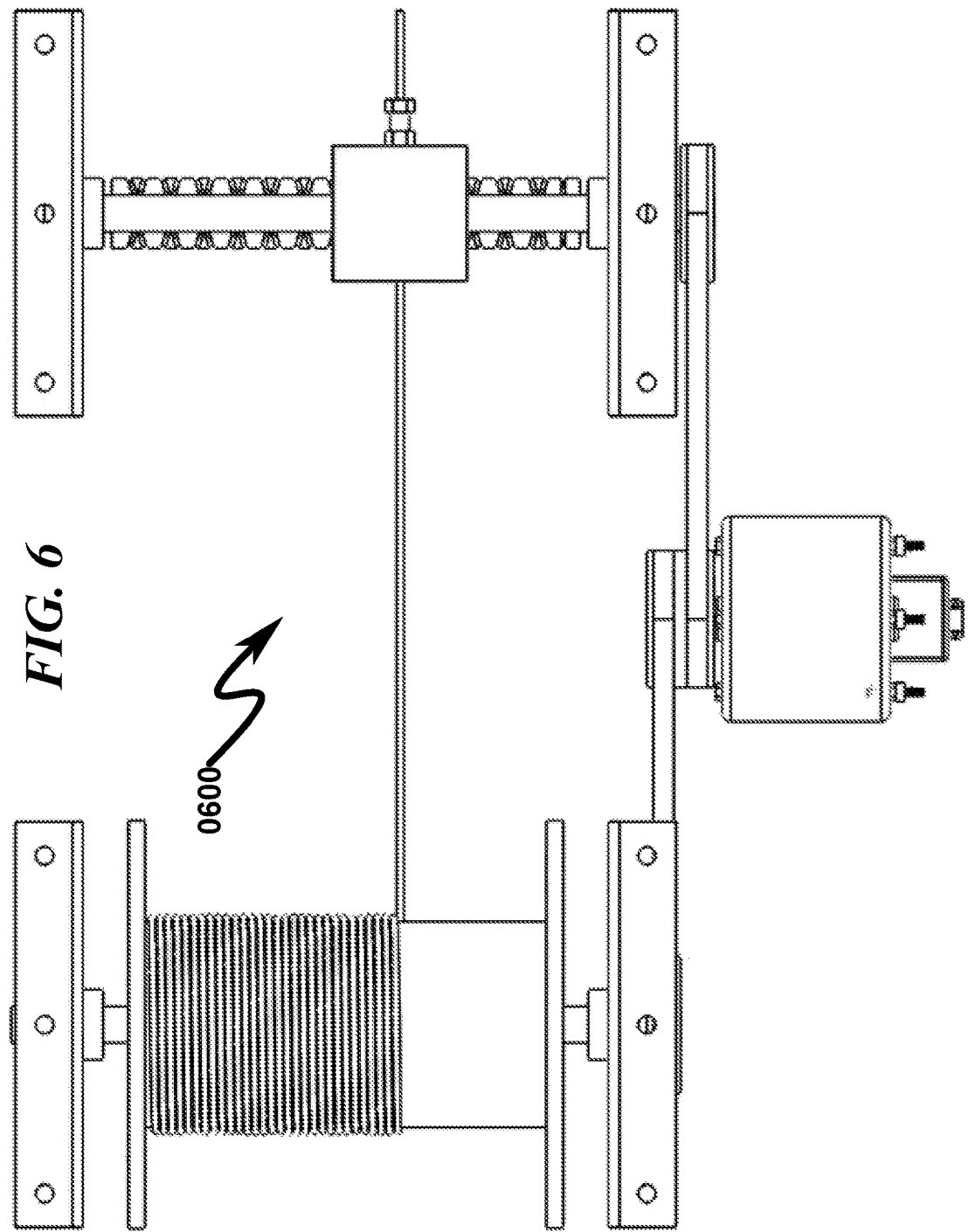
FIG. 6 illustrates a bottom view of a prior art level winder system.
Figure 7:
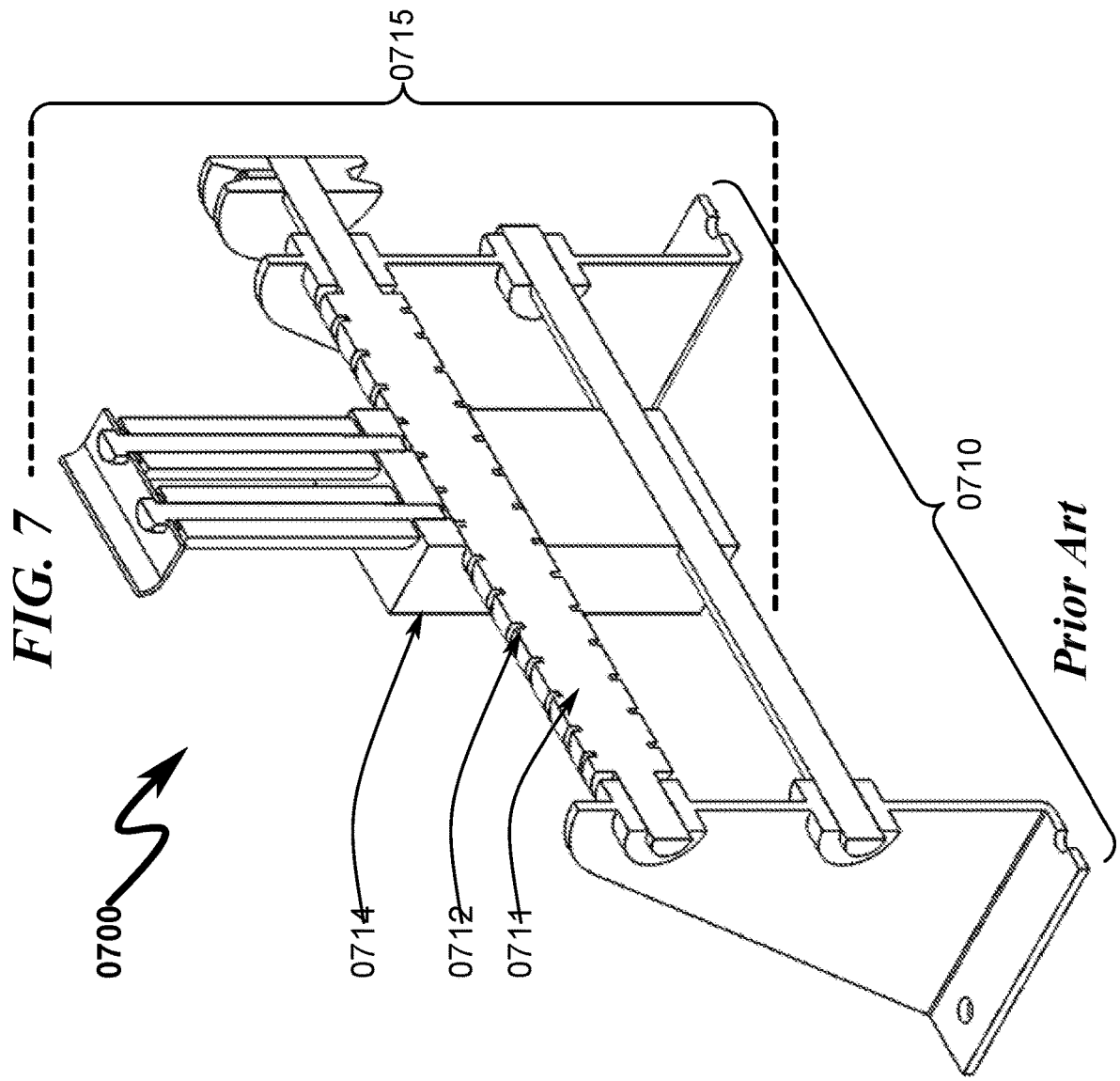
FIG. 7 illustrates a detail perspective section view of a typical traversing shaft mechanism used on a prior art level winder system.
Figure 8:
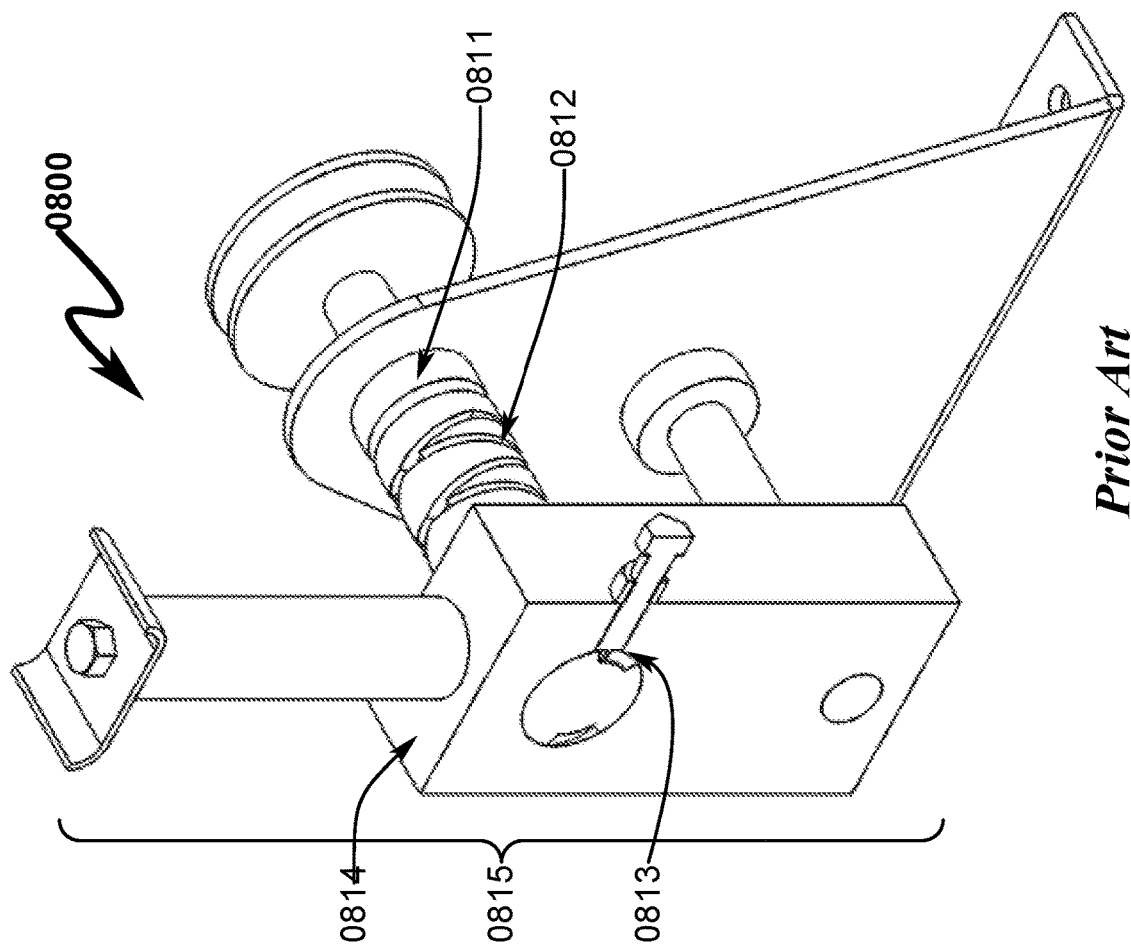
FIG. 8 illustrates a detail perspective section view of a typical traversing shaft mechanism used on a prior art level winder system.
Figure 9:
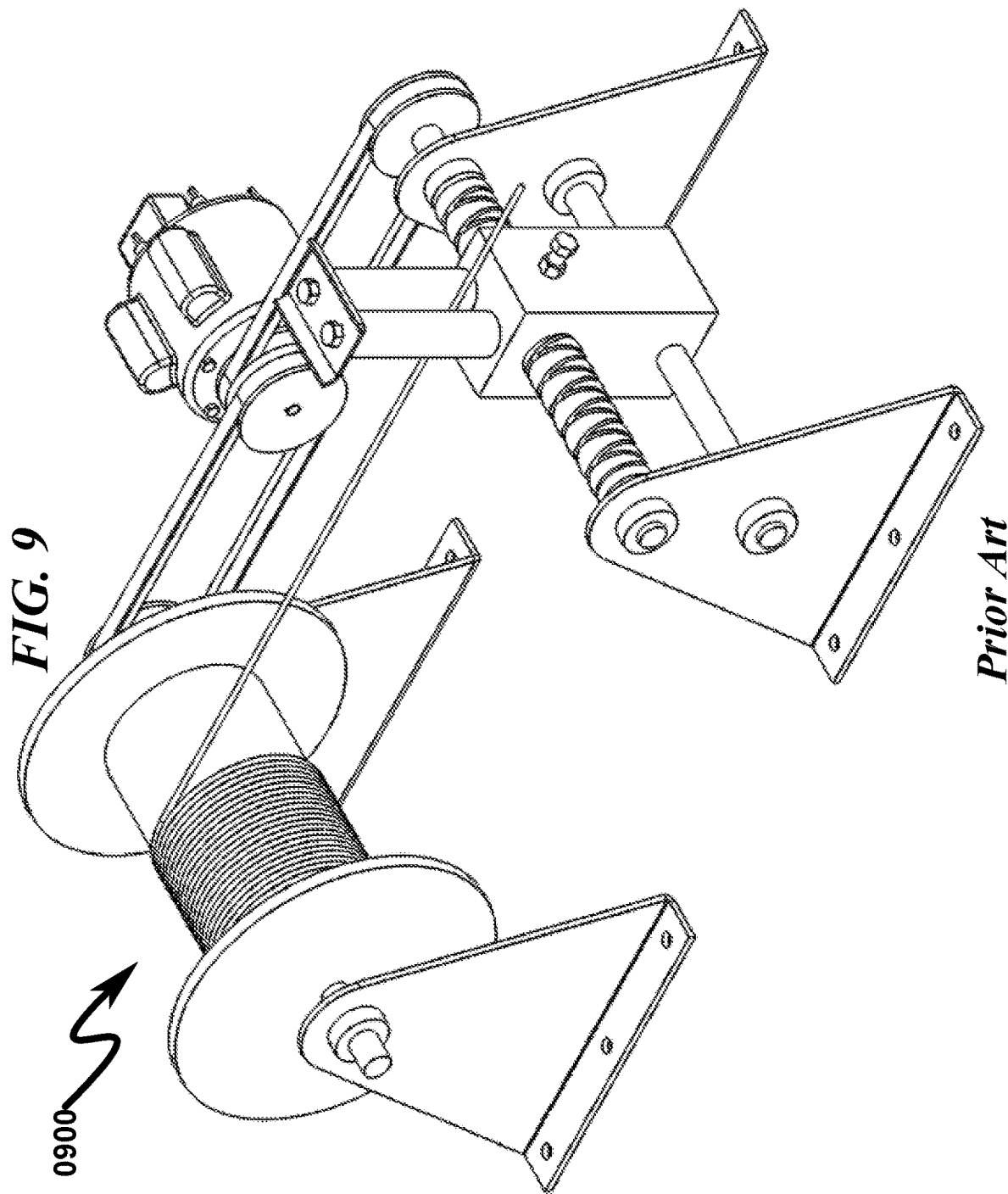
FIG. 9 illustrates a top front right side perspective view of a prior art level winder system.
Figure 10:
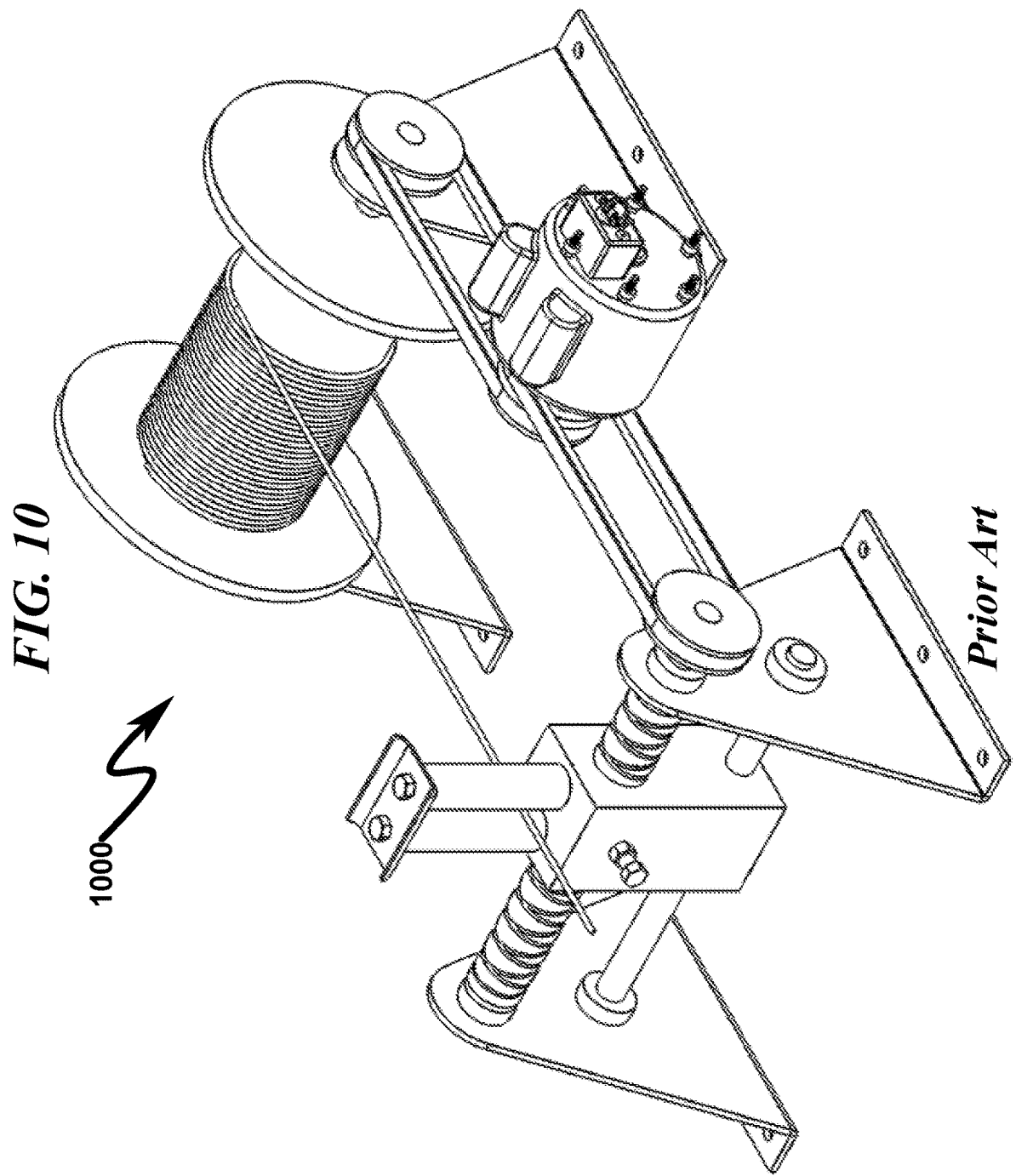
FIG. 10 illustrates a top rear right side perspective view of a prior art level winder system.
Figure 11:
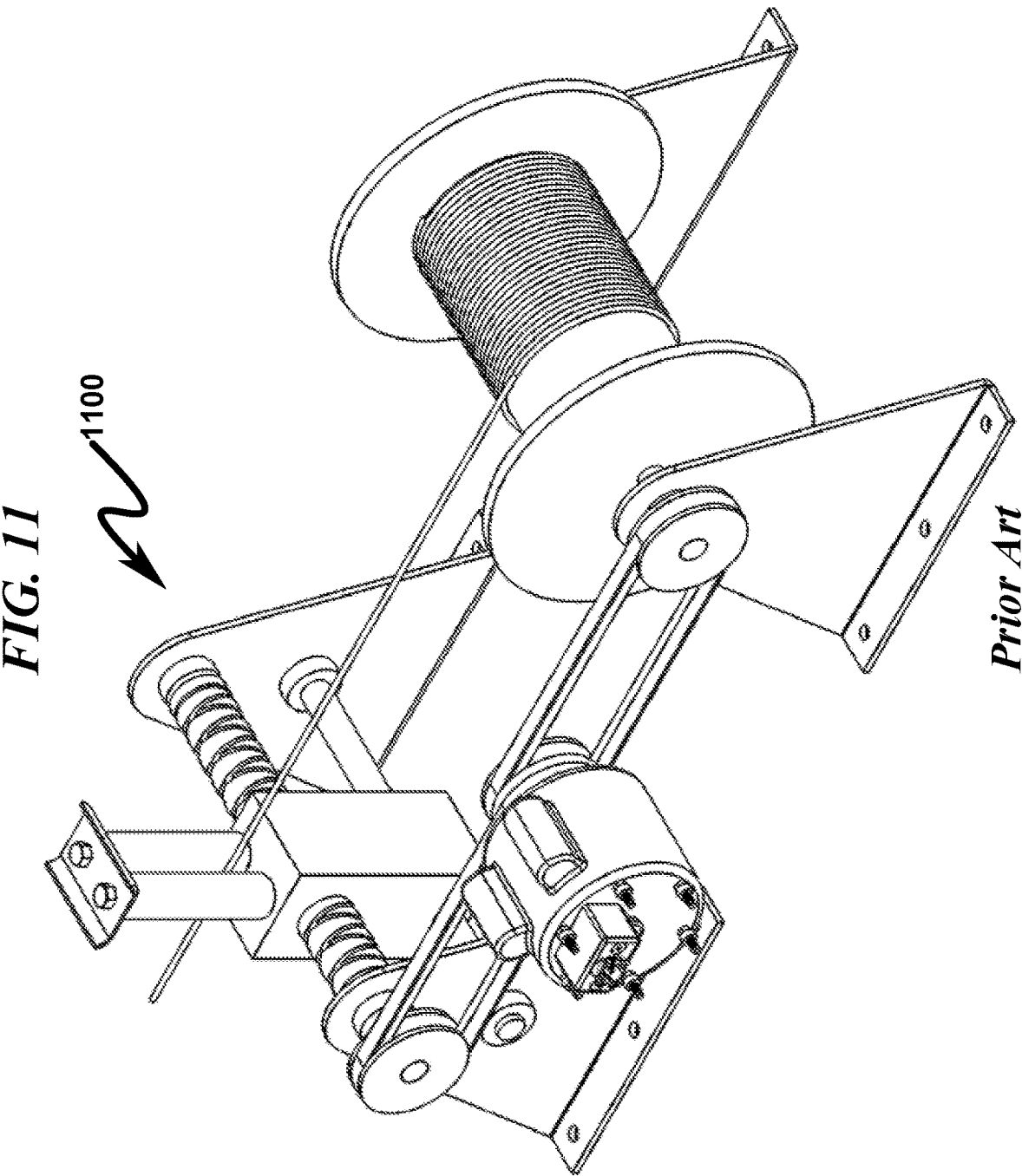
FIG. 11 illustrates a top rear left side perspective view of a prior art level winder system.
Figure 12:
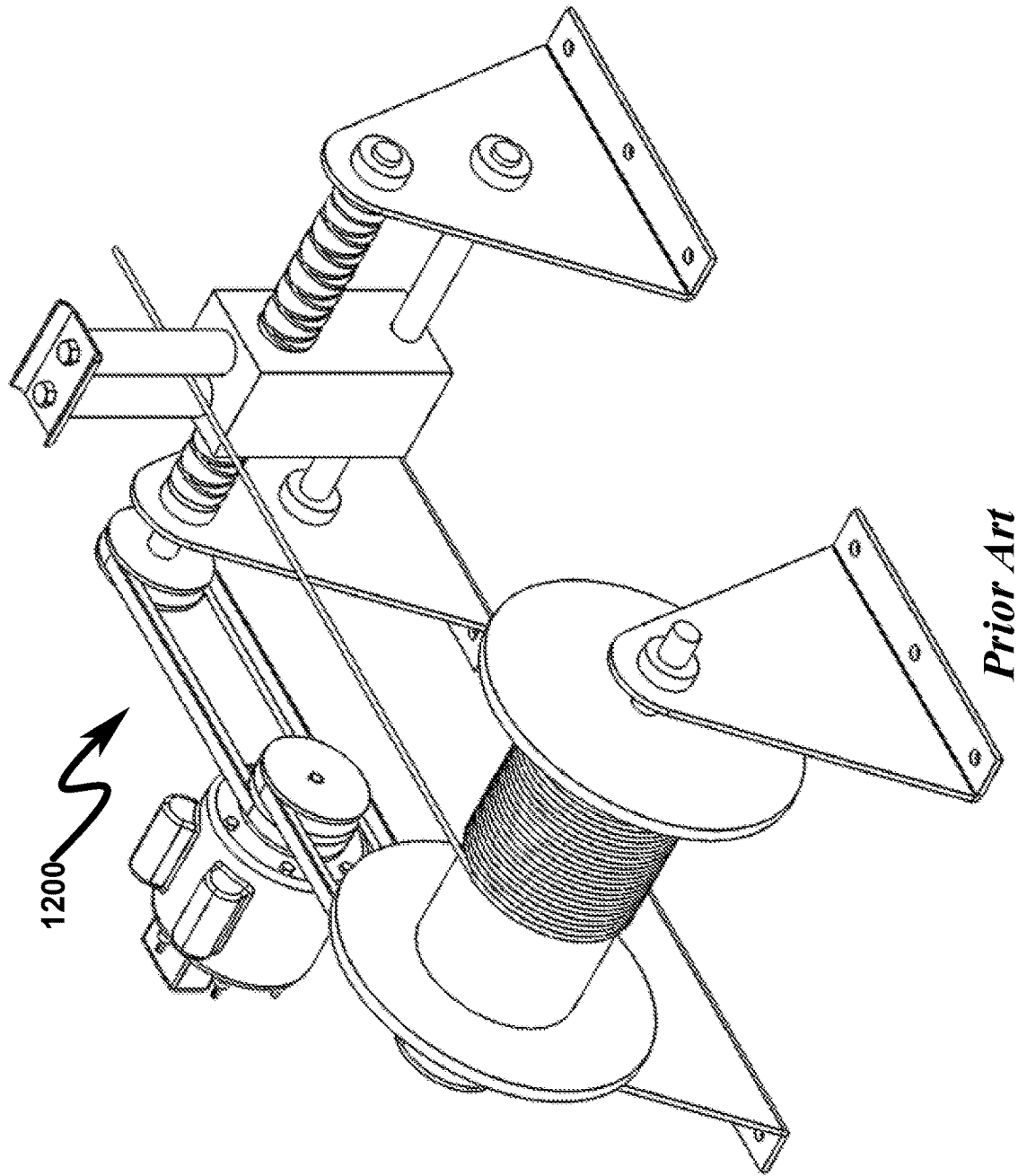
FIG. 12 illustrates a top front left side perspective view of a prior art level winder system.
Figure 13:
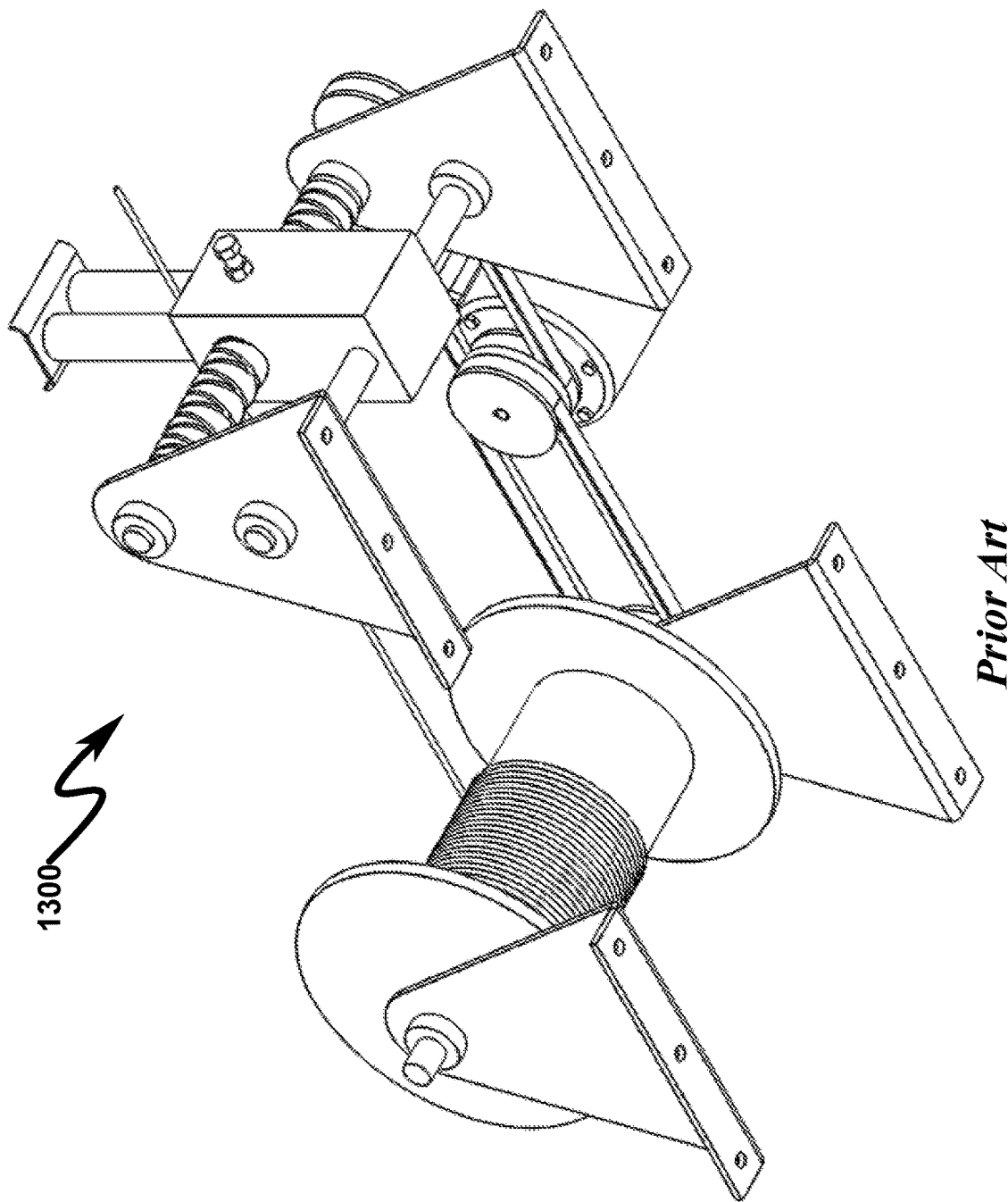
FIG. 13 illustrates a bottom front right side perspective view of a prior art level winder system.
Figure 14:
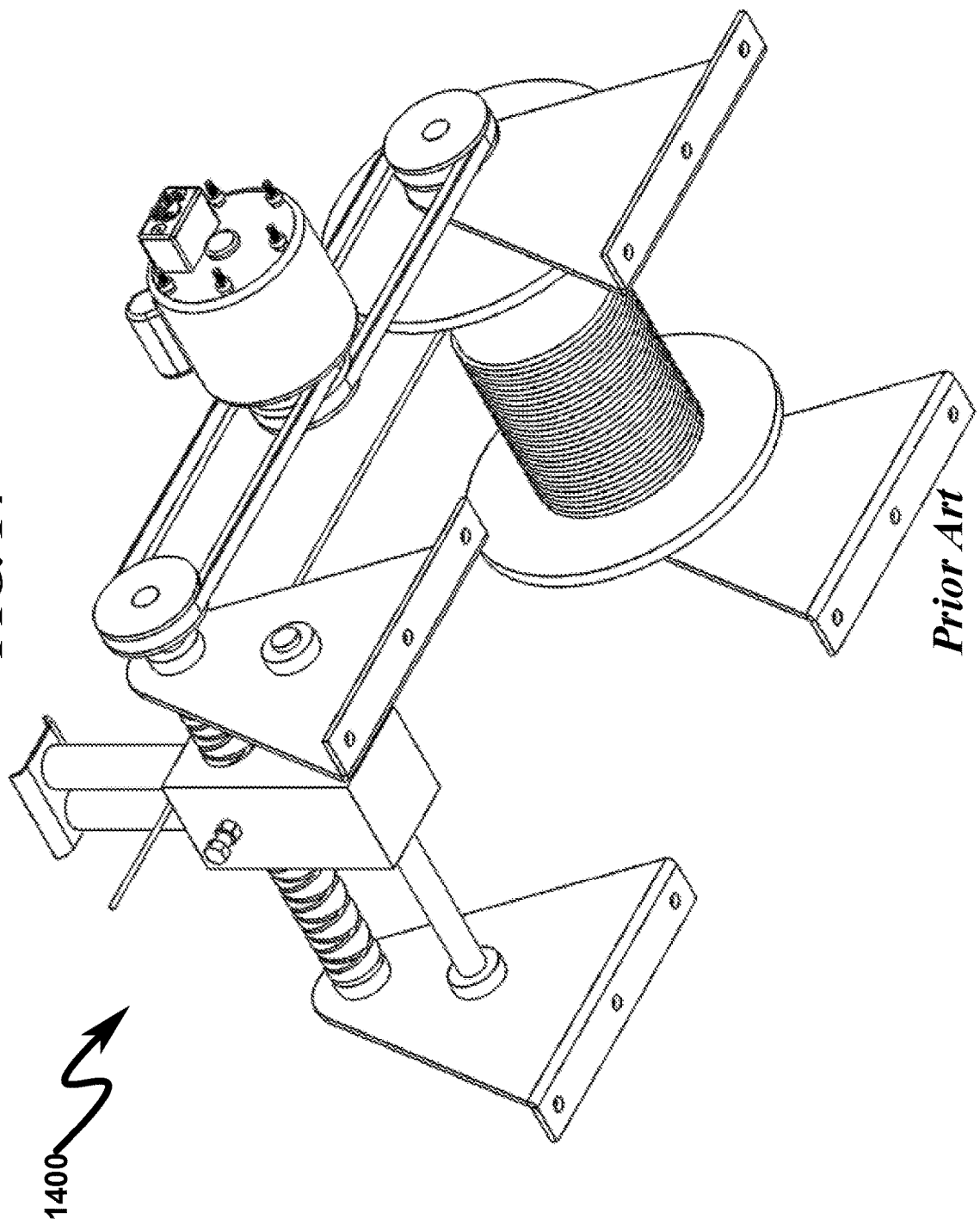
FIG. 14 illustrates a bottom rear right side perspective view of a prior art level winder system.
Figure 15:
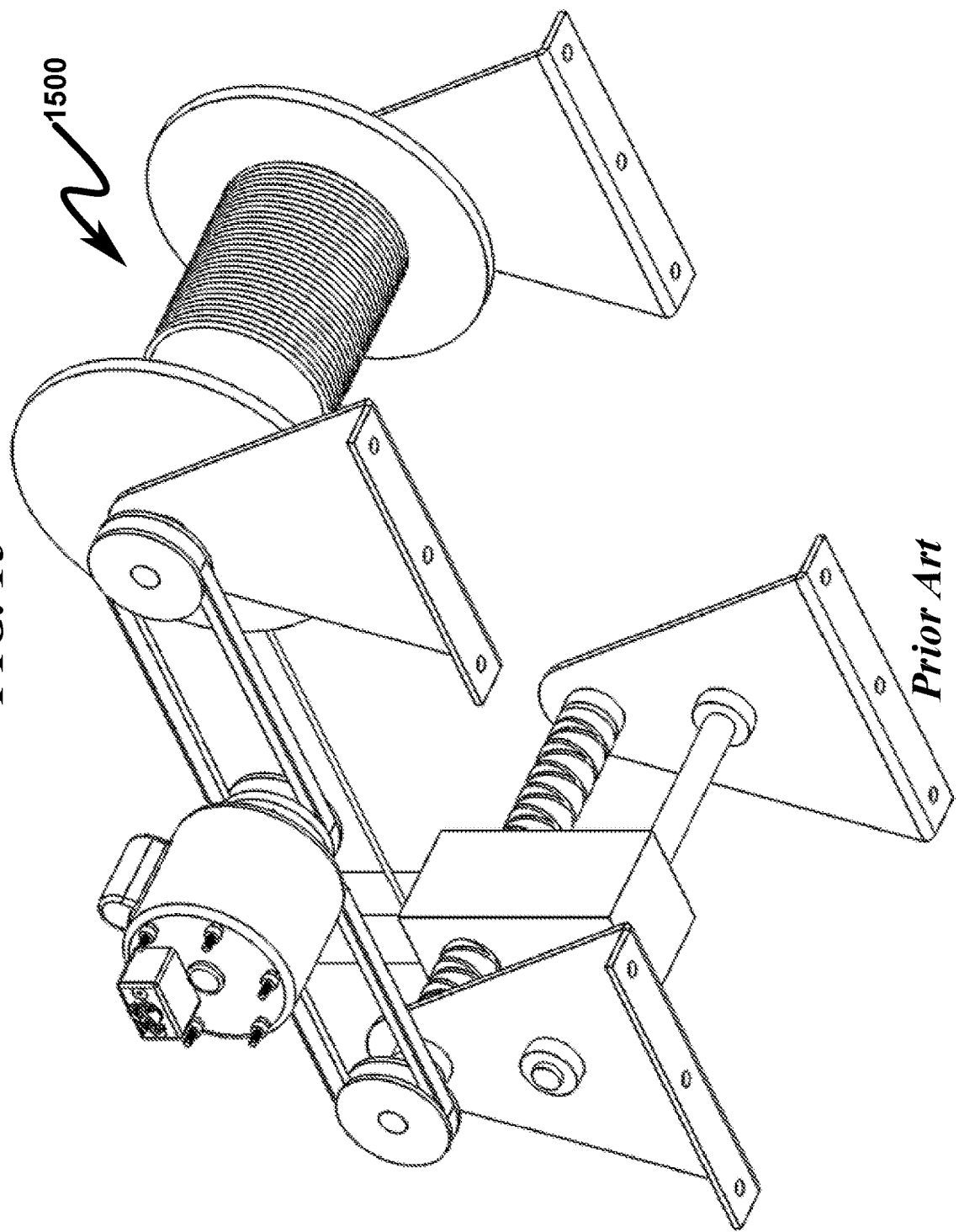
FIG. 15 illustrates a bottom rear left side perspective view of a prior art level winder system.
Figure 16:
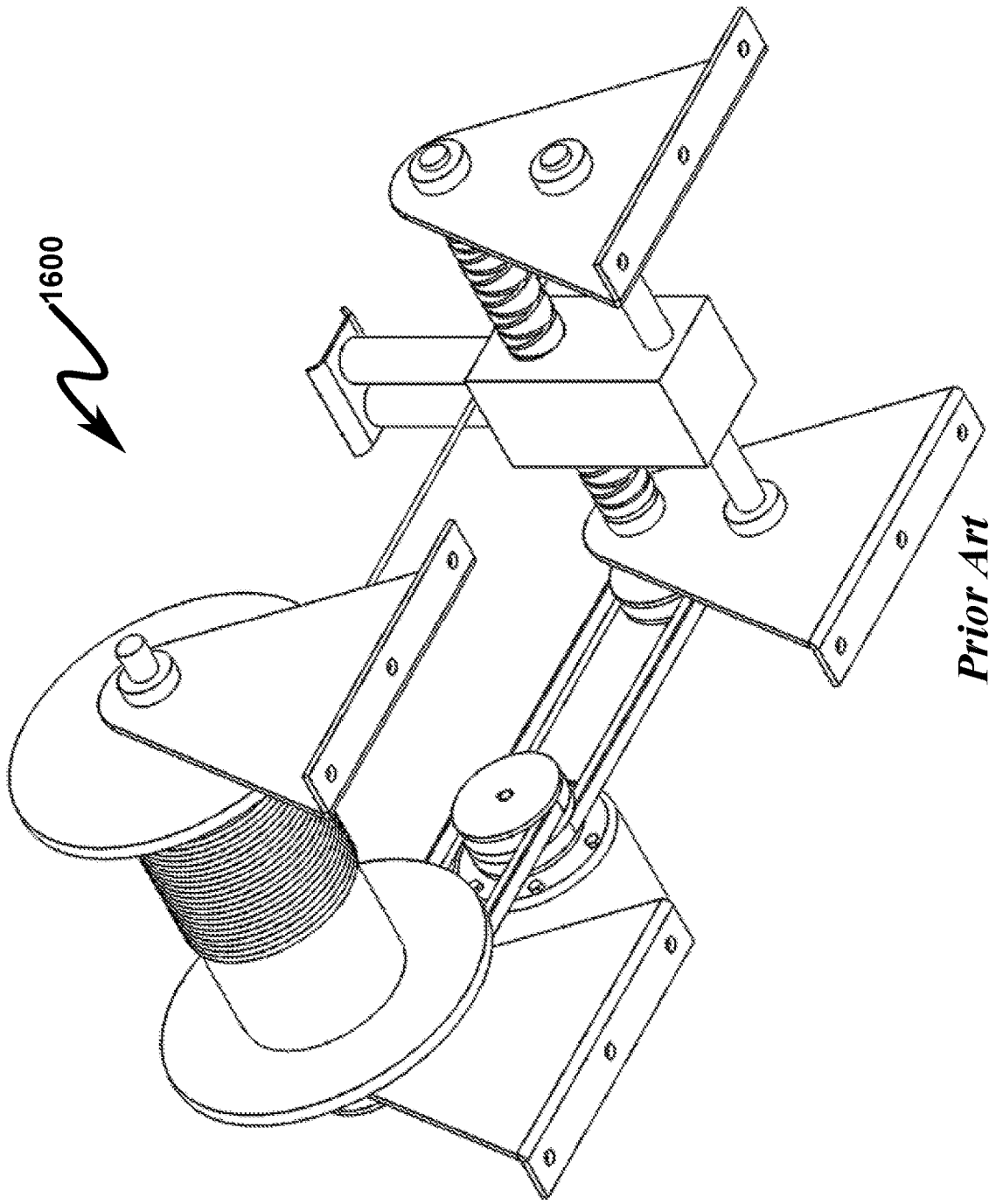
FIG. 16 illustrates a bottom front left side perspective view of a prior art level winder system.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of an AUTO-REVERSING DRIVESHAFT SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Motion Driver Platform (MDP) not Limitive

Within the context of the present invention, the term "motion driver platform (MDP)" will refer to a mechanical assembly mechanically coupled to the AEC. Here the MDP may be a moveable entity such as depicted in the level winder application presented above wherein the TDS is fixed and the MDP moves in parallel with a longitudinal axis of the TDS. In other configurations the MDP will be fixed and the TDS will traverse along its longitudinal axis with relation to the fixed MDP. Situations in which this might be the case include a variety of mechanical pumps, liquid pumps, concrete pumps, sludge pumps, and/or other thick material pumps or the like. The present invention does not limit the scope of the type of MDP application context in which the AEC is coupled to the MDP or the type of MDP mechanical operation (sliding or fixed) to which the present invention may be applied.

Dovetail Construction not Limitive

The present invention is depicted herein having a two-part AEC construction coupled using dovetail joints. The present invention is not limited to this construction format and any form of mechanical coupling may be implemented to ensure that the AEC is properly mated to the TDS. Other forms of mating construction could include conventional fasteners such as nuts and bolts (with appropriate sliding slots in the AEC for their movement to allow the AEC to operate as indicted herein), a retaining rectangular tube or other similar structure (allowing the AEC to freely move along the longitudinal axis of the TDS) or other retaining means that would be well within the skill in the mechanical arts to implement.

AEC Symmetry not Limitive

The AEC depicted herein is constructed of a two-piece mirrored symmetric design allowing one AEC component to serve as both pieces of the construction. The present invention is not limited to this design and other variants may include two-piece designs that are not symmetric in nature. For example, a dovetail design wherein one of the AEC pieces is male and the other female is also possible. Other forms of sliding joints are possible and well within the skill of the mechanical arts.

Thread Profiles not Limitive

The diagrams depicted herein generally depict rectangular or near-rectangular threading profiles in the TDS. The present invention is not limited to these particular thread profiles and this aspect of the invention may vary widely based on application context.

Thread Transitions not Limitive

The diagrams depicted herein generally depict one or two thread transitions in the TDS. That is, there are depicted a limited number of portions of the TDS in which the pitch of the threads varies. The present invention may have any number of such transitions and the transitions need not be discrete in that the transition from one thread pitch to another may vary continuously across the entire length of the TDS. Furthermore, the transitions at either end of the TDS where reversing of the AEC mechanism is actuated may take a wide variety of forms including but not limited to additional milling at the reversal points or the use of continuously varying thread pitches so that the transition between forward/reverse or reverse/forward occurs with a smooth curvature within the threading profile.

System Overview (1700)-(6400)

Figure 17:
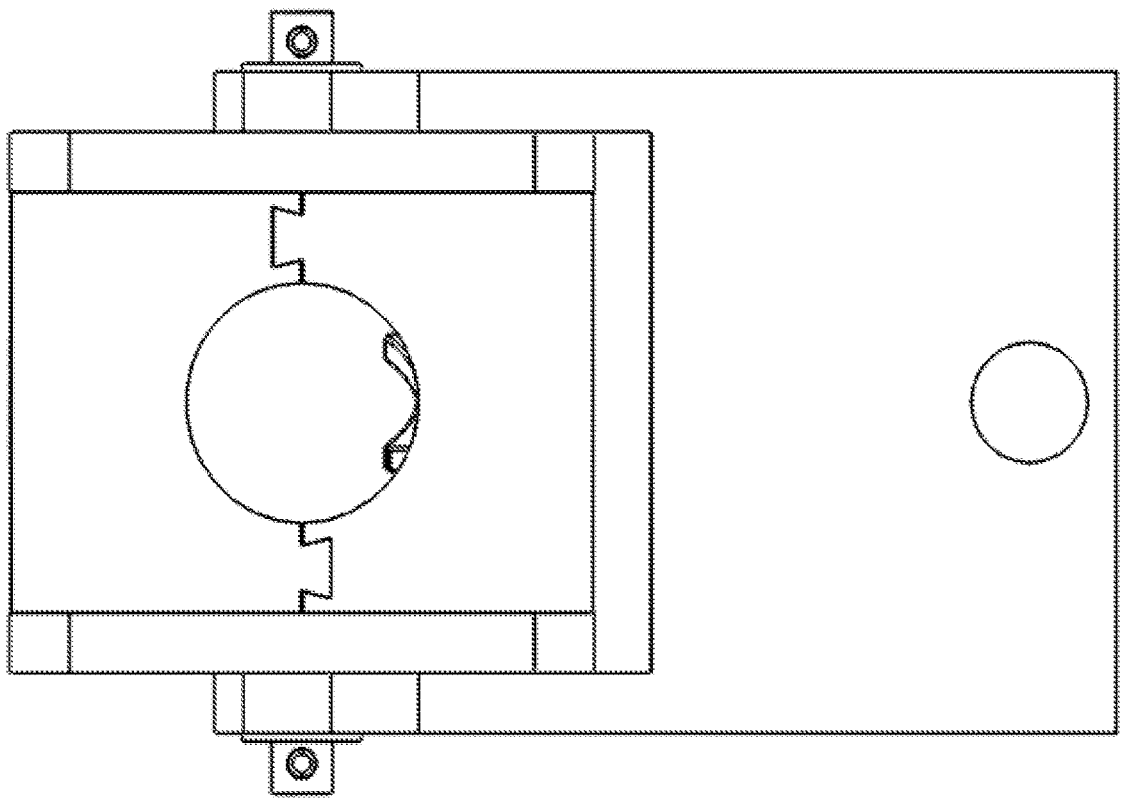
FIG. 17 illustrates a front view of a preferred exemplary embodiment of a present invention axial engagement collar (AEC)
Figure 18:
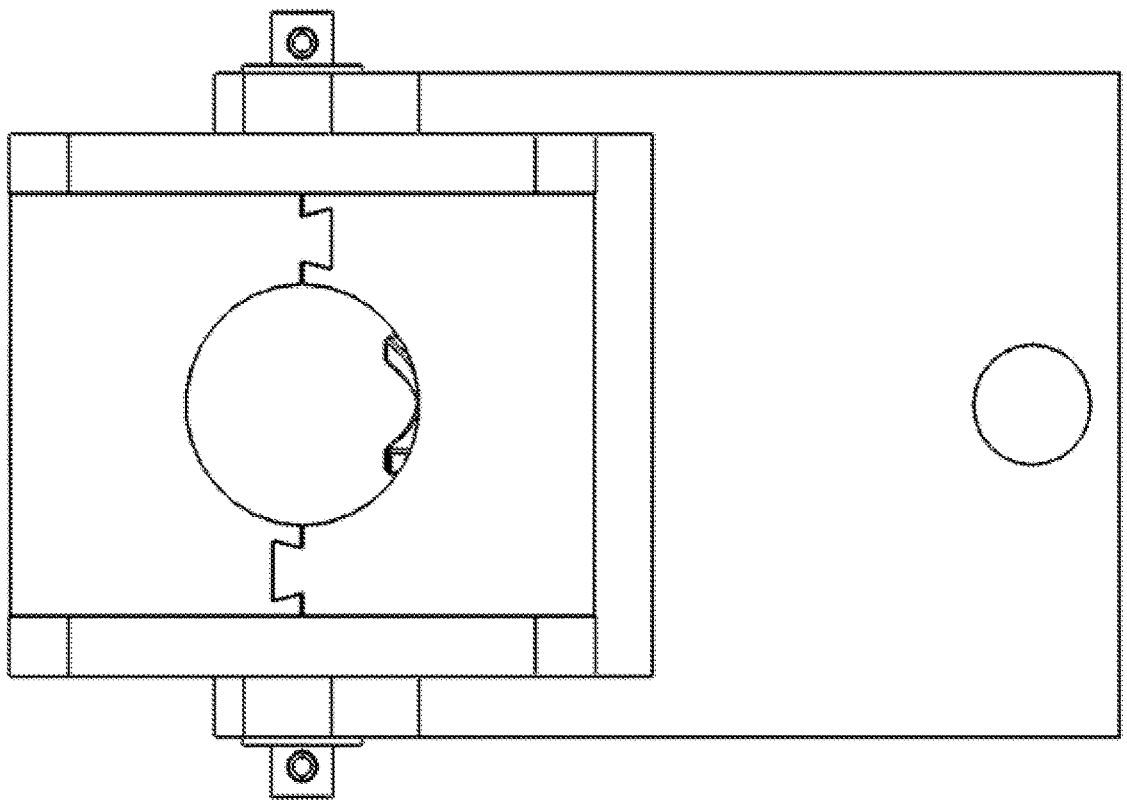
FIG. 18 illustrates a rear view of a preferred exemplary embodiment of a present invention axial engagement collar (AEC)
Figure 21:
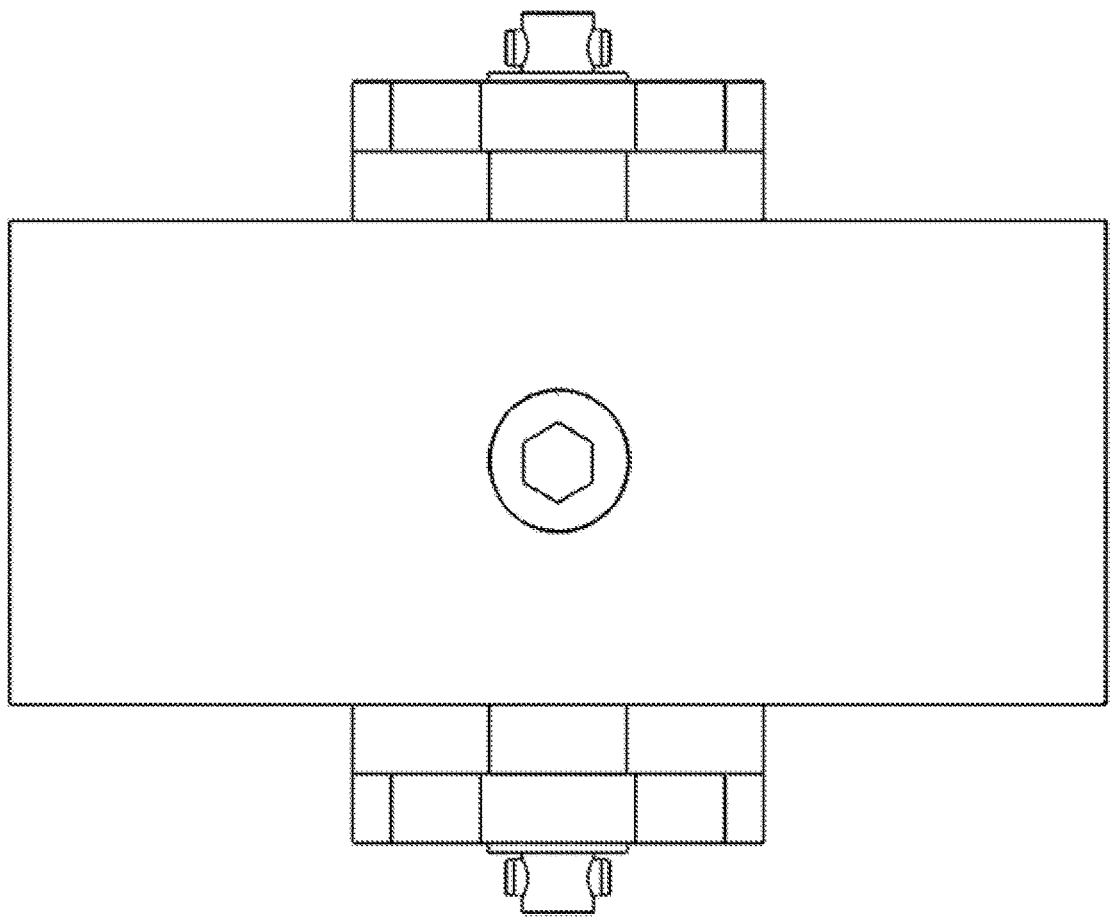
FIG. 21 illustrates a top view of a preferred exemplary embodiment of a present invention axial engagement collar (AEC)
Figure 22:
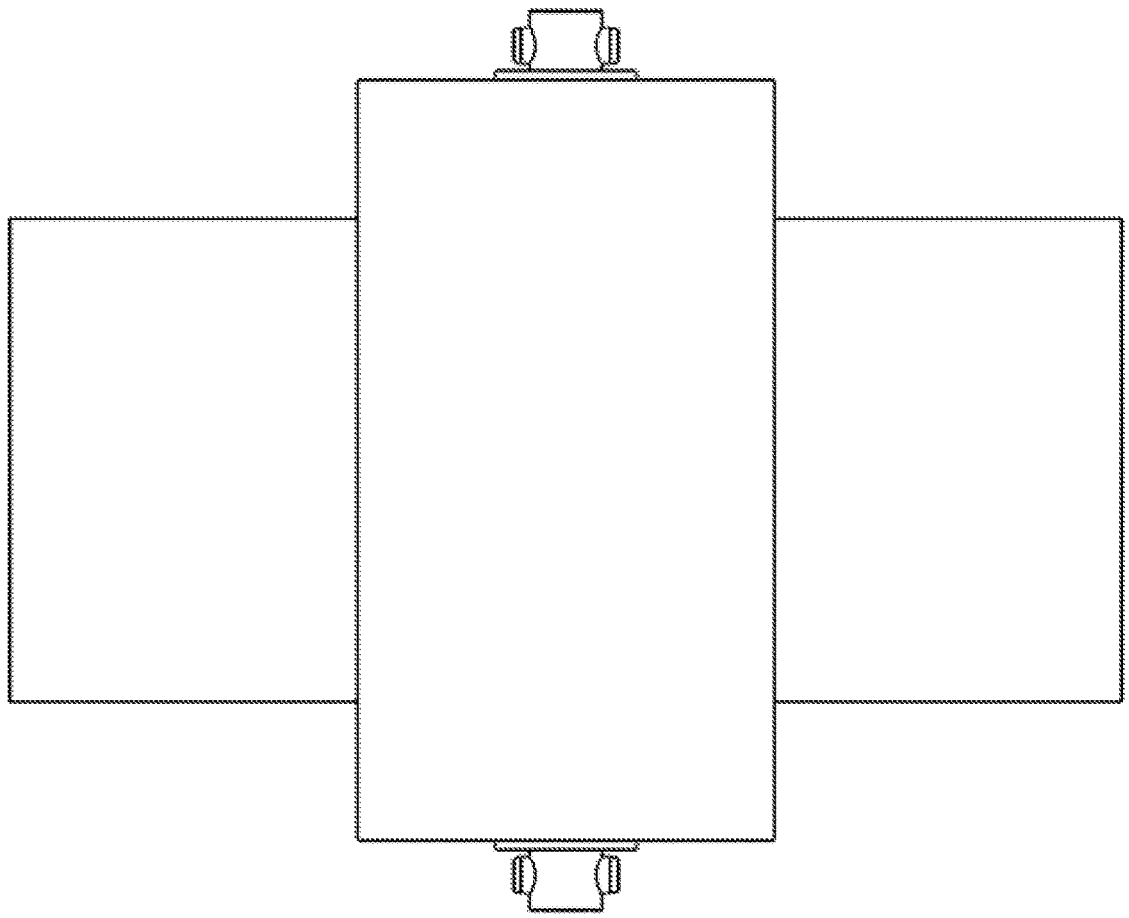
FIG. 22 illustrates a bottom view of a preferred exemplary embodiment of a present invention axial engagement collar (AEC)
Figure 23:
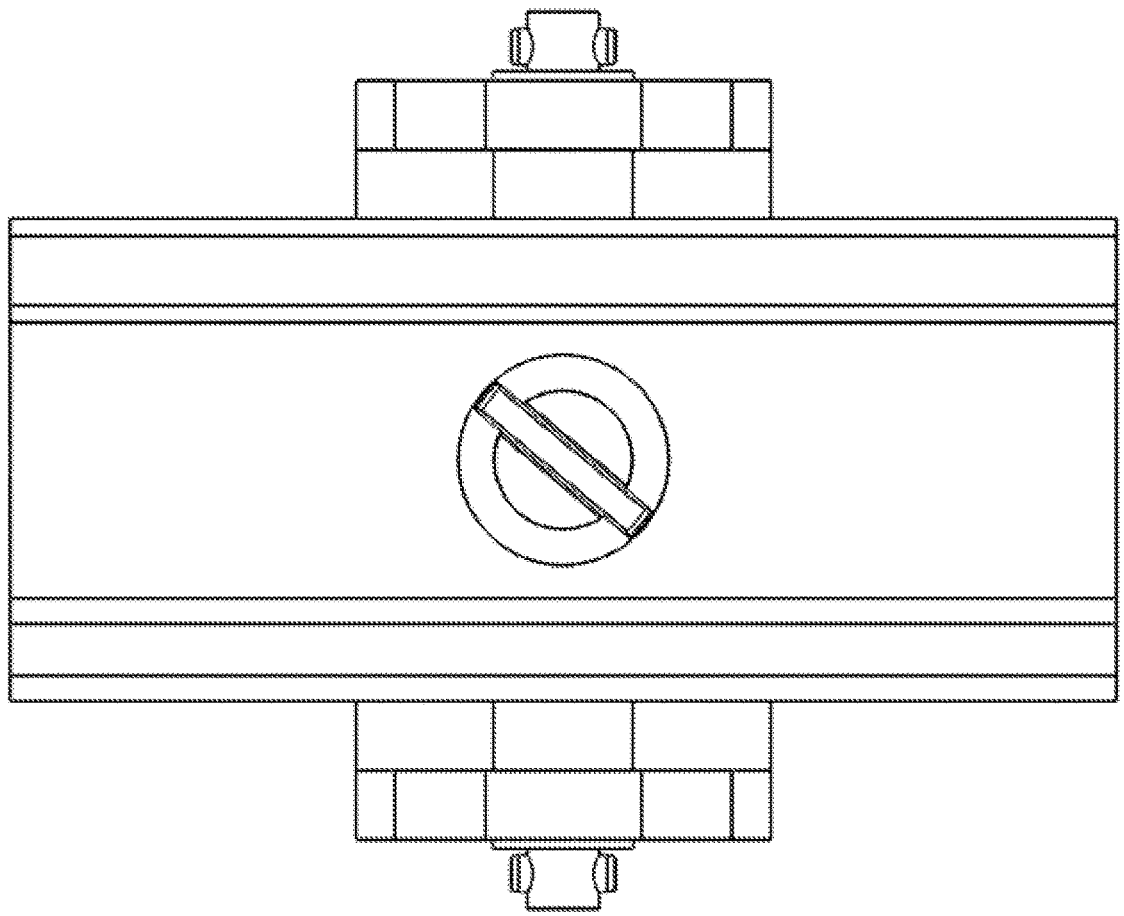
FIG. 23 illustrates a top view of a preferred exemplary embodiment of a present invention axial engagement collar (AEC) with top half of AEC removed.
Figure 24:
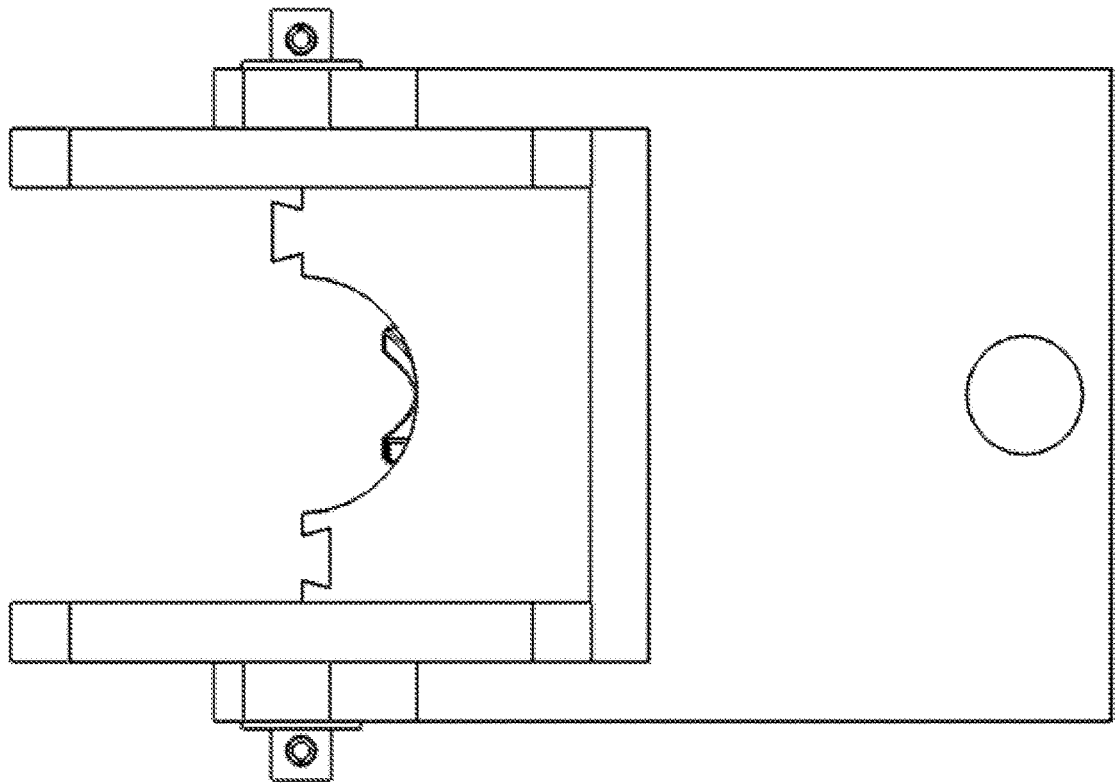
FIG. 24 illustrates a front view of a preferred exemplary embodiment of a present invention axial engagement collar (AEC) with top half of AEC removed.
Figure 64:
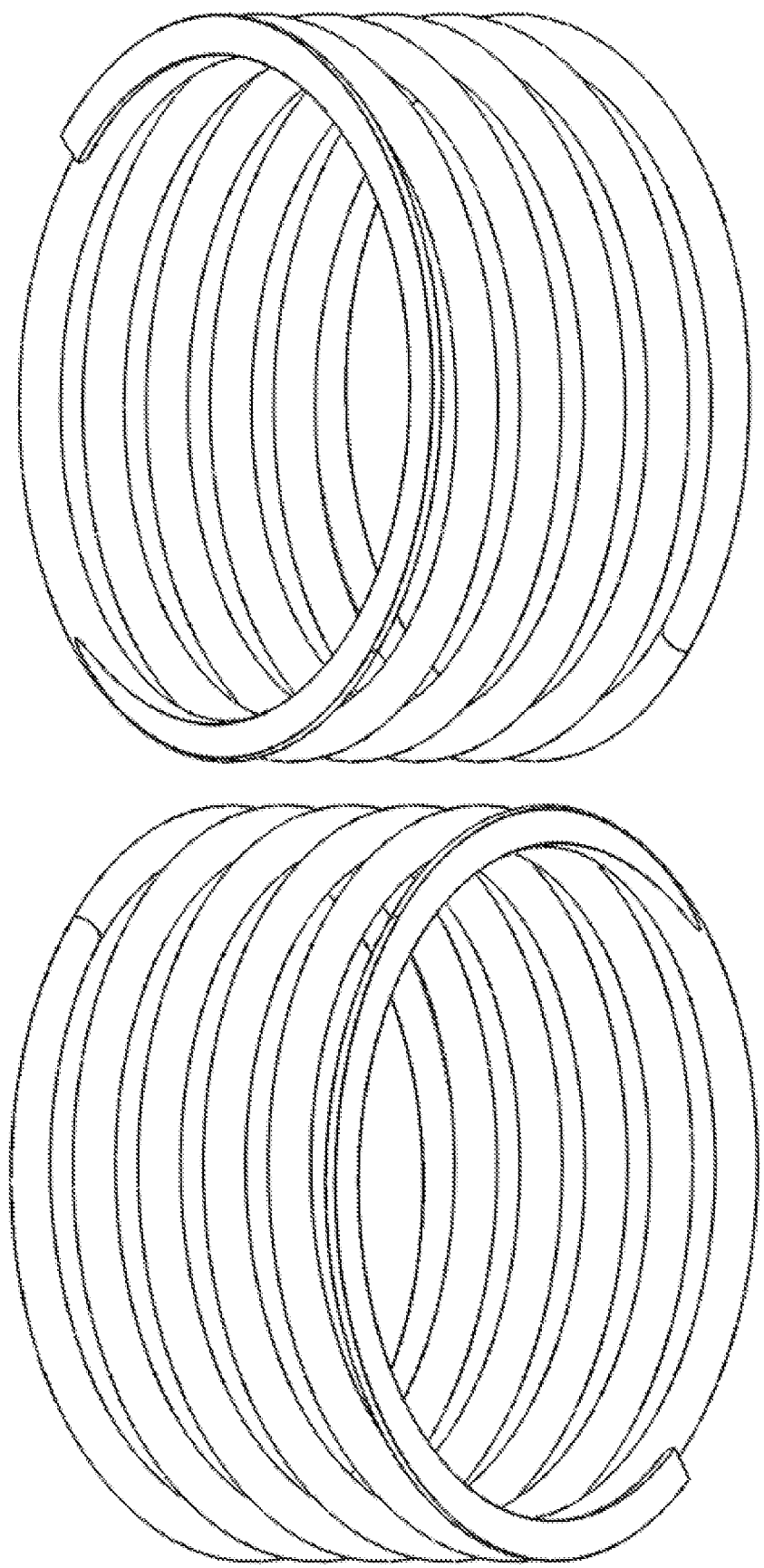
FIG. 64 illustrates bottom left side perspective and top right side perspective views of a preferred exemplary embodiment of a present invention pin tension spring (PTS) used to constrain DDP positioning within the AEC to maintain contact between the DDP and the TDS.

While the present invention system may be applied to a variety of application contexts (including but not limited to level winders and piston pumping systems), a general depiction of the disclosed auto-reversing driveshaft and its major components is generally depicted in FIG. 17 (1700)-FIG. 64 (6400).

Figure 48:
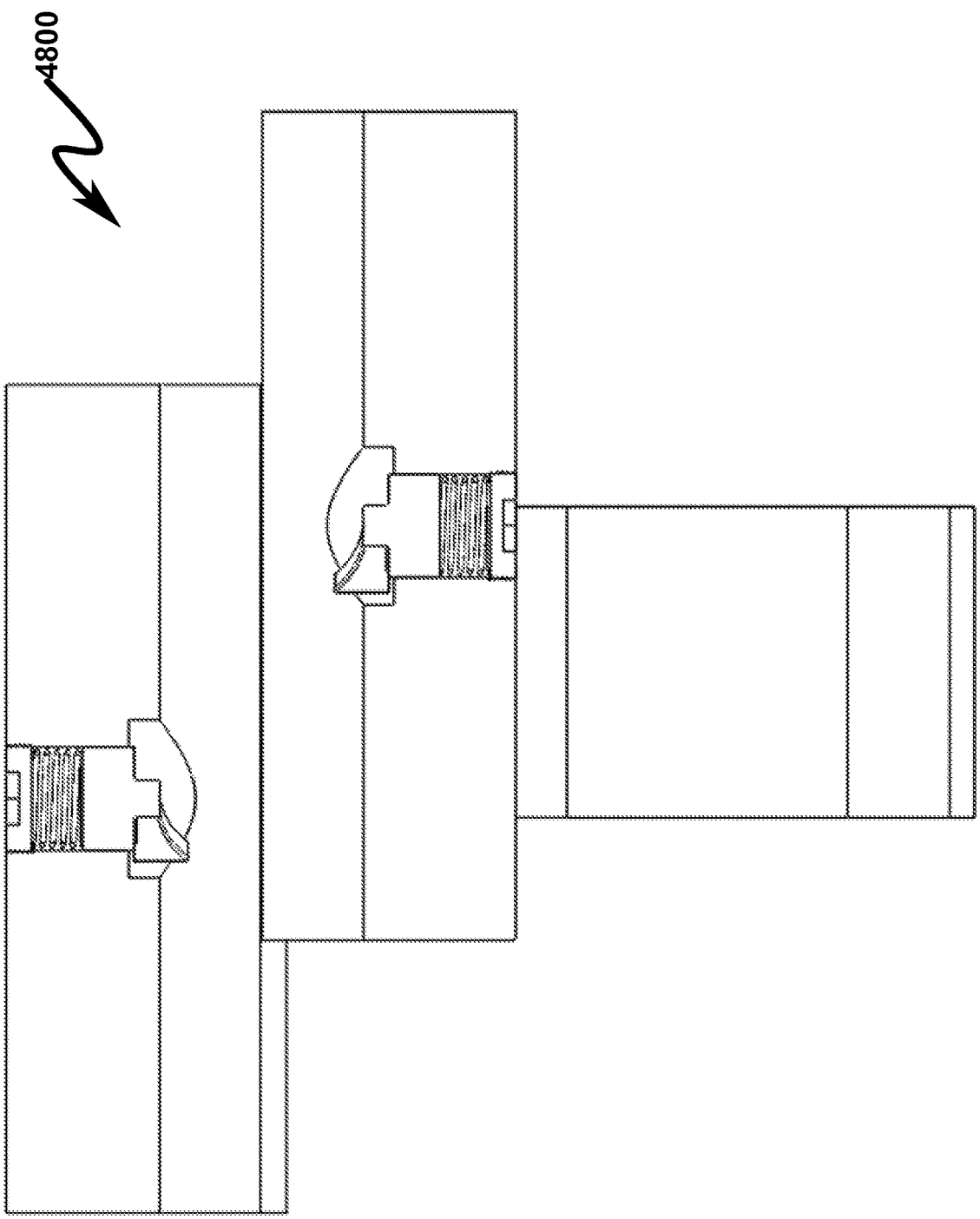
FIG. 48 illustrates a top front right side section view of a preferred exemplary embodiment of a present invention axial engagement collar (AEC) with AEC fully extended to the rear.
Figure 51:
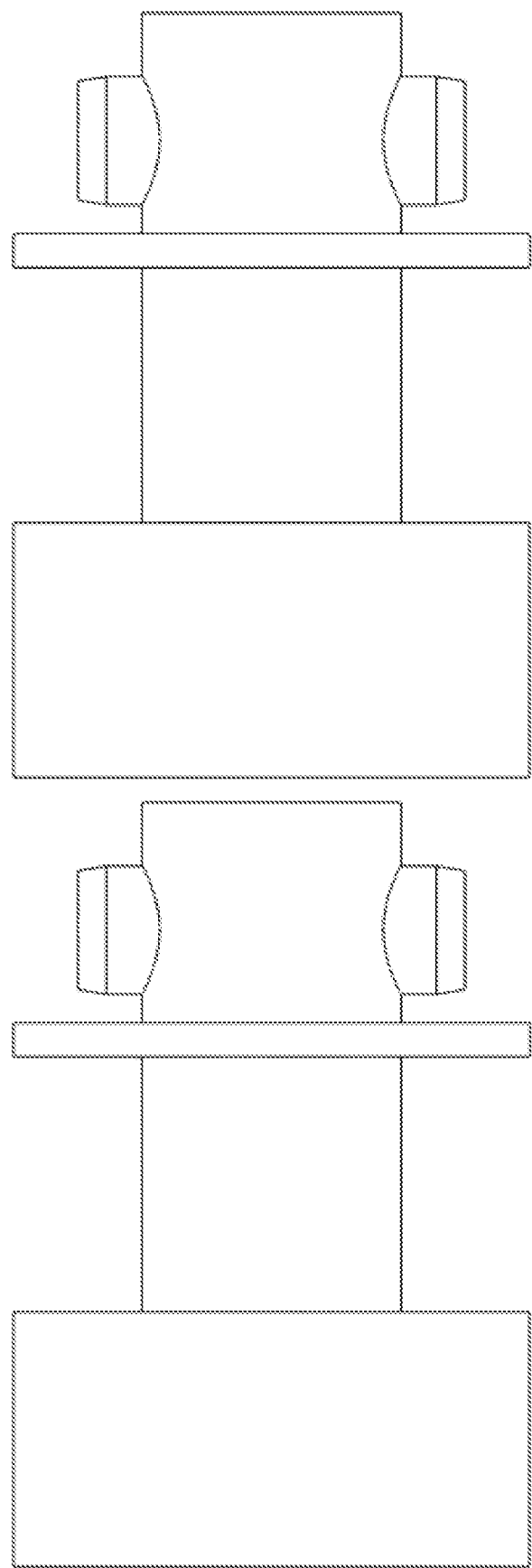
FIG. 51 illustrates a top and bottom views of a preferred exemplary embodiment of a present invention axial slotted strap (ASS) used to couple the AEC to the MDP.

Particular attention should be given to the construction and operation of the axial engagement collar (AEC) is provided in FIG. 17 (1700)-FIG. 48 (4800). Here it can be seen that the AEC construction is configured to allow the DDP to engage the TDS while allowing the separate AEC half-sections to independently travers a longitudinal axis of the TDS while simultaneously mechanically coupling the AEC half-sections to a motion driver platform (MDP) that serves to transmit force along the longitudinal axis of the TDS to/from the driveshaft system.

Axial Engagement Collar (AEC) Detail (1700)-(6400)

Figure 25:
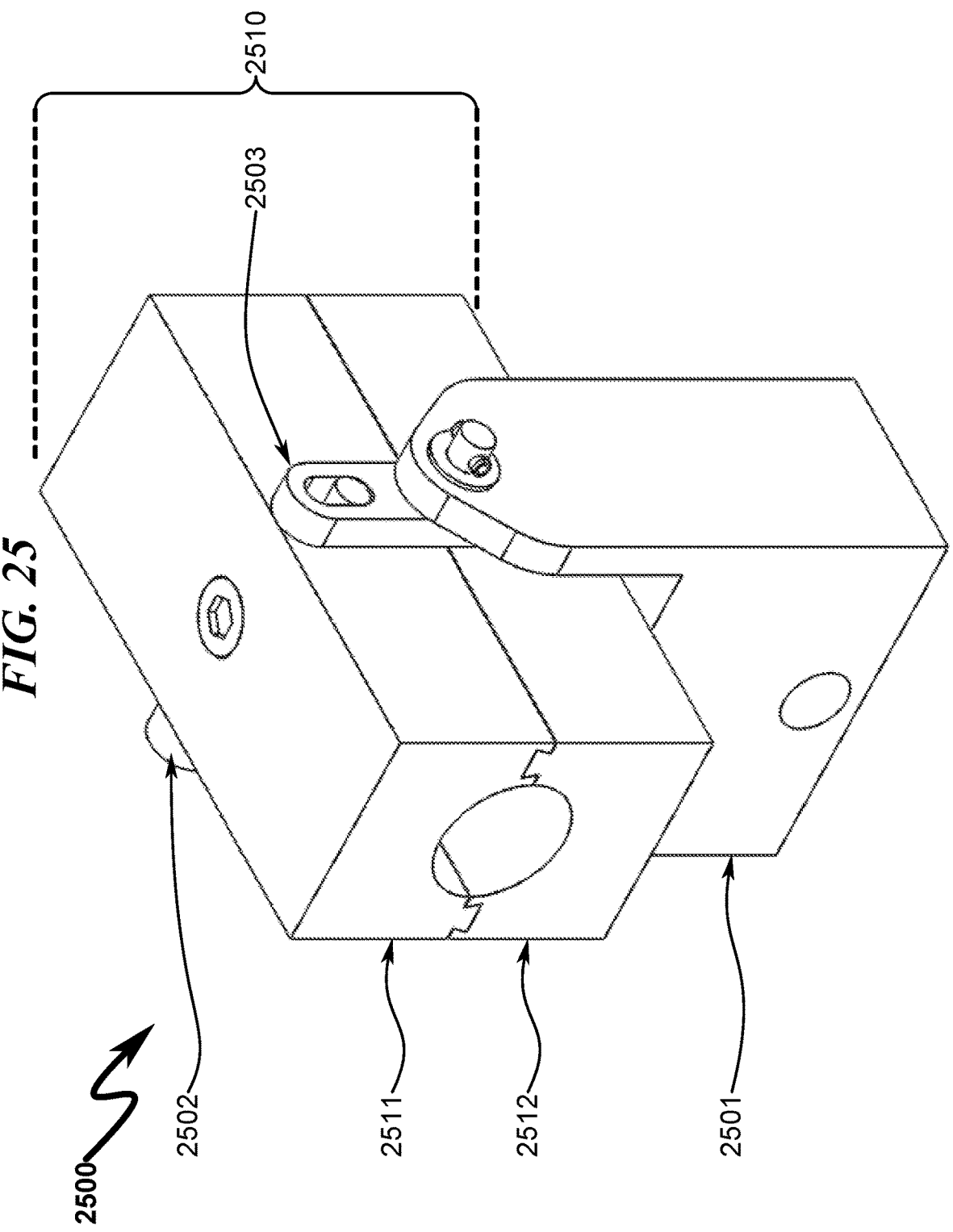
FIG. 25 illustrates a top front right side perspective view of a preferred exemplary embodiment of a present invention axial engagement collar (AEC)
Figure 26:
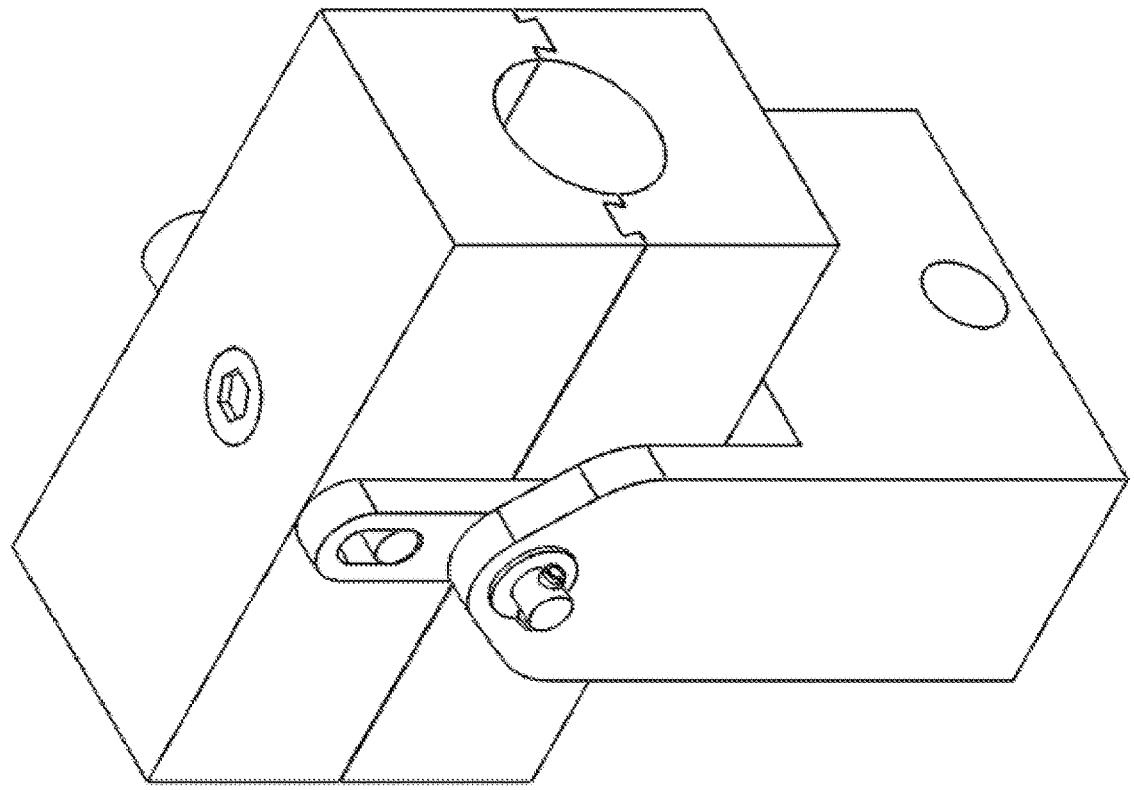
FIG. 26 illustrates a top rear right side perspective view of a preferred exemplary embodiment of a present invention axial engagement collar (AEC)
Figure 27:
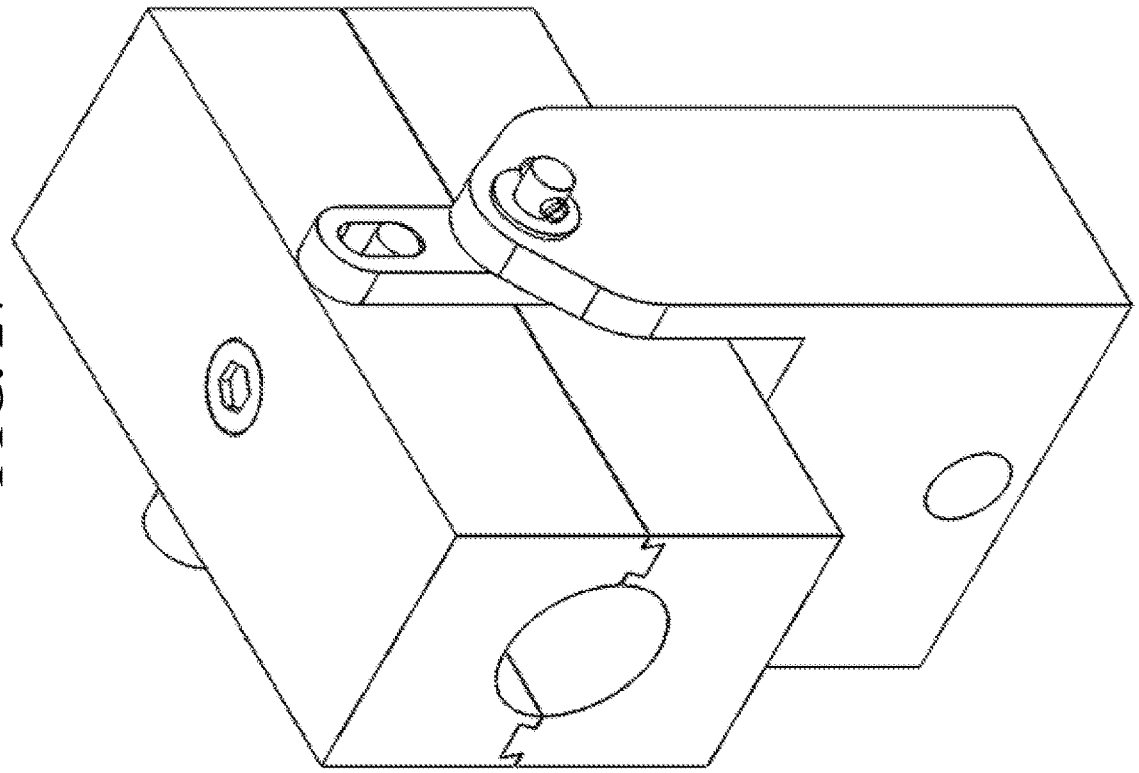
FIG. 27 illustrates a top rear left side perspective view of a preferred exemplary embodiment of a present invention axial engagement collar (AEC)
Figure 28:
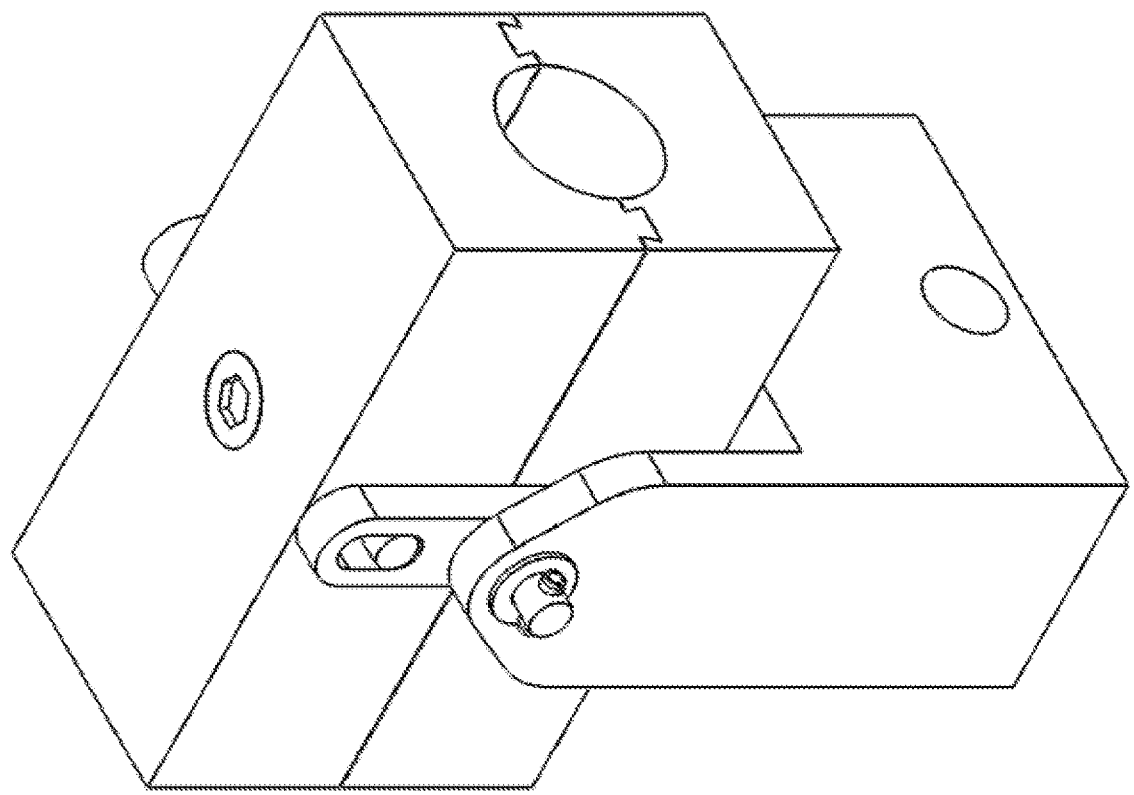
FIG. 28 illustrates a top front left side perspective view of a preferred exemplary embodiment of a present invention axial engagement collar (AEC)
Figure 29:
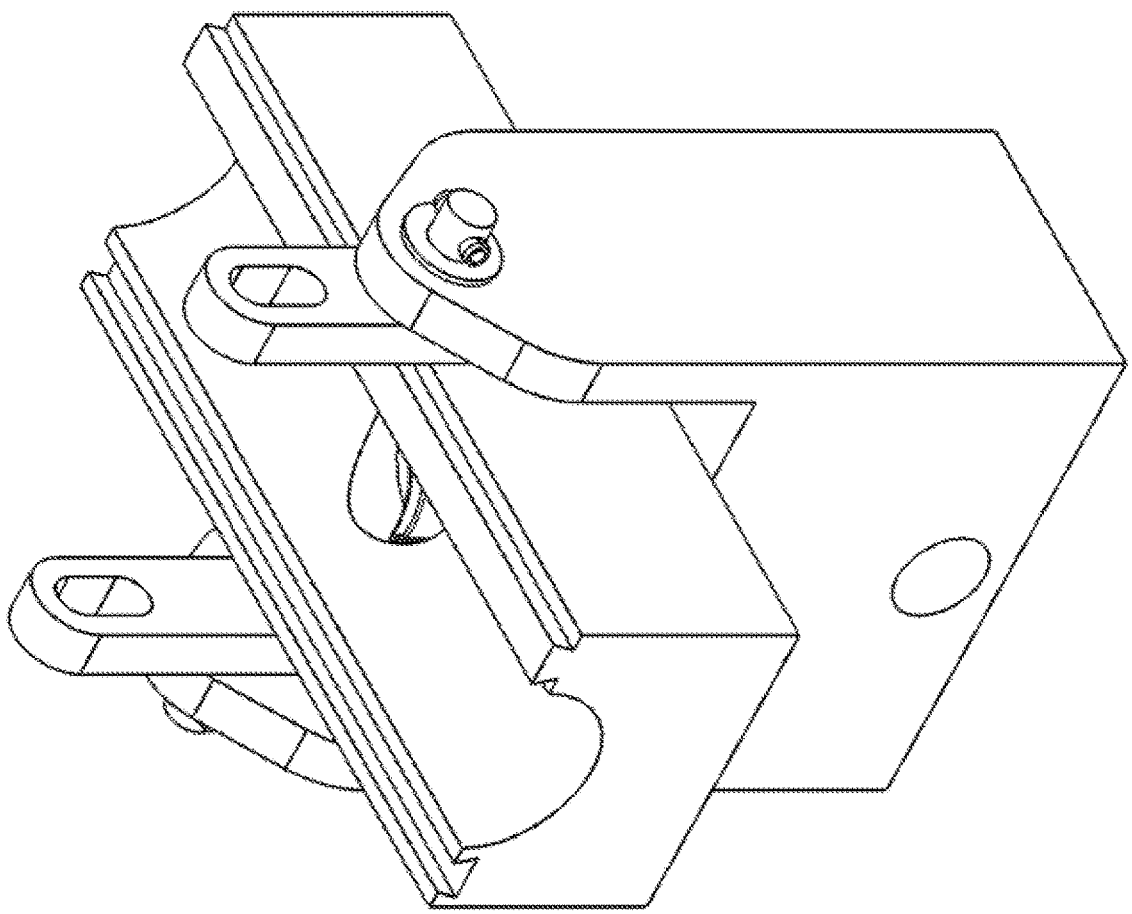
FIG. 29 illustrates a top front right side perspective view of a preferred exemplary embodiment of a present invention axial engagement collar (AEC) with top half of AEC removed.
Figure 30:
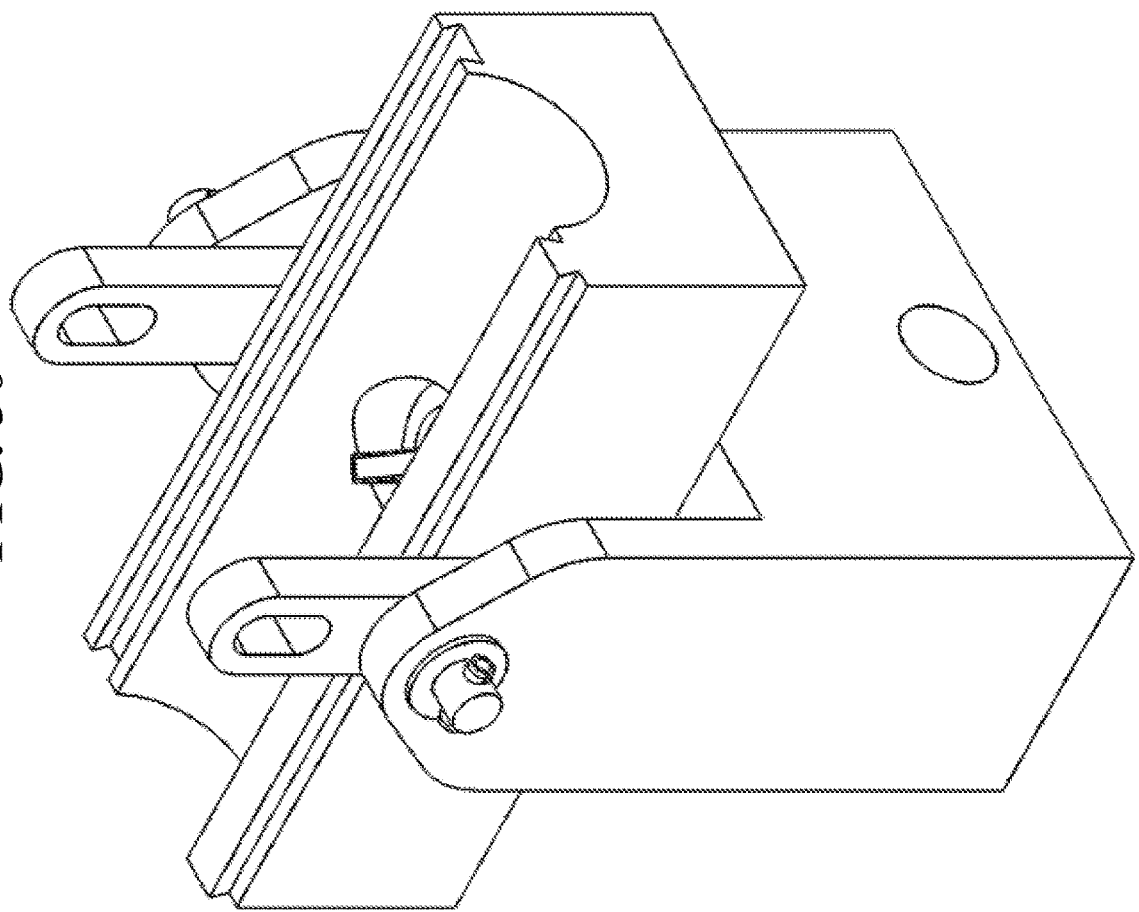
FIG. 30 illustrates a top rear right side perspective view of a preferred exemplary embodiment of a present invention axial engagement collar (AEC) with top half of AEC removed.
Figure 32:
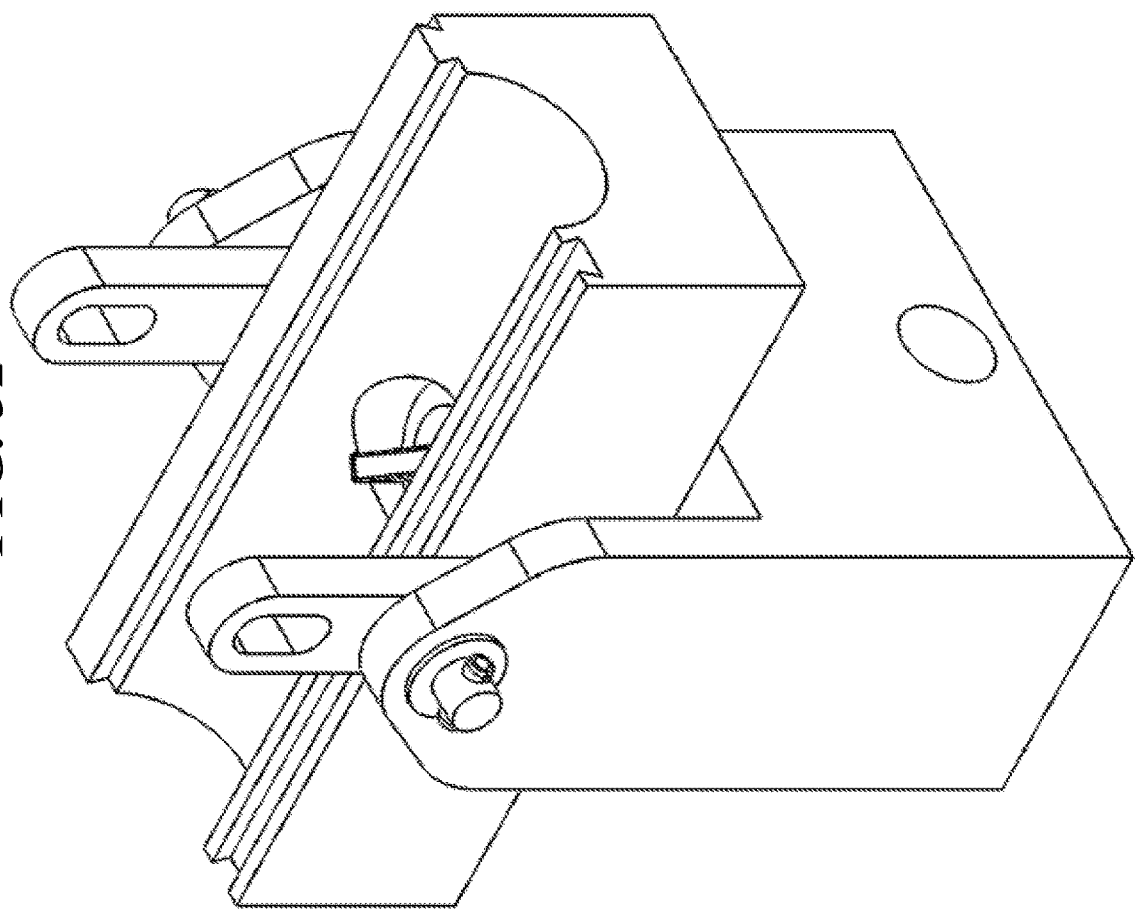
FIG. 32 illustrates a top front left side perspective view of a preferred exemplary embodiment of a present invention axial engagement collar (AEC) with top half of AEC removed.
Figure 33:
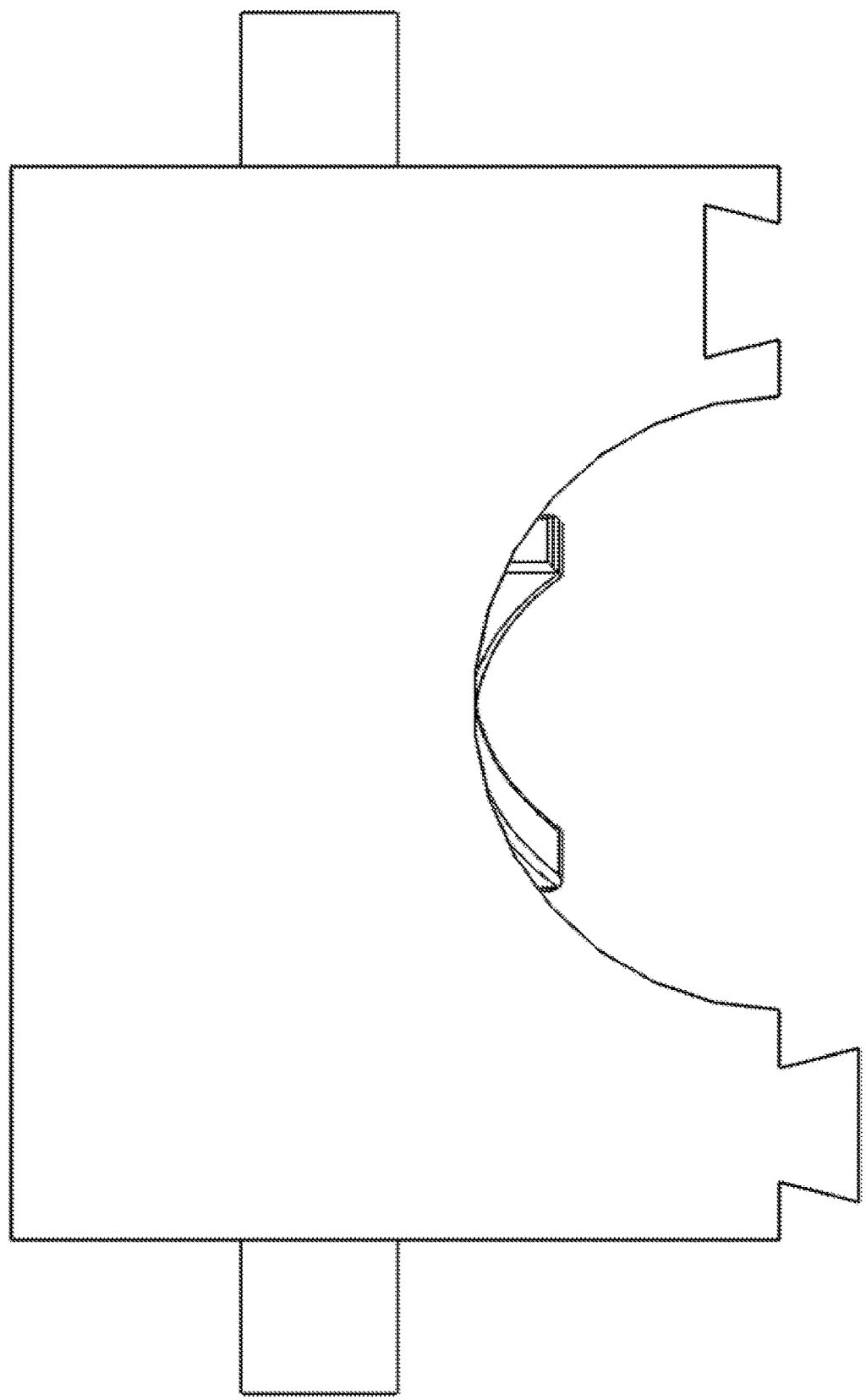
FIG. 33 illustrates a front view of a preferred exemplary embodiment of a present invention axial engagement collar (AEC) isolating the top half of the AEC.
Figure 34:
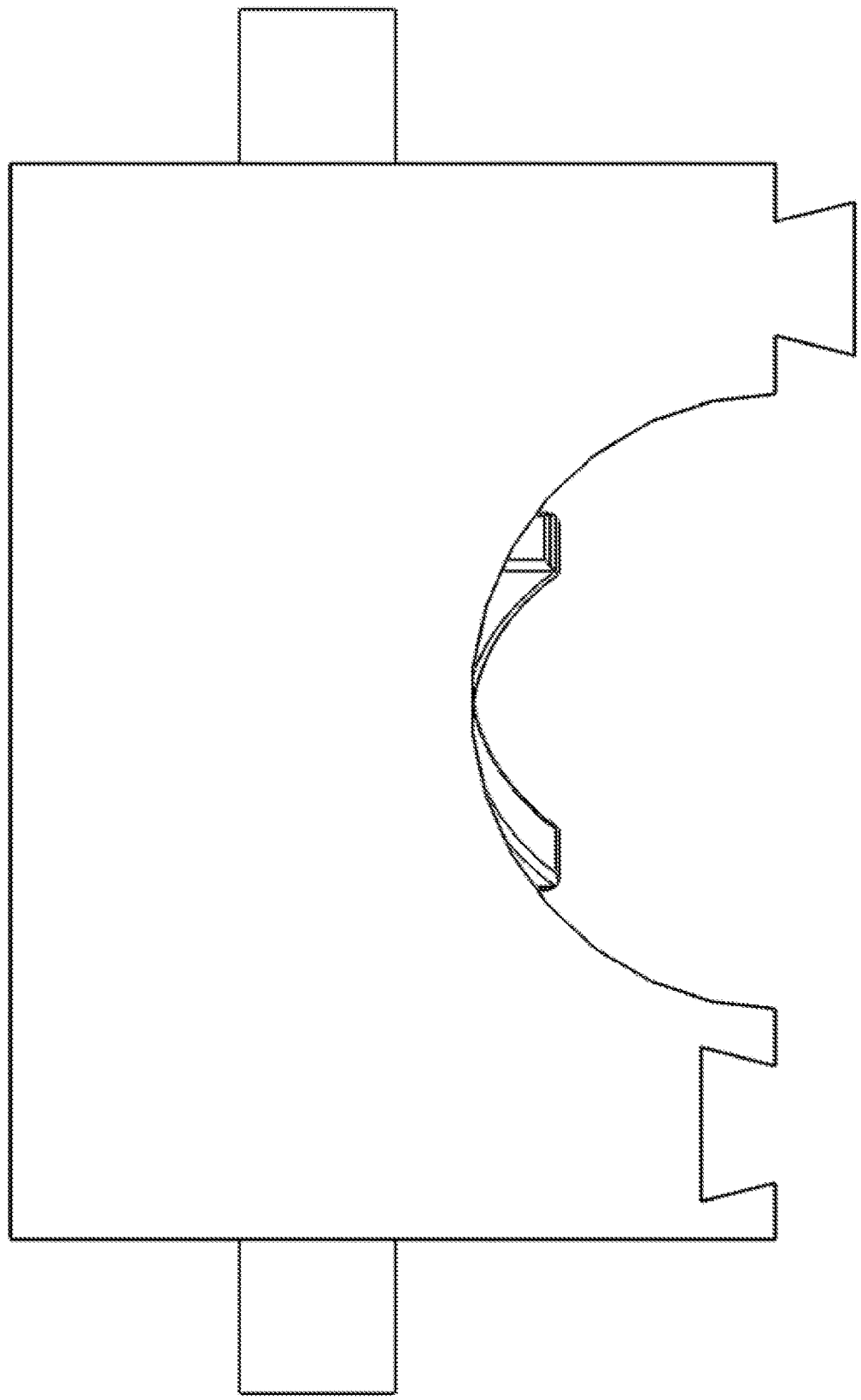
FIG. 34 illustrates a rear view of a preferred exemplary embodiment of a present invention axial engagement collar (AEC) isolating the top half of the AEC.
Figure 35:
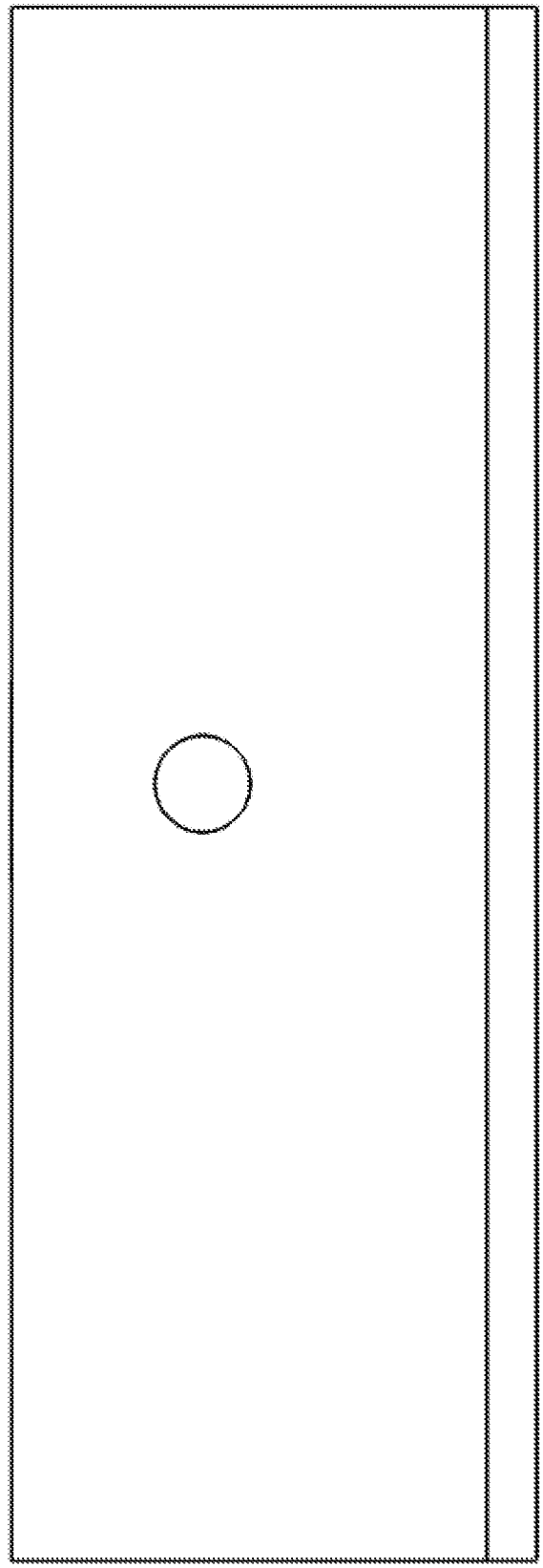
FIG. 35 illustrates a left side view of a preferred exemplary embodiment of a present invention axial engagement collar (AEC) isolating the top half of the AEC.
Figure 36:
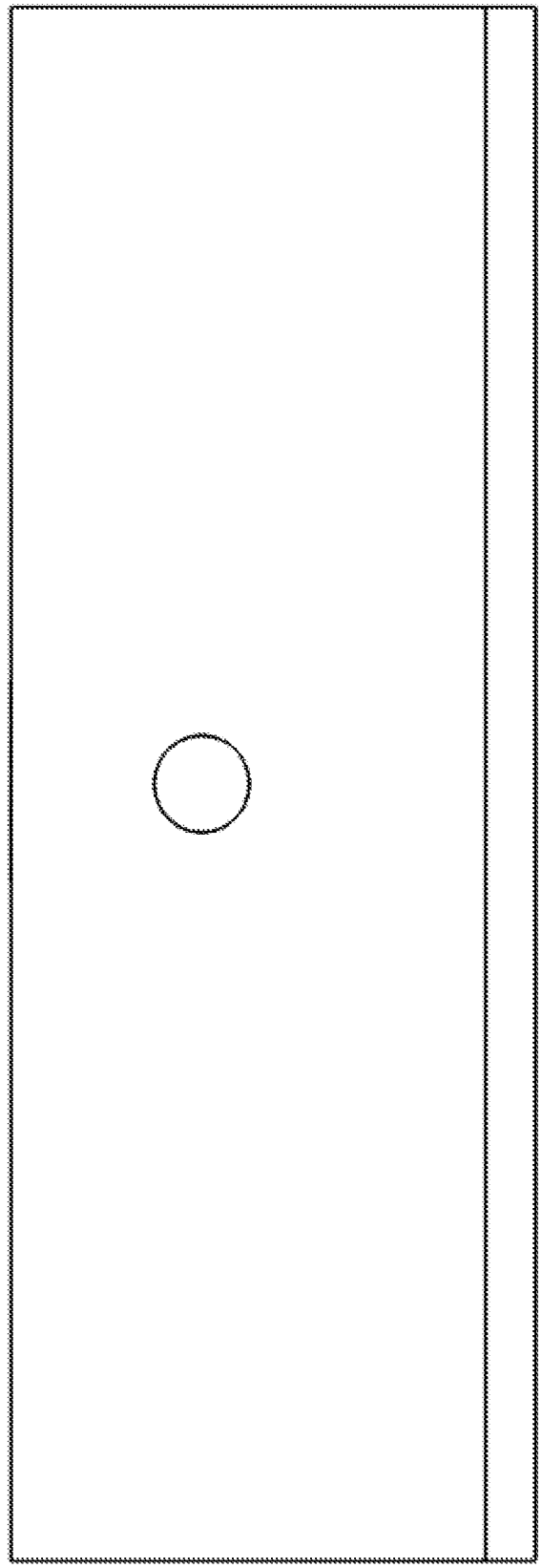
FIG. 36 illustrates a right side view of a preferred exemplary embodiment of a present invention axial engagement collar (AEC) isolating the top half of the AEC.
Figure 37:
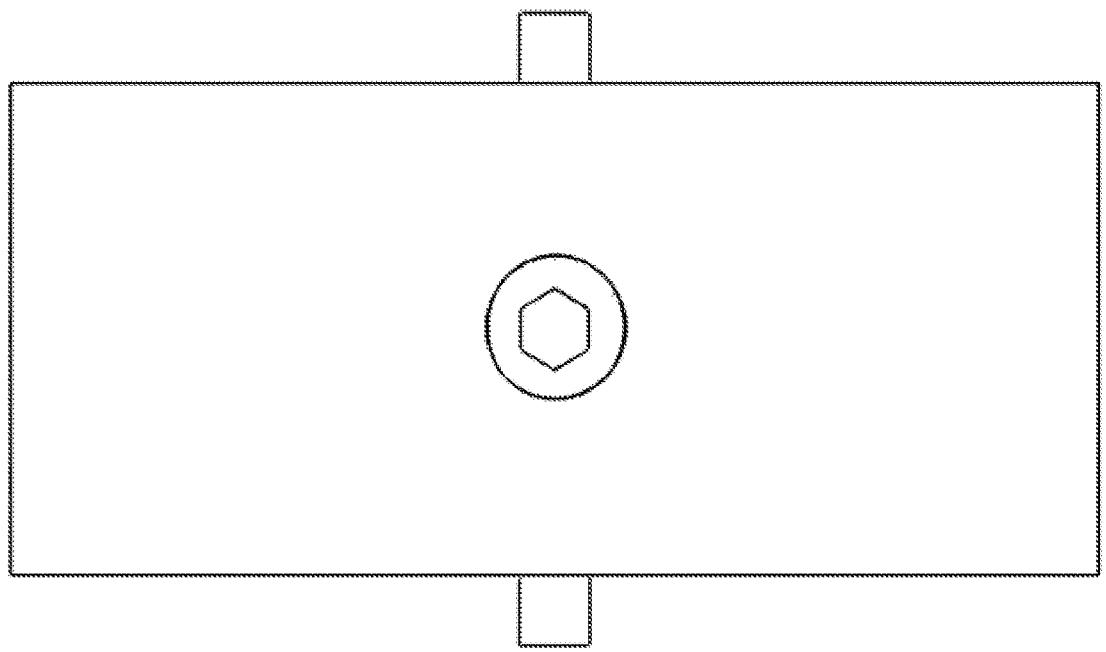
FIG. 37 illustrates a top view of a preferred exemplary embodiment of a present invention axial engagement collar (AEC) isolating the top half of the AEC.
Figure 38:
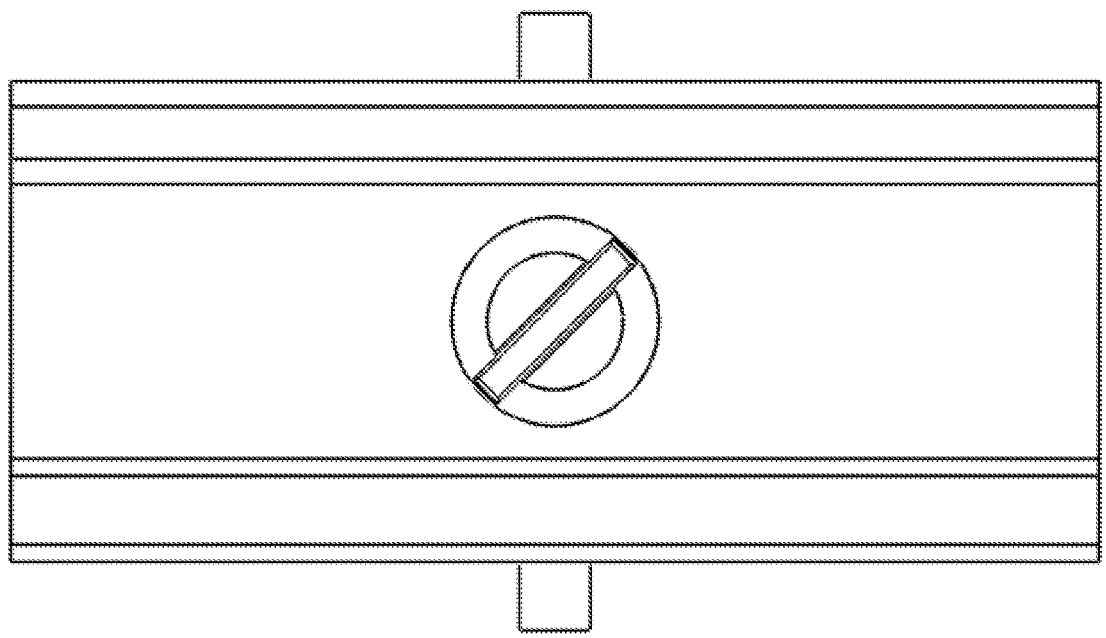
FIG. 38 illustrates a bottom view of a preferred exemplary embodiment of a present invention axial engagement collar (AEC) isolating the top half of the AEC.
Figure 39:
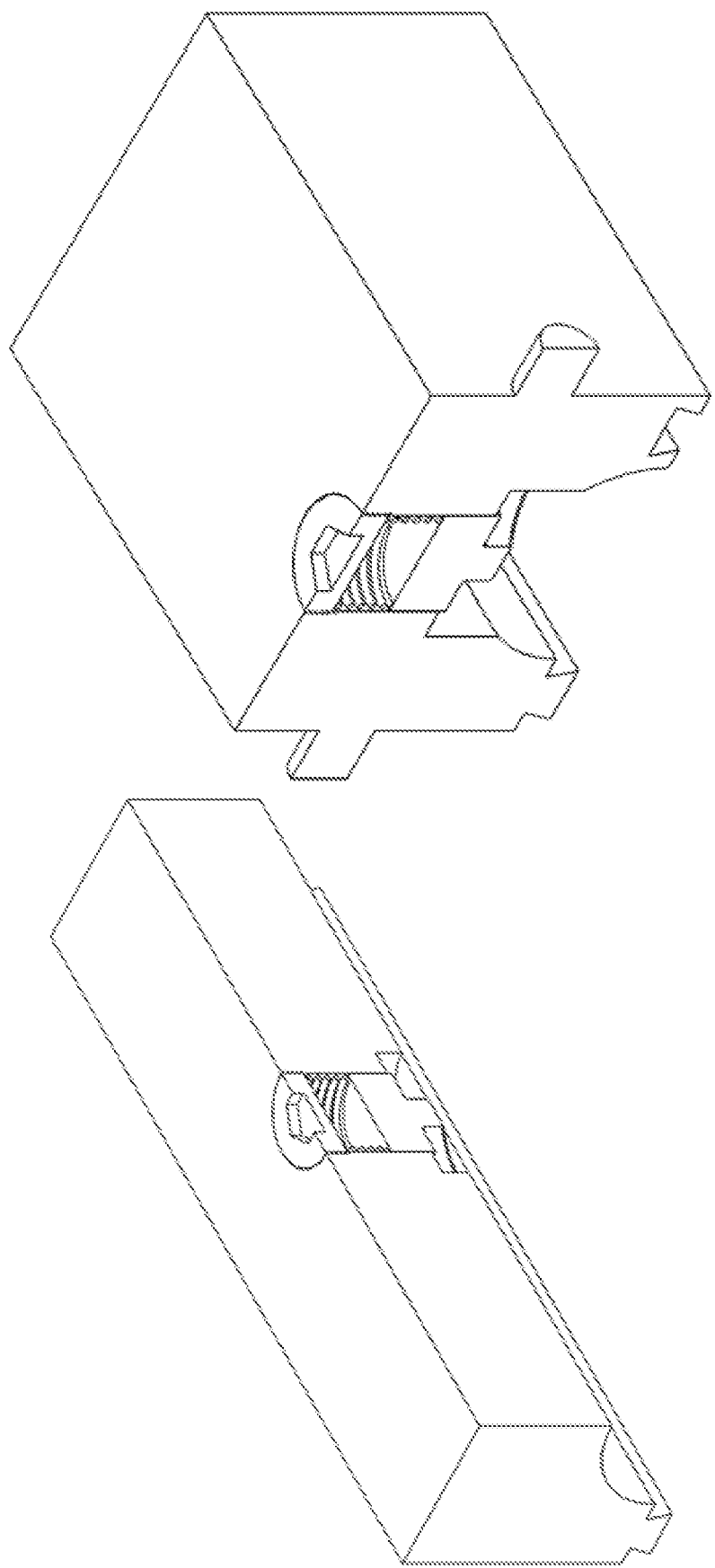
FIG. 39 illustrates right side perspective section and front side section perspective views of a preferred exemplary embodiment of a present invention axial engagement collar (AEC) isolating the top half of the AEC

Details of a preferred exemplary embodiment of the axial engagement collar (AEC) portion of the present invention are detailed in FIG. 17 (1700)-FIG. 64 (6400). The AEC depicted in these diagrams is constructed as a mirrored two-piece symmetric collar (TSC) design, although some preferred embodiments may be of unitary construction. Referring to FIG. 25 (2500), the motion driver platform (MDP) (2501) (which may be a traversing slide or other fixed driving point in the system such as a pump or other mechanism) is coupled to the AEC (2510) via the use of axial slotted straps (ASS) (2502, 2503) that mate with the MDP (2501).

Axial Engagement Collar (AEC) Assembly Detail (4000)

Figure 40:
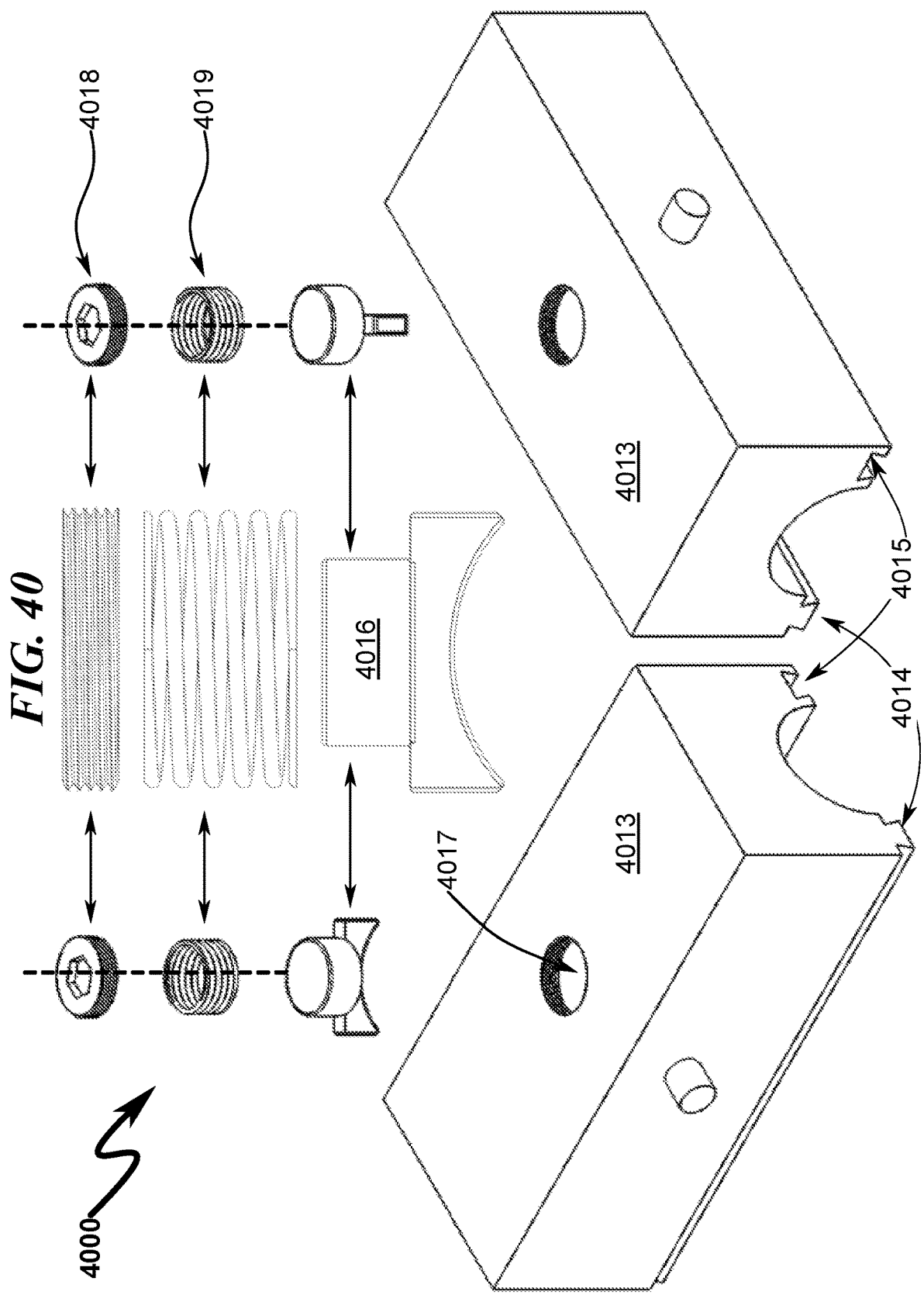
FIG. 40 illustrates a left top front and right top front perspective assembly views of a preferred exemplary embodiment of a present invention axial engagement collar (AEC) isolating the top half of the AEC.

FIG. 40 (4000) illustrates an assembly view of a top half-shell (THS) of an AEC in which the AEC is configured as a mirrored two-piece symmetric collar (TSC) (4013) design incorporating dovetail joints (4014, 4015) at the interface between the mirroring pairs of the first-half shell (FHS) and second half-shell (SHS) that comprise the AEC. Here it can be seen that the half-shell body (HSB) (4013) comprises a DDP (4016) constrained within a cylinder bore (4017) of the HSB (4013). Some preferred embodiments may incorporate a threaded plug cap (TPC) (4018) to retain the DDP (4016) within the AEC and in some circumstances may include a pin tension spring (PTS) (4019) to engage the DDP and force contact between the DDP and the TDS.

AEC Movement Detail (4100)-(4800)

Figure 41:
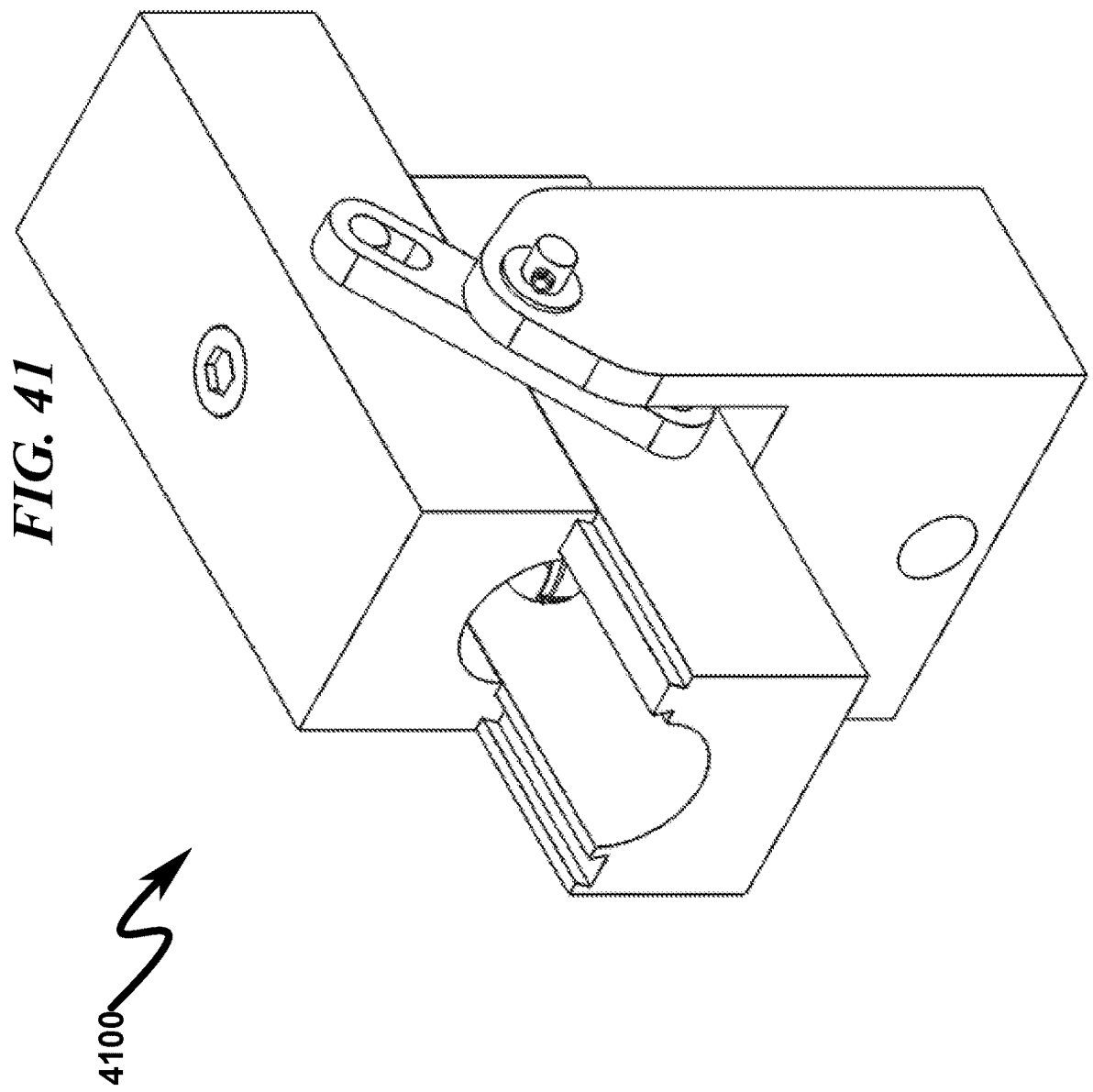
FIG. 41 illustrates a top front right side perspective view of a preferred exemplary embodiment of a present invention axial engagement collar (AEC) with AEC fully extended to the front.
Figure 42:
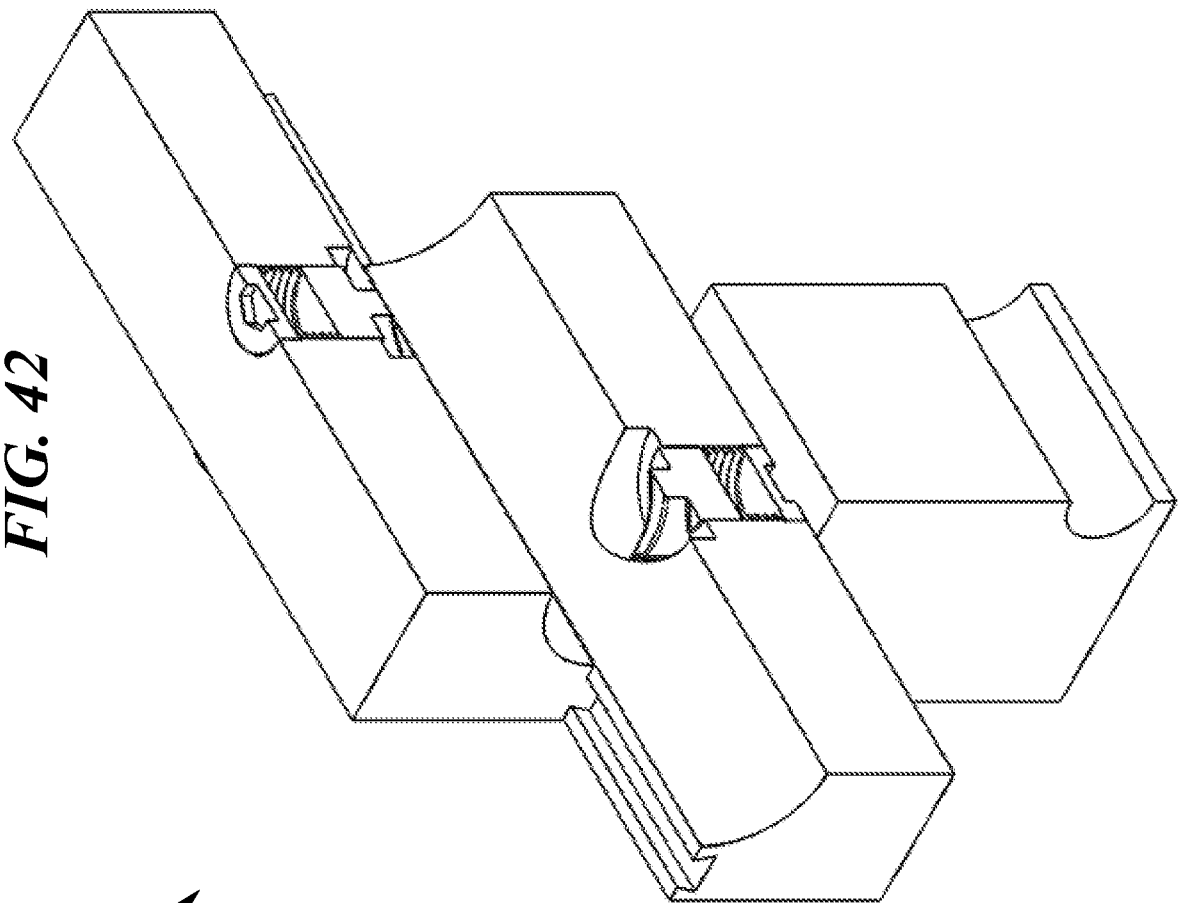
FIG. 42 illustrates a top front right side perspective section view of a preferred exemplary embodiment of a present invention axial engagement collar (AEC) with AEC fully extended to the front.
Figure 43:
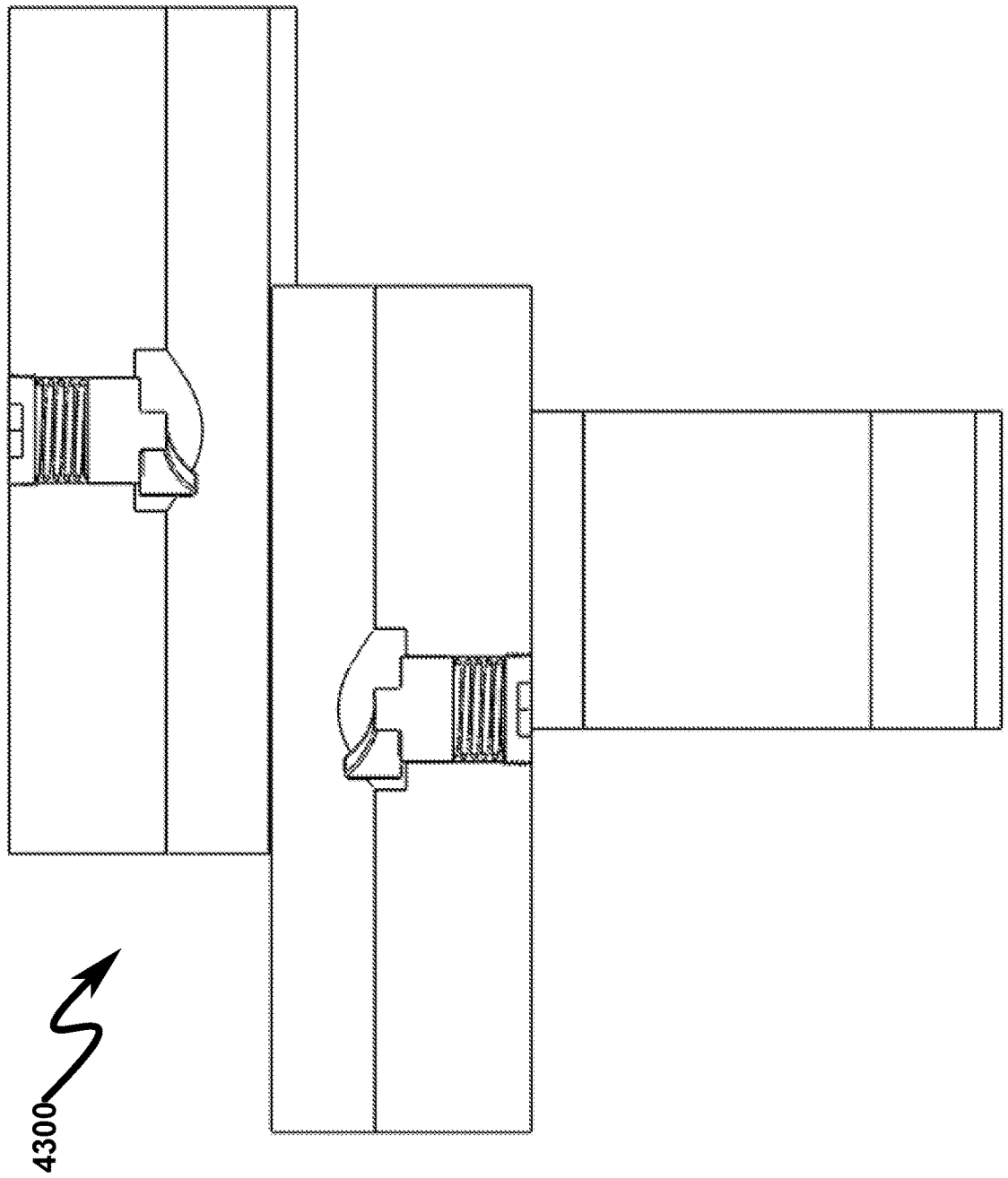
FIG. 43 illustrates a top front right side section view of a preferred exemplary embodiment of a present invention axial engagement collar (AEC) with AEC fully extended to the front.
Figure 44:
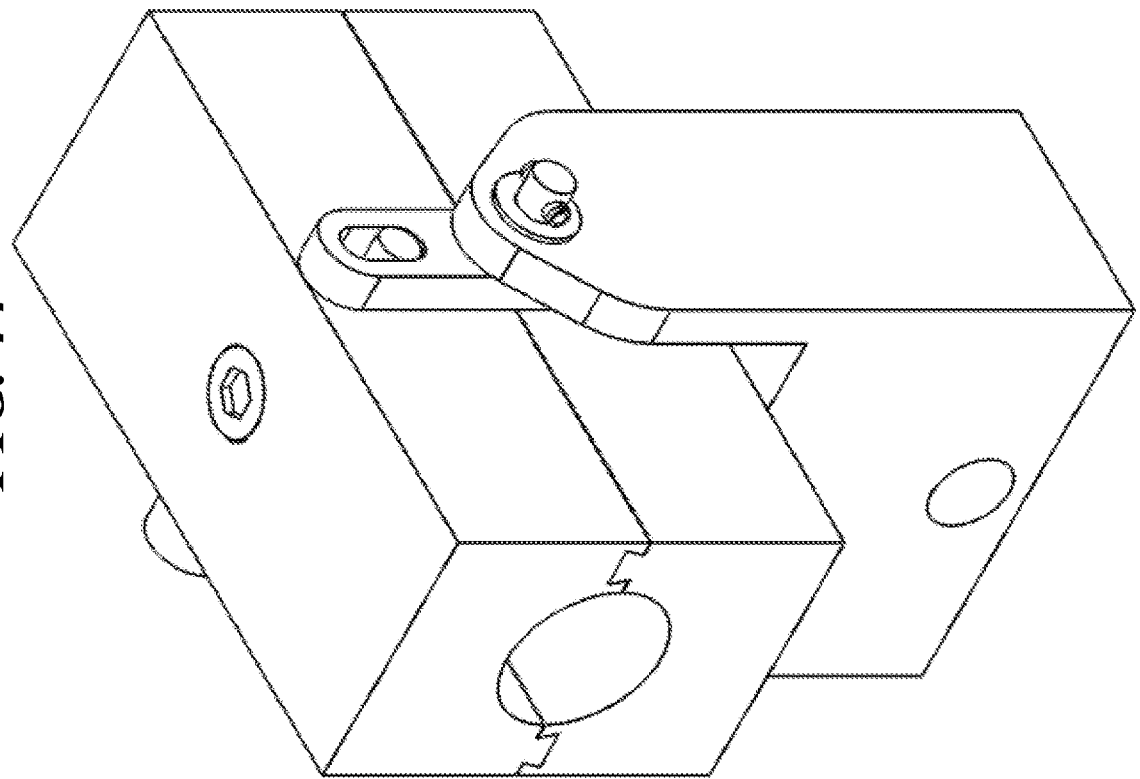
FIG. 44 illustrates a top front right side perspective view of a preferred exemplary embodiment of a present invention axial engagement collar (AEC) with AEC neutrally positioned.
Figure 45:
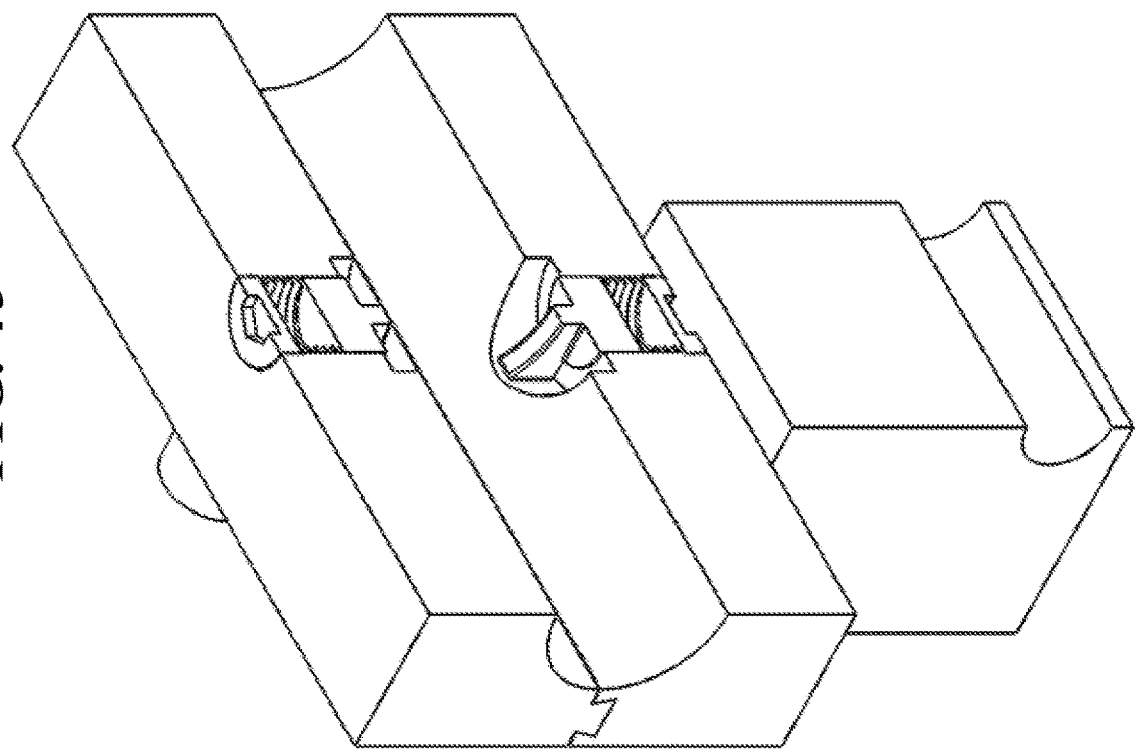
FIG. 45 illustrates a top front right side perspective section view of a preferred exemplary embodiment of a present invention axial engagement collar (AEC) with AEC neutrally positioned.
Figure 46:
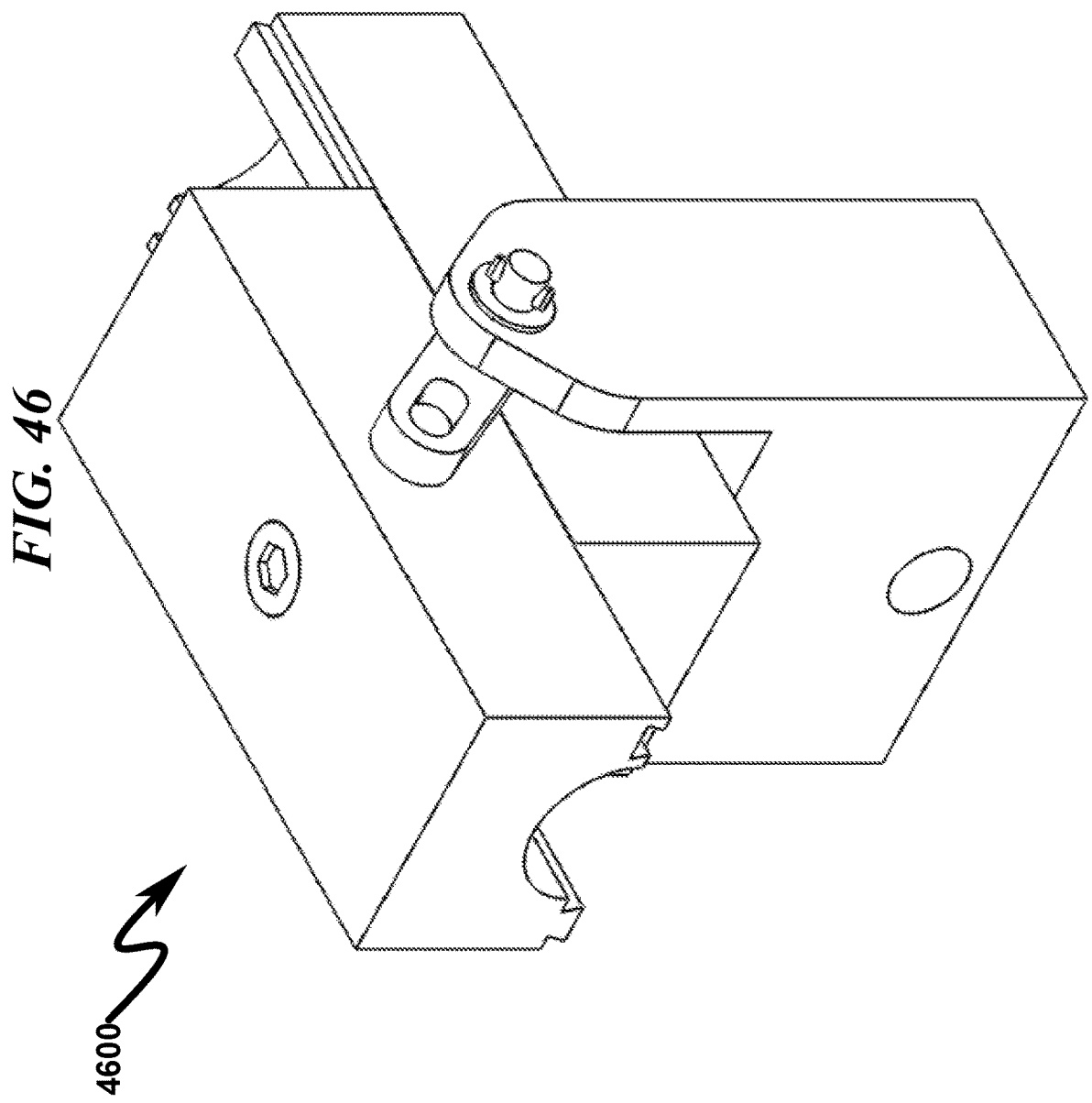
FIG. 46 illustrates a top front right side perspective view of a preferred exemplary embodiment of a present invention axial engagement collar (AEC) with AEC fully extended to the rear.
Figure 47:
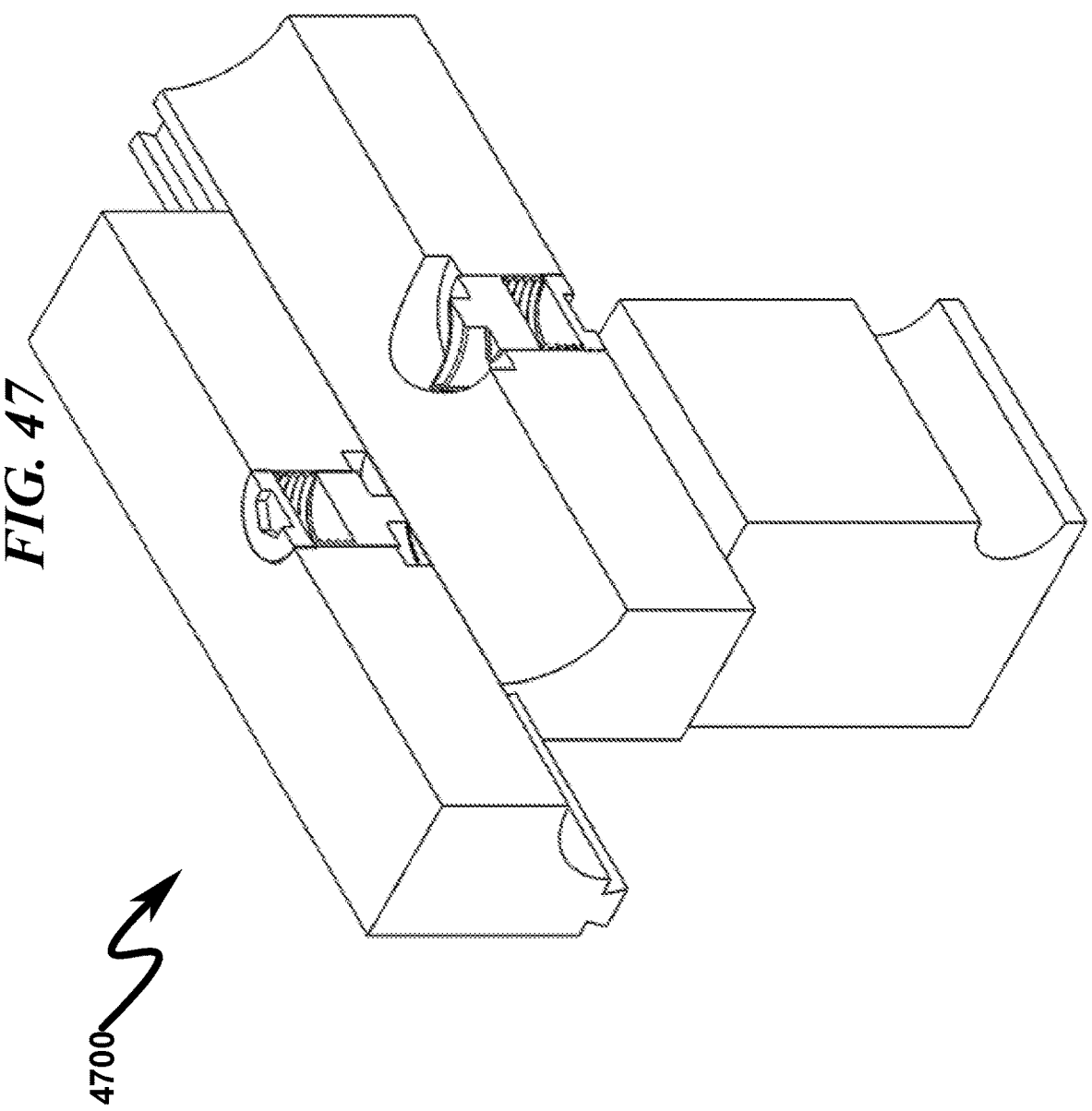
FIG. 47 illustrates a top front right side perspective section view of a preferred exemplary embodiment of a present invention axial engagement collar (AEC) with AEC fully extended to the rear.

FIG. 41 (4100)-FIG. 48 (4800) provide detail on the relative movements of the AEC as it the TDS traverses through the central core of the AEC. In FIG. 41 (4100)-FIG. 43 (4300) it can be seen that the AEC FHS is fully extended to the front and the SHS is fully extended to the rear. FIG. 44 (4400)-FIG. 45 (4500) illustrate the AEC FHS and SHS in a neutral position. Finally, in FIG. 46 (4600)-FIG. 48 (4800) it can be seen that the AEC FHS is fully extended to the rear and the SHS is fully extended to the front.

In each of these scenarios the DDP retained within the AEC FHS is allowed to swivel perpendicular to the longitudinal axis of the TDS within a bore of the AEC allowing the DDP to maintain contact within the threaded portion of the TDS as well as maintain mechanical contact with the AEC. This allows force to be translated along the longitudinal axis of the TDS and/or the MDP to which the AEC is mechanically coupled (via the ASS in the examples provided herein).

Axial Slotted Strap (ASS) Detail (4900)-(5200)

FIG. 49 (4900)-FIG. 52 (5200) depict various views of an axial slotted strap (ASS) that is used to couple the MDP to each of the AEC FHS and SHS. One skilled in the art will recognize that the construction of these and the particular interface to the MDP may vary widely based on application context.

Dual Drive Pin (DDP) Detail (5300)-(5800)

Figure 53:
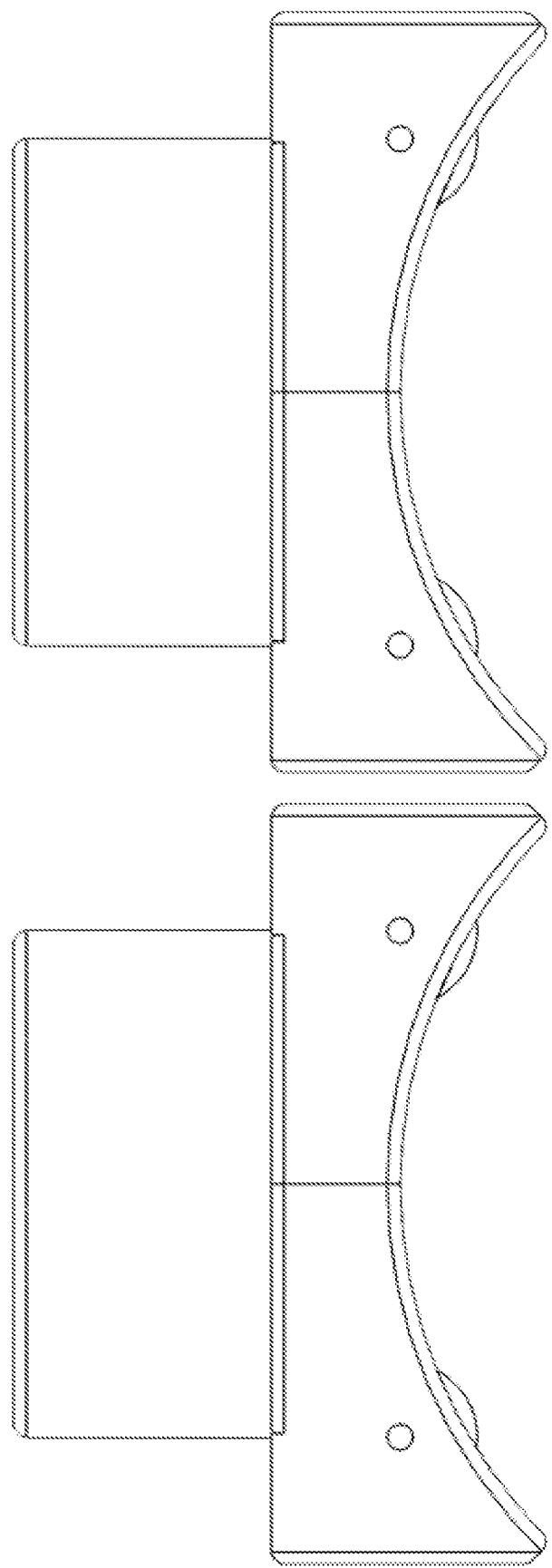
FIG. 53 illustrates front and rear views of a preferred exemplary embodiment of a present invention dual drive pin (DDP) incorporating vertical roller bearings used to couple the AEC to the TDS.
Figure 54:
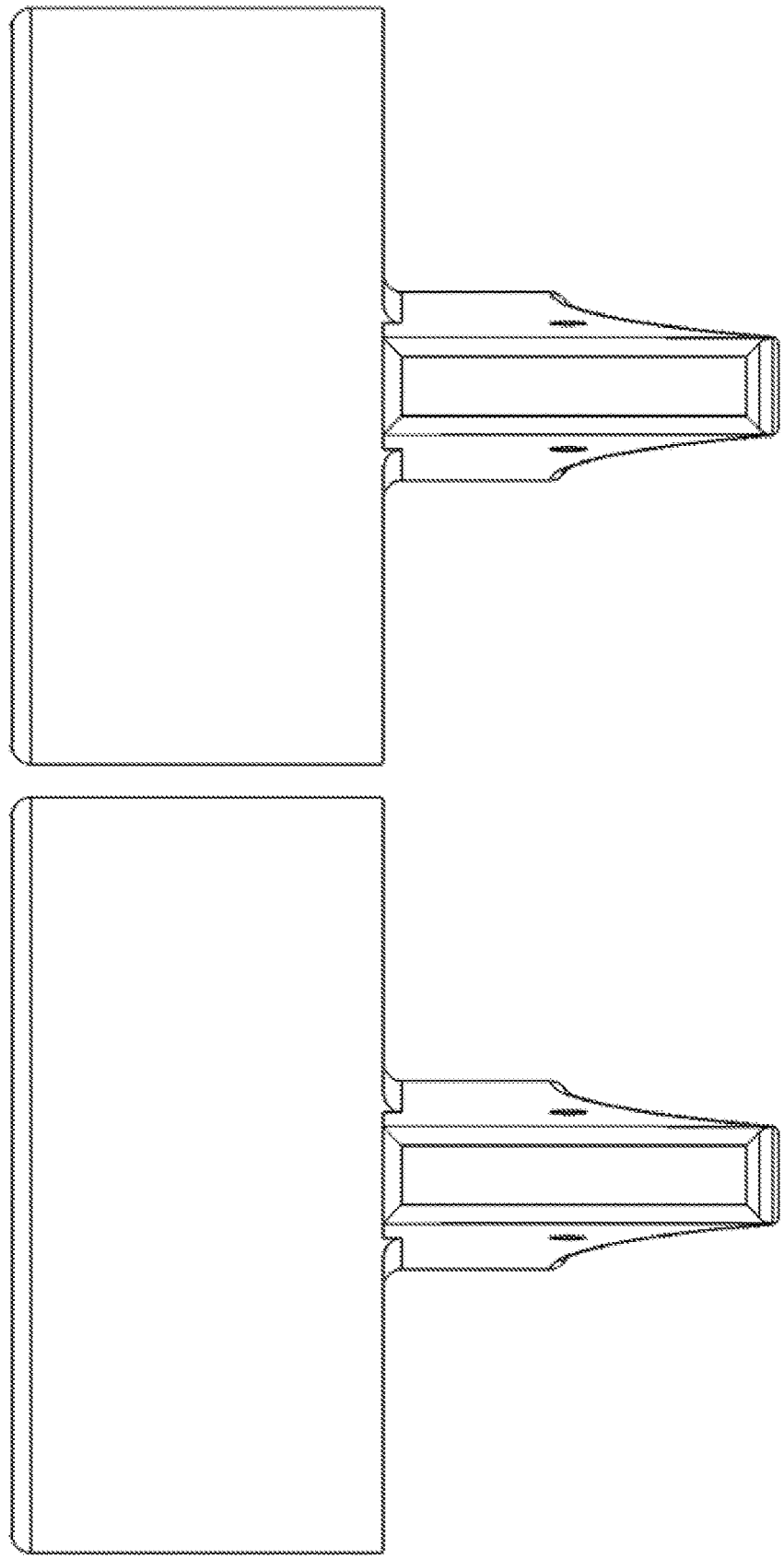
FIG. 54 illustrates left and right side views of a preferred exemplary embodiment of a present invention dual drive pin (DDP) incorporating vertical roller bearings used to couple the AEC to the TDS.
Figure 55:
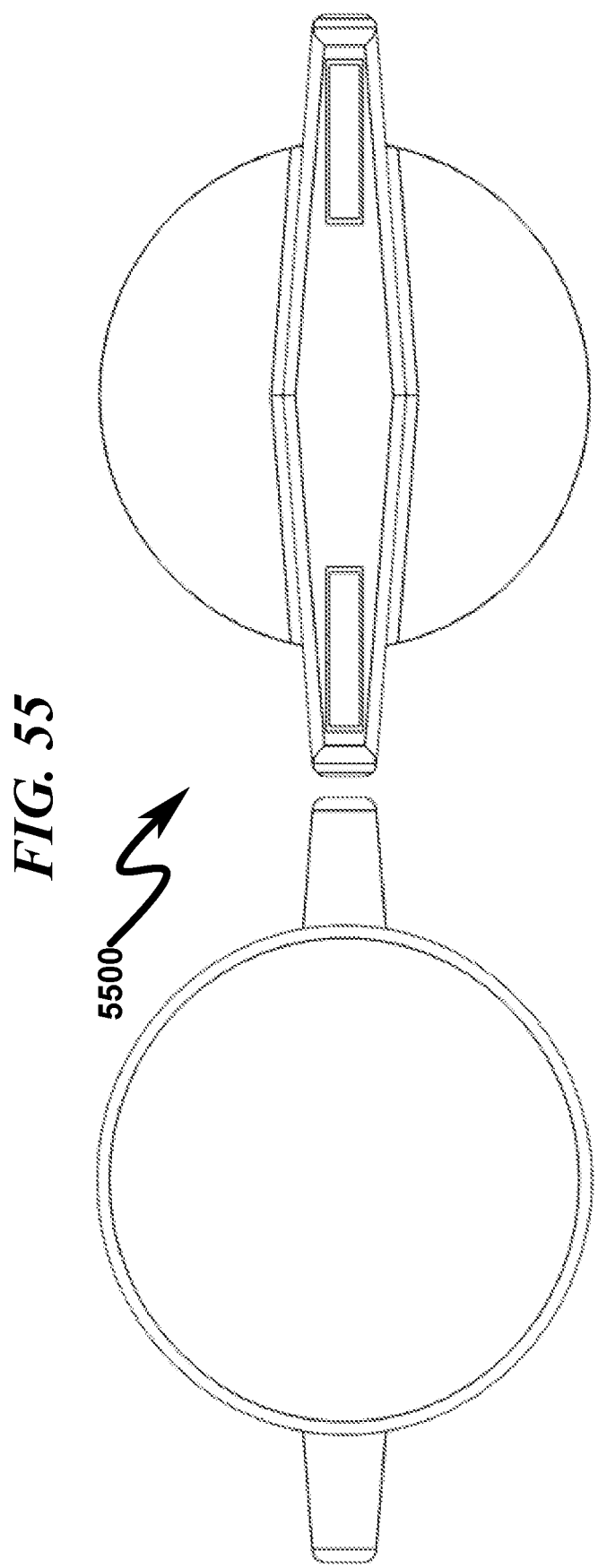
FIG. 55 illustrates a top and bottom views of a preferred exemplary embodiment of a present invention dual drive pin (DDP) incorporating vertical roller bearings used to couple the AEC to the TDS.

FIG. 53 (5300)-FIG. 58 (5800) depict various views of several exemplary embodiments of a dual drive pin (DDP) that is used to couple the AEC to the TDS. One skilled in the art will recognize that the construction of these and the particular interface to the AEC may vary widely based on application context.

Figure 57:
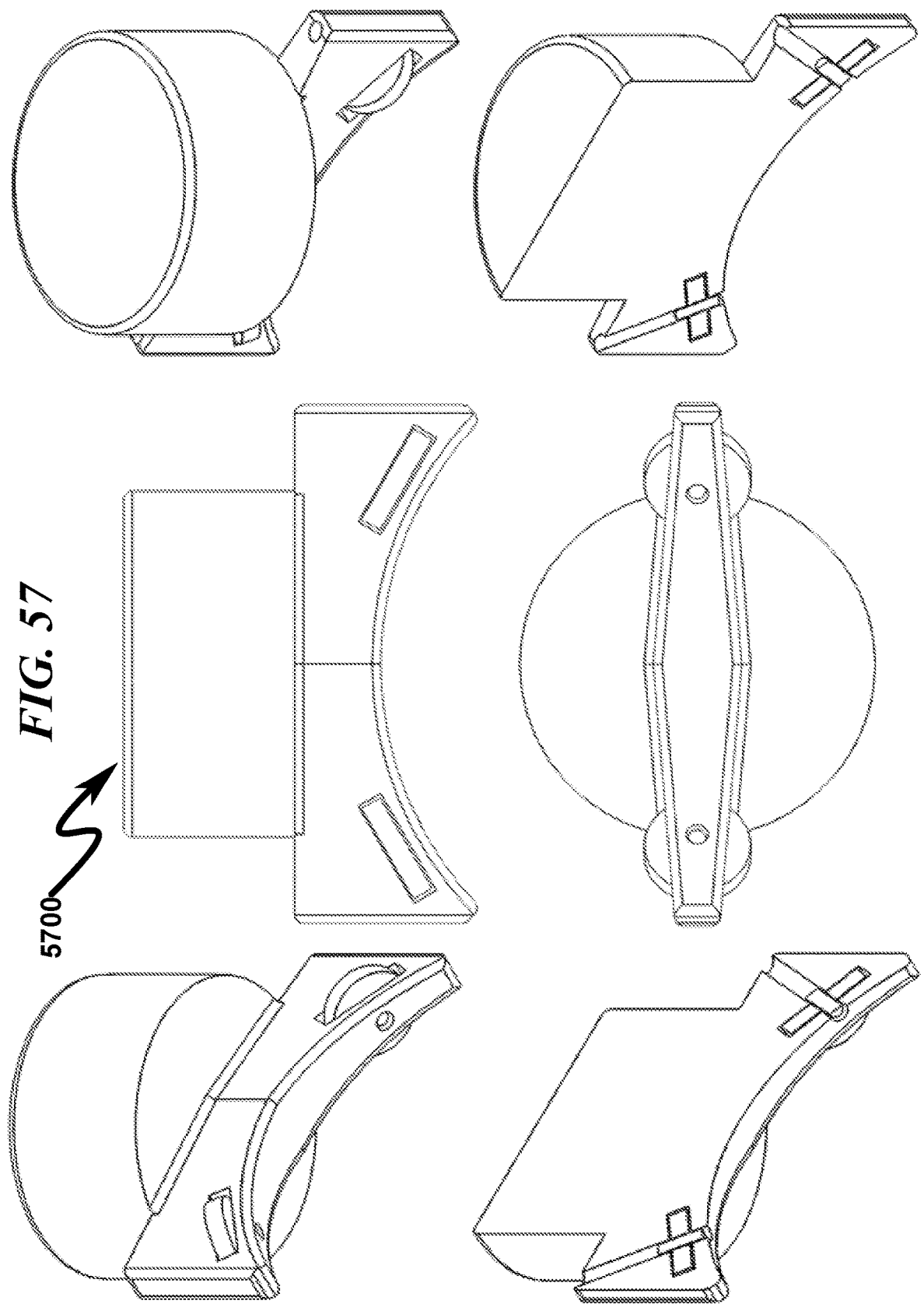
FIG. 57 illustrates bottom left side perspective, top right side perspective, front, and bottom views of a preferred exemplary embodiment of a present invention dual drive pin (DDP) incorporating horizontal roller bearings used to couple the AEC to the TDS.

The drawings shown may in some circumstances provide for bearings and/or rollers to make rolling contact between the DDP and the TDS in a variety of orientations. However, these are not necessarily required and in some circumstances may be omitted. FIG. 53 (5300)-FIG. 57 (5700) depict two variations of the DDP in which the DDP includes bearings and/or rollers in the vertical (FIG. 53 (5300)-FIG. 56 (5600)) and horizontal (FIG. 57 (5700)) directions. One skilled in the art will recognize that the present invention may incorporate combinations of these configurations as well as providing for one or more roller bearings in either the horizontal or vertical directions.

Additionally, the surface contact between the DDP and the TDS may have a variety of forms, a preferred form is shown in the drawings included herein. In this preferred embodiment, the wing extensions of the DDP are tapered to allow transitions between varying screw pitches along the TDS to occur smoothly. One skilled in the art will recognize other suitable forms of the DDS are also possible. In some circumstances these transitions may be smoothed by using a varying screw pitch at the TDS pitch transition points or by means of additional thread milling at these TDS transition points. These variations in construction are well within one of ordinary mechanical skill in the art.

FIG. 58 (5800) is provided to depict a simplified DDP that incorporates no tapering or roller bearings. One skilled in the art will recognize that there are many possible variations of this design with the only requirement being that the DDP be configured to be retained by the AEC and be fitted to slide within the threading of the TDS.

Threaded Plug Cap (TPC) Detail (5900)-(6100)

Figure 59:
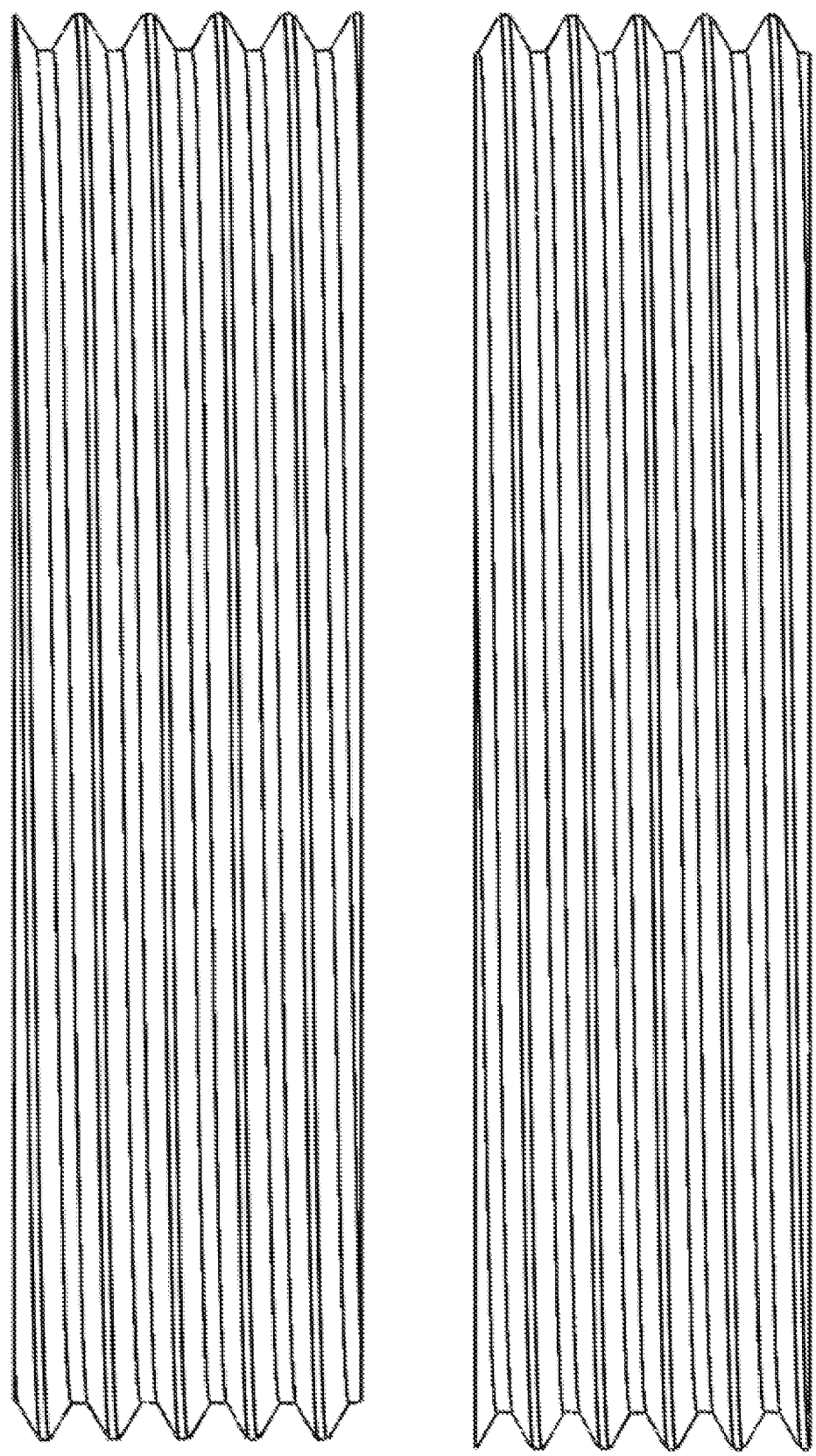
FIG. 59 illustrates front and rear views of a preferred exemplary embodiment of a present invention threaded plug cap (TPC) used to retain the DDP within the AEC.
Figure 60:
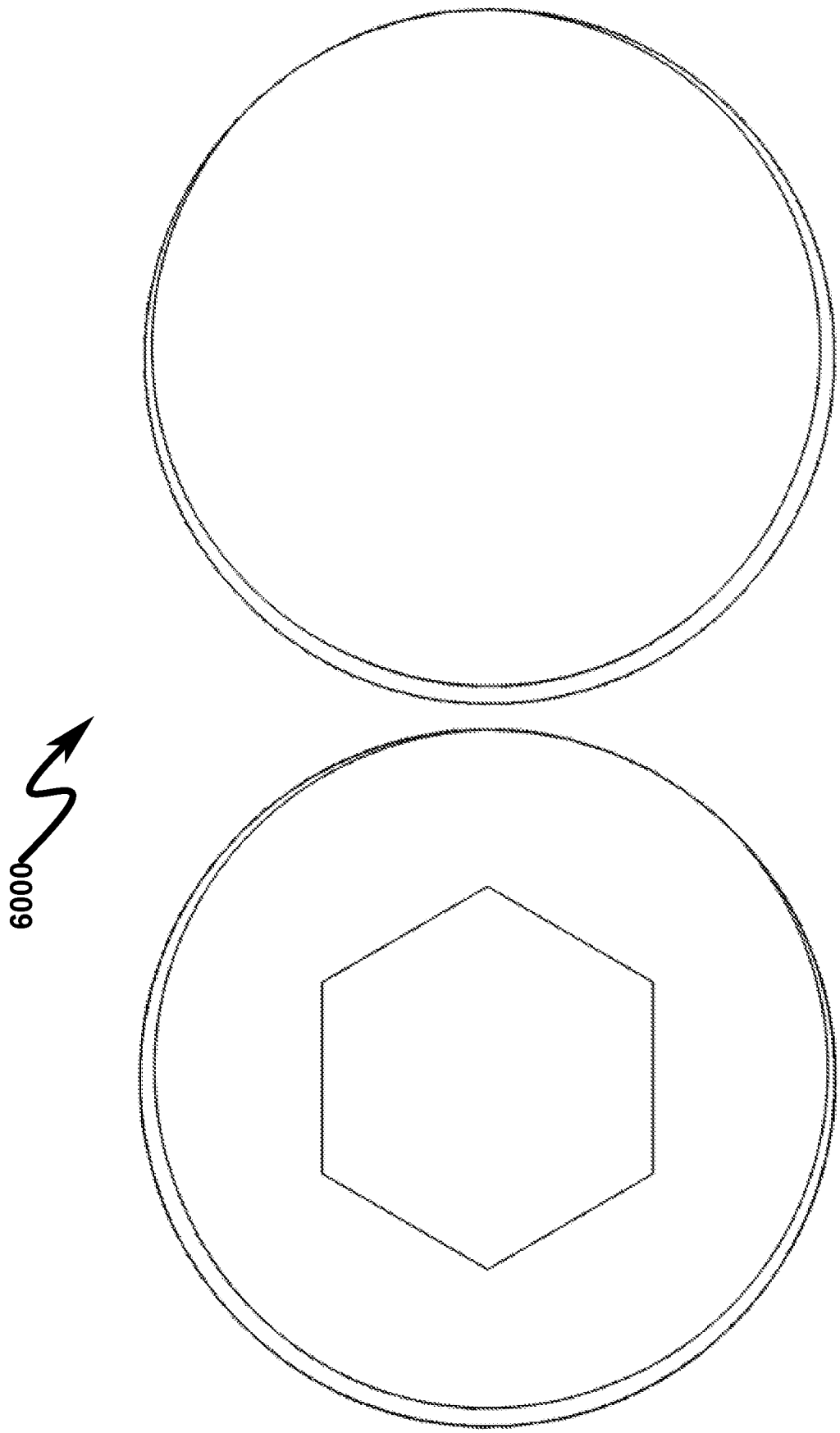
FIG. 60 illustrates a top and bottom views of a present invention threaded plug cap (TPC) used to retain the DDP within the AEC.
Figure 61:
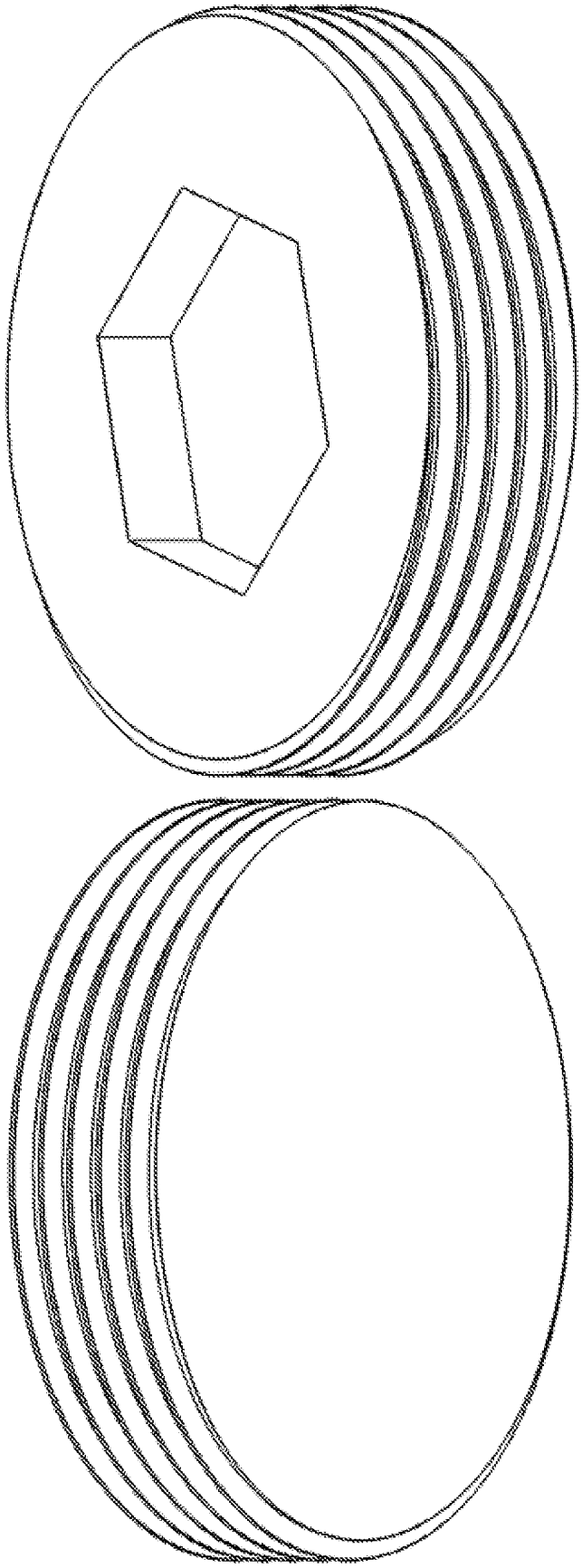
FIG. 61 illustrates bottom left side perspective and top right side perspective views of a present invention threaded plug cap (TPC) used to retain the DDP within the AEC.

FIG. 59 (5900)-FIG. 61 (6100) depict various views of a threaded plug cap (TPC) that may be used to retain the DDP within the AEC. One skilled in the art will recognize that the construction of these and the particular interface to the AEC and DDP may vary widely based on application context.

Pin Tension Spring (PTS) Detail (6200)-(6400)

Figure 62:
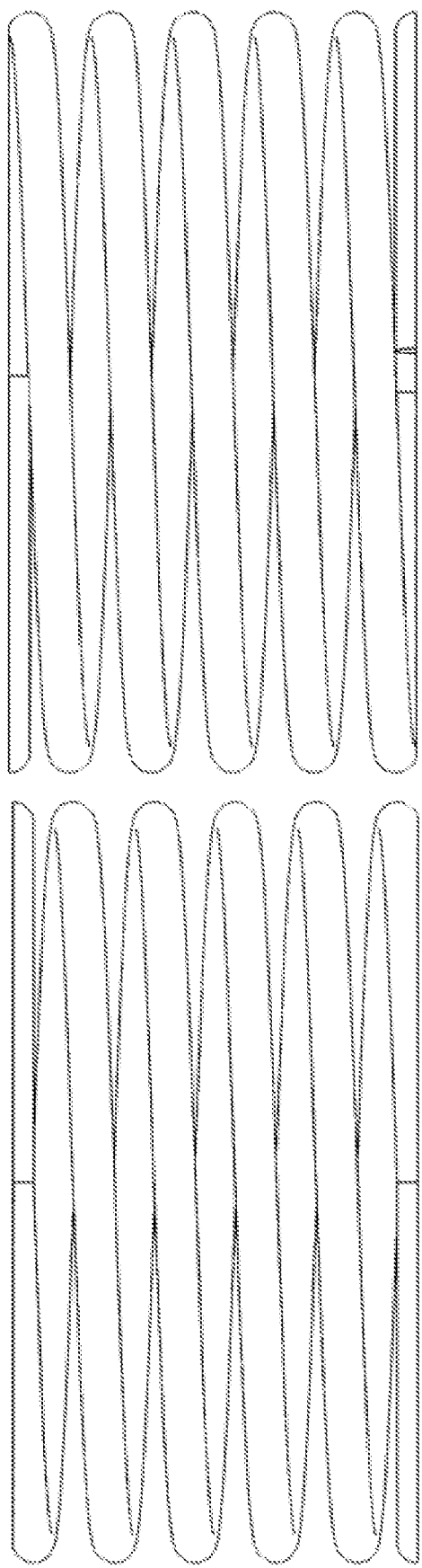
FIG. 62 illustrates front and rear views of a preferred exemplary embodiment of a present invention pin tension spring (PTS) used to constrain DDP positioning within the AEC to maintain contact between the DDP and the TDS.
Figure 63:
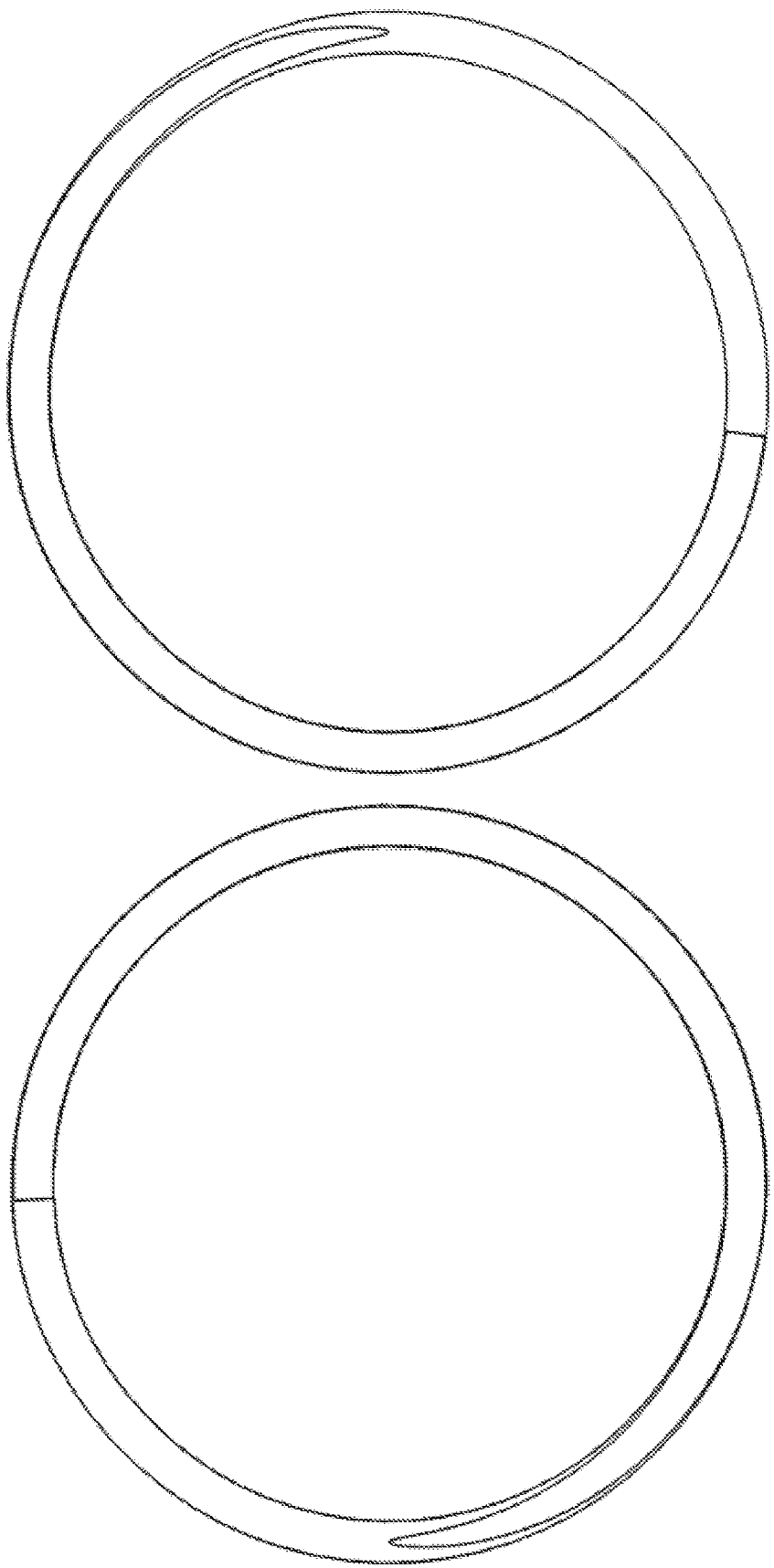
FIG. 63 illustrates a top and bottom views of a preferred exemplary embodiment of a present invention pin tension spring (PTS) used to constrain DDP positioning within the AEC to maintain contact between the DDP and the TDS.

FIG. 62 (6200)-FIG. 64 (6400) depict various views of a pin tension spring (PTS) that may be used to constrain motion of the DDP within the AEC so as to force contact between the DDP and the TDS. One skilled in the art will recognize that the construction of these and the particular interface to the AEC and DDP may vary widely based on application context.

Target Driveshaft (TDS) Detail (6500)-(9600)

Figure 65:
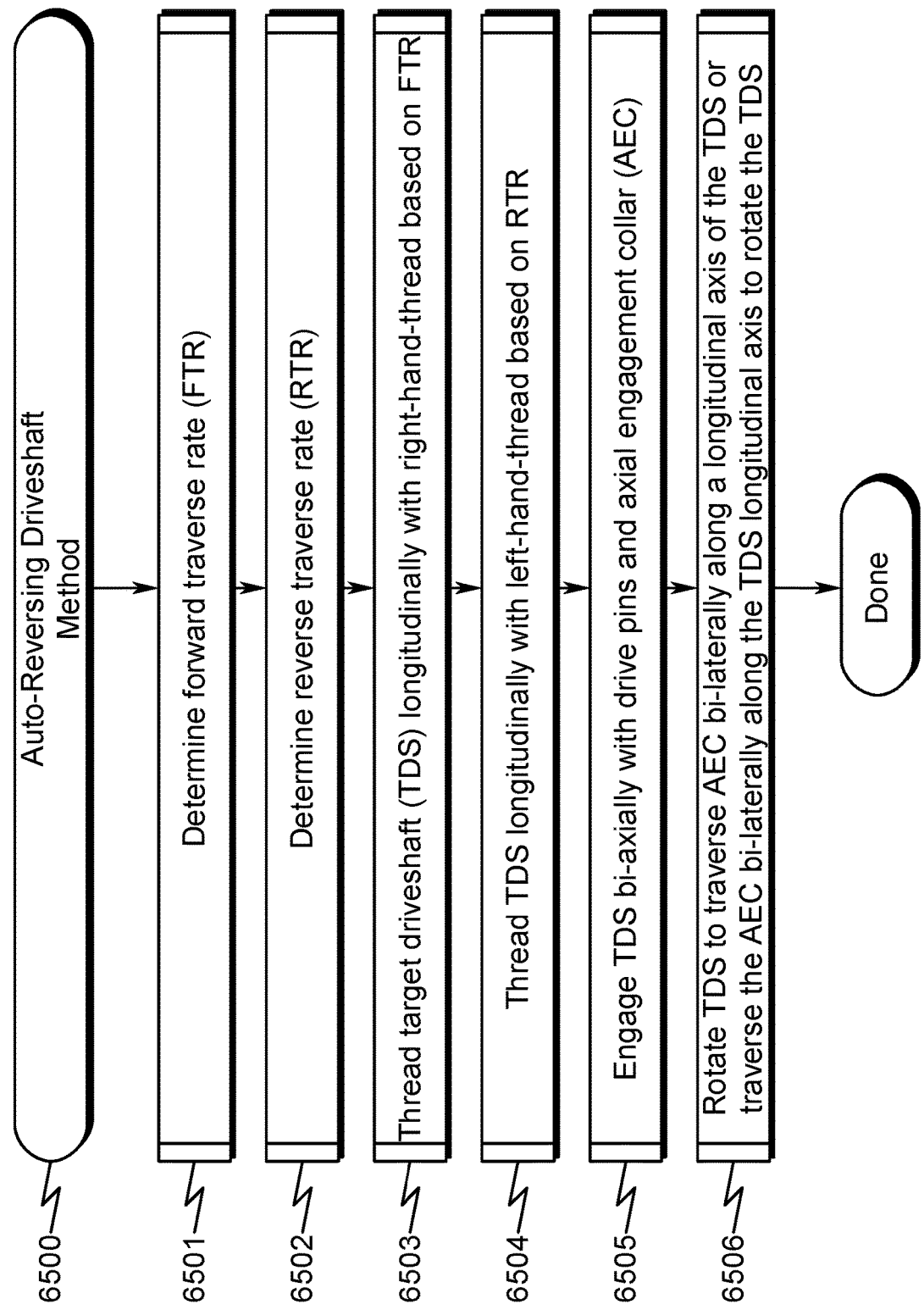
FIG. 65 illustrates a flowchart depicting a preferred exemplary method embodiment of the present invention.

While the target driveshaft (TDS) may be configured in a wide variety of ways, additional detail on the method of construction and typical examples as applied to a typical TDS are presented in FIG. 65 (6500)-FIG. 96 (9600). As mentioned before, the construction of thread transitions and the number of pitch transitions along the TDS is determined on application context.

Target Driveshaft (TDS) Method (6500)

A preferred invention method embodiment may be generalized as incorporating a target driveshaft threaded as illustrated in the flowchart depicted in FIG. 65 (6500) wherein the threading method comprises:

(1) Determining a desired forward traverse rate (FTR) (6501);
(2) Determining a desired reverse traverse rate (RTR) (6502);
(3) Threading the target driveshaft (TDS) longitudinally with right-hand-threads (RHT) based on the desired FTR (6503);
(4) Threading the TDS longitudinally with left-hand-threads (LHT) based on the desired RTR (6504);

(5) Engaging the TDS bi-axially with dual drive pins (DDP) and an axial engagement collar (AEC) (6505); and (6) Rotating the TDS to traverse the AEC bi-laterally along a longitudinal axis of the TDS axis or traversing the AEC bi-laterally along the longitudinal axis of the TDS to rotate the TDS (6506).

One skilled in the art will recognize that these method steps may be augmented or rearranged without limiting the teachings of the present invention. This general method summary may be augmented by the various elements described herein to produce a wide variety of invention embodiments consistent with this overall design description. Specifically, the FTR and RTR may be dynamically changed along the longitudinal axis of the TDS.

Target Driveshaft (TDS) Detail (6600)-(7200)

Figure 66:
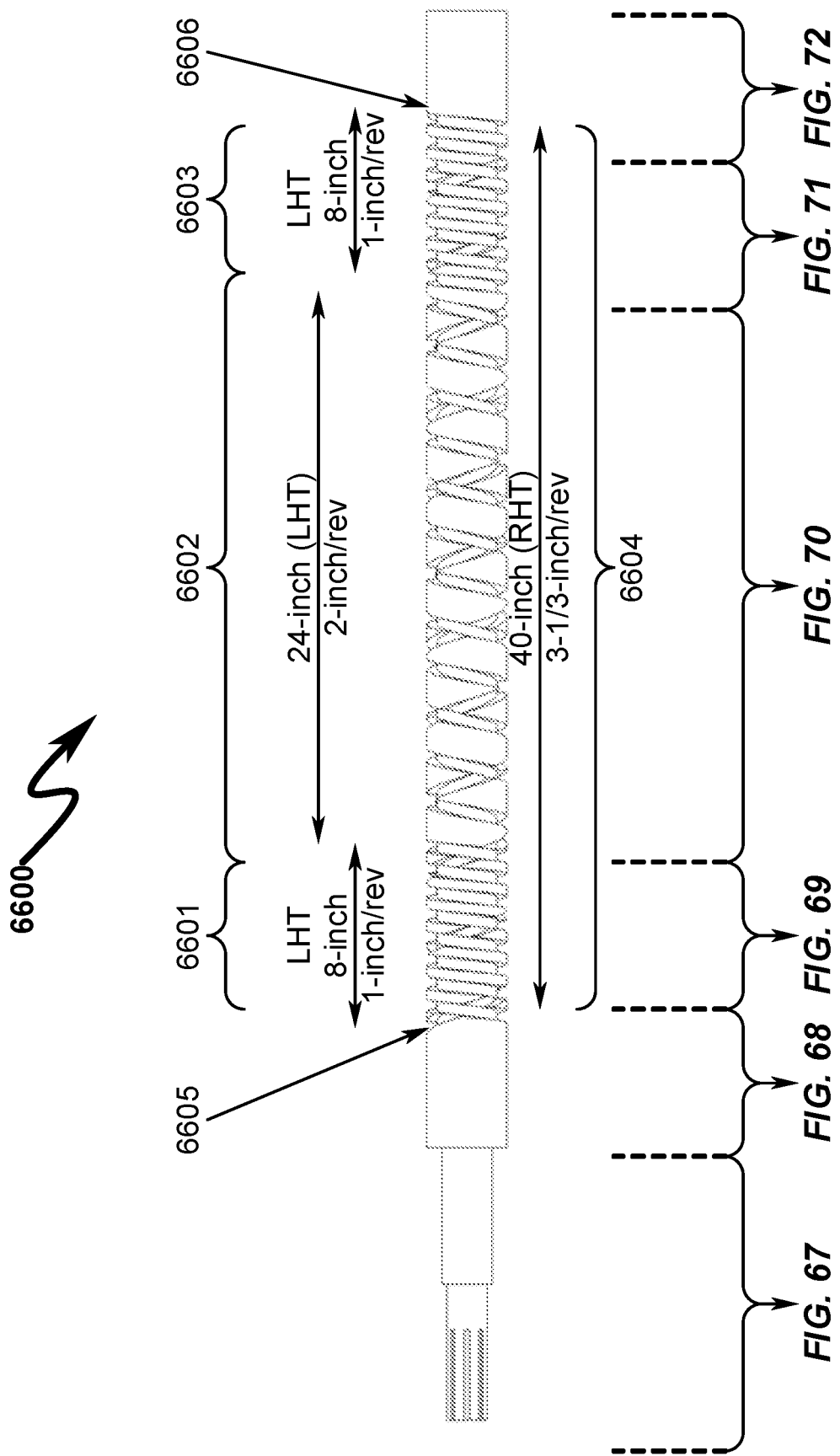
FIG. 66 illustrates an overview diagram of an exemplary TDS depicting multiple left-hand-threads (LHT) based on a selected reverse traverse rate (RTR) with uniform right-hand-threads (RHT) based on a selected forward traverse rate (FTR)
Figure 67:
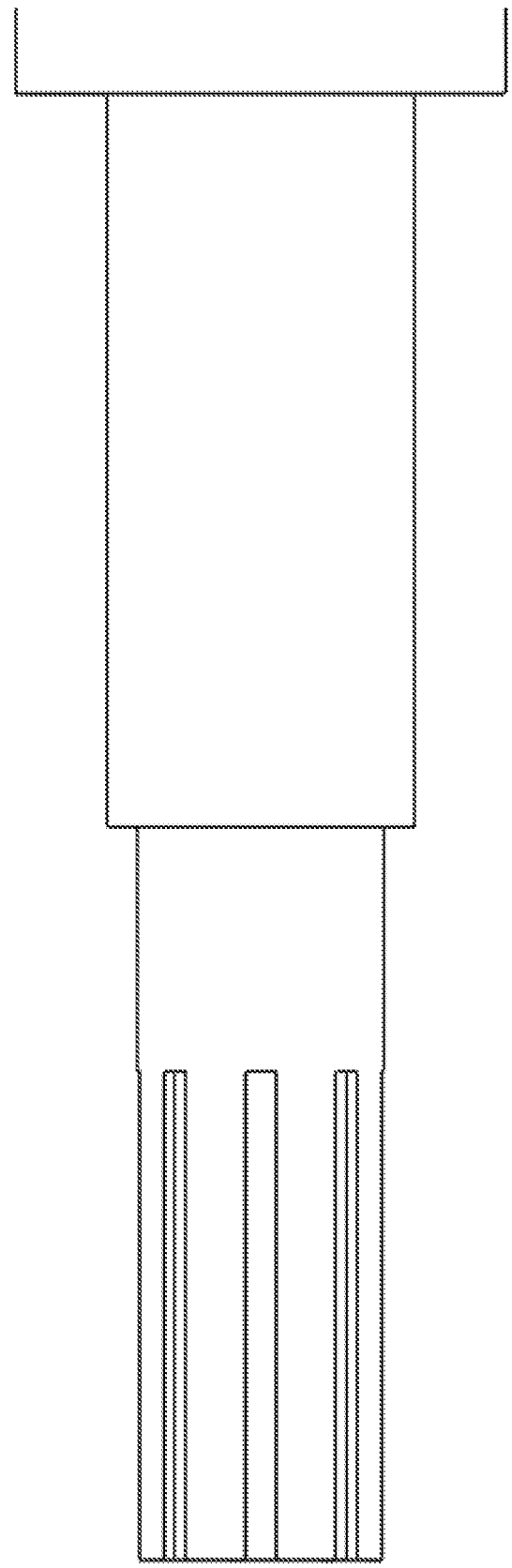
FIG. 67 illustrates an detail diagram of a portion of an exemplary TDS depicting multiple left-hand-threads (LHT) based on a selected reverse traverse rate (RTR) with uniform right-hand-threads (RHT) based on a selected forward traverse rate (FTR) (detail view 1/6)
Figure 68:
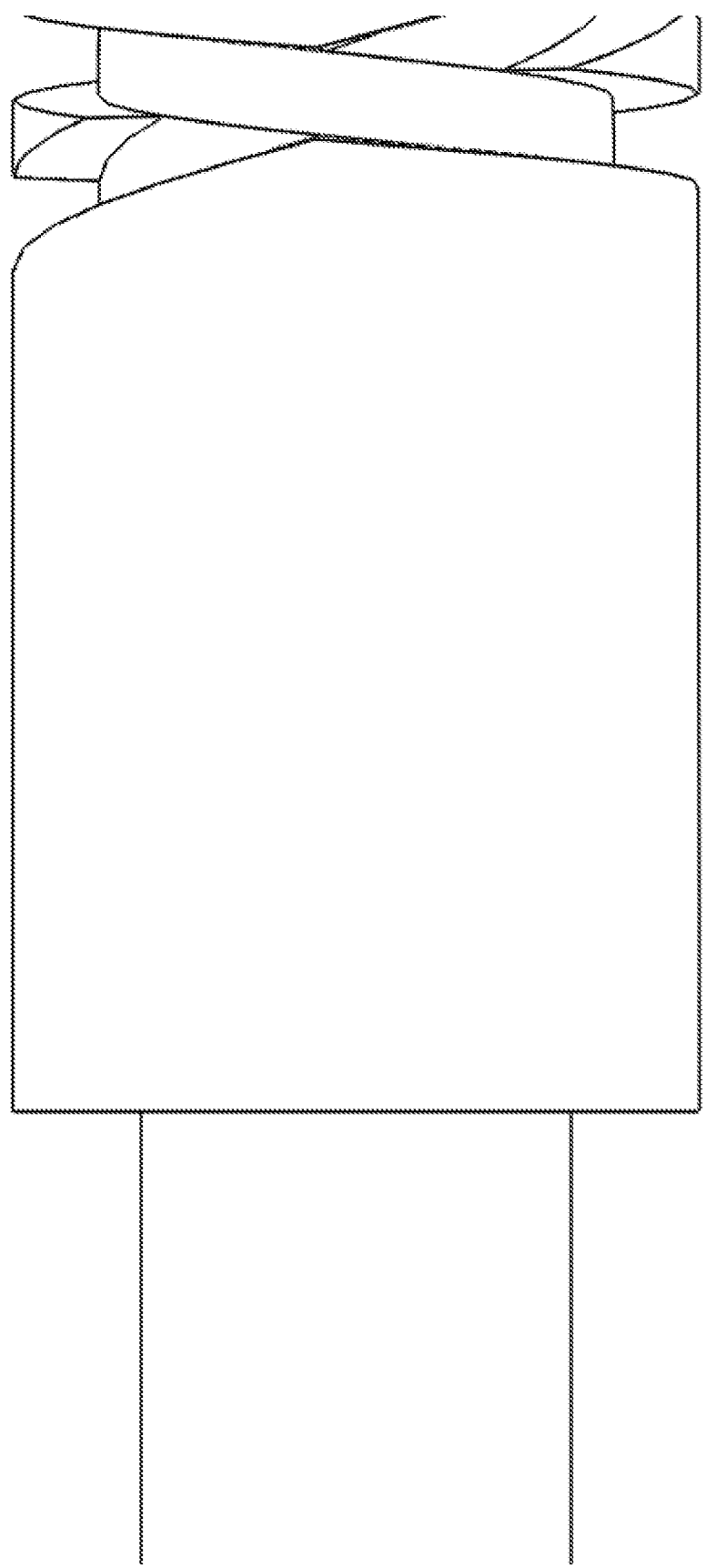
FIG. 68 illustrates an detail diagram of a portion of an exemplary TDS depicting multiple left-hand-threads (LHT) based on a selected reverse traverse rate (RTR) with uniform right-hand-threads (RHT) based on a selected forward traverse rate (FTR) (detail view 2/6)
Figure 69:
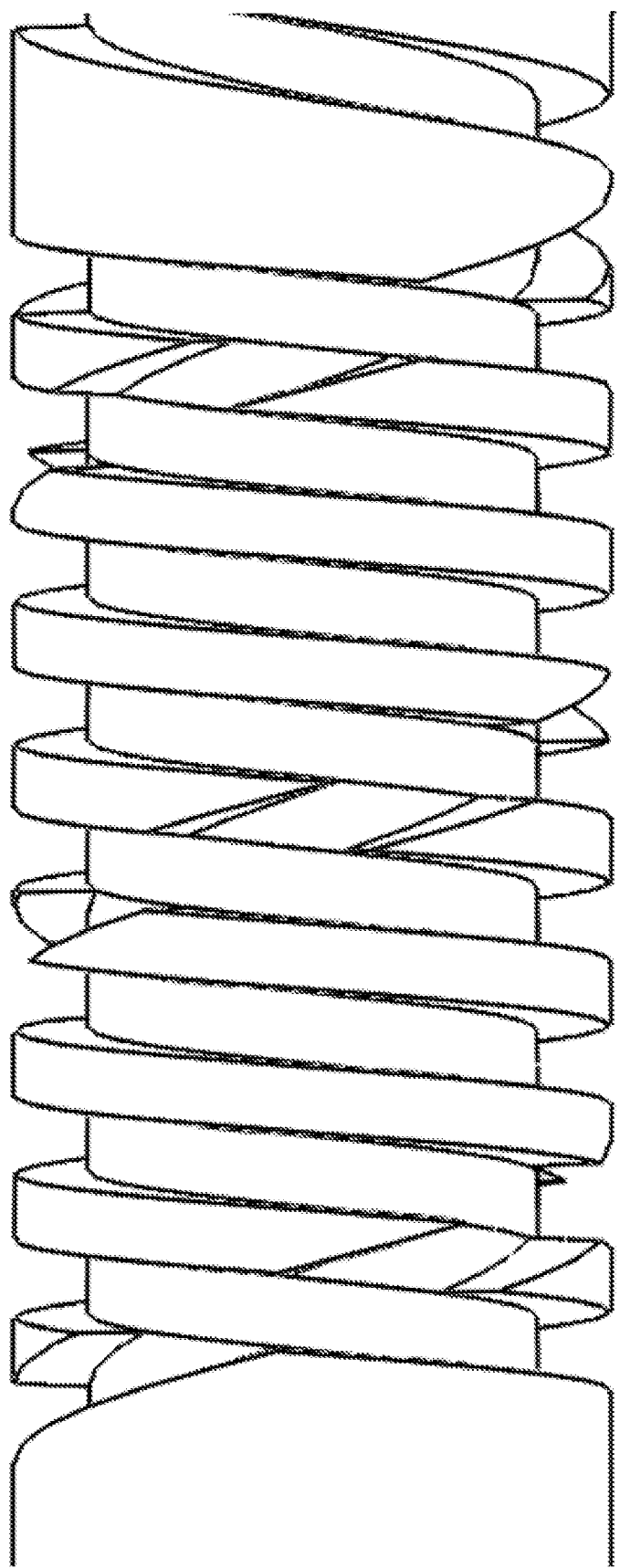
FIG. 69 illustrates an detail diagram of a portion of an exemplary TDS depicting multiple left-hand-threads (LHT) based on a selected reverse traverse rate (RTR) with uniform right-hand-threads (RHT) based on a selected forward traverse rate (FTR) (detail view 3/6)
Figure 70:
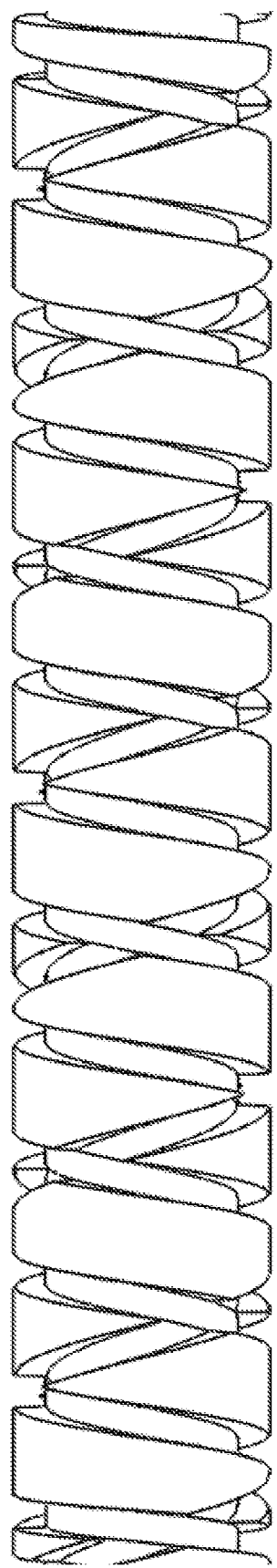
FIG. 70 illustrates an detail diagram of a portion of an exemplary TDS depicting multiple left-hand-threads (LHT) based on a selected reverse traverse rate (RTR) with uniform right-hand-threads (RHT) based on a selected forward traverse rate (FTR) (detail view 4/6)
Figure 71:
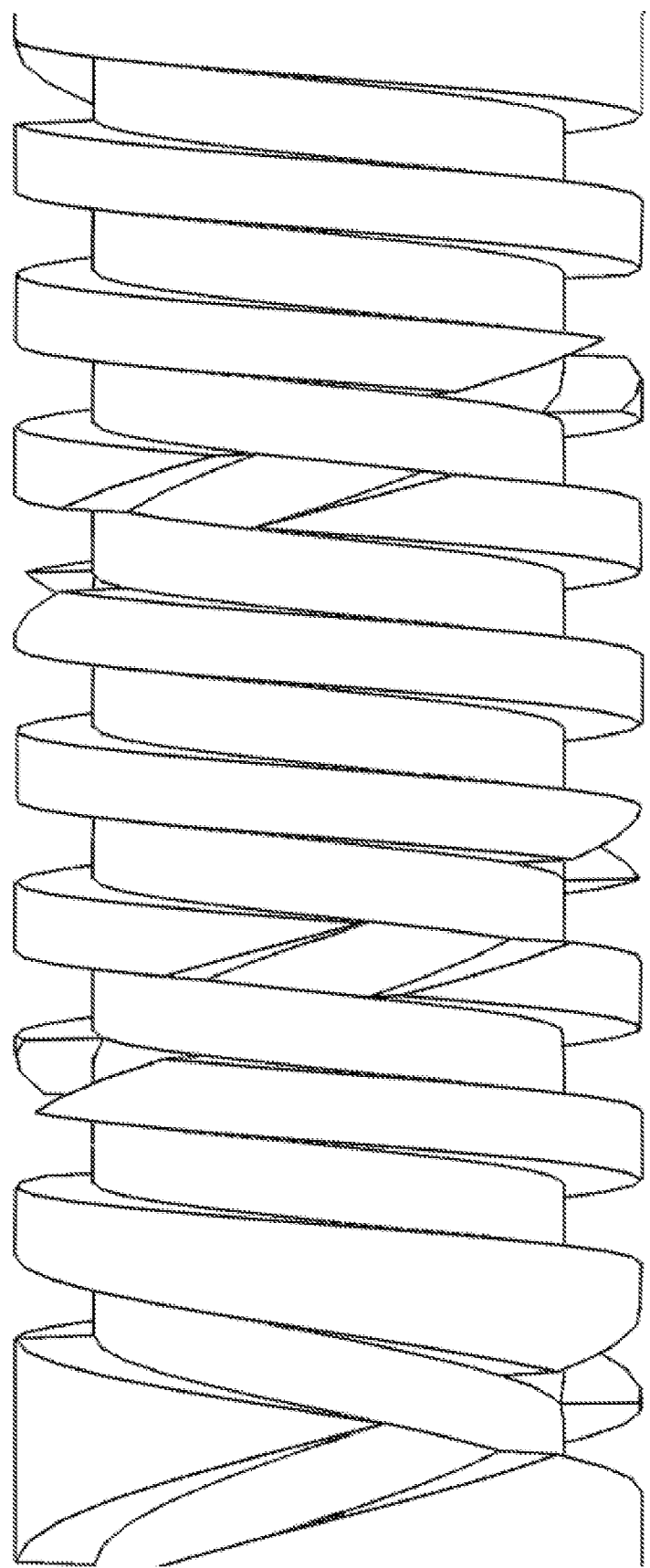
FIG. 71 illustrates an detail diagram of a portion of an exemplary TDS depicting multiple left-hand-threads (LHT) based on a selected reverse traverse rate (RTR) with uniform right-hand-threads (RHT) based on a selected forward traverse rate (FTR) (detail view 5/6)
Figure 72:
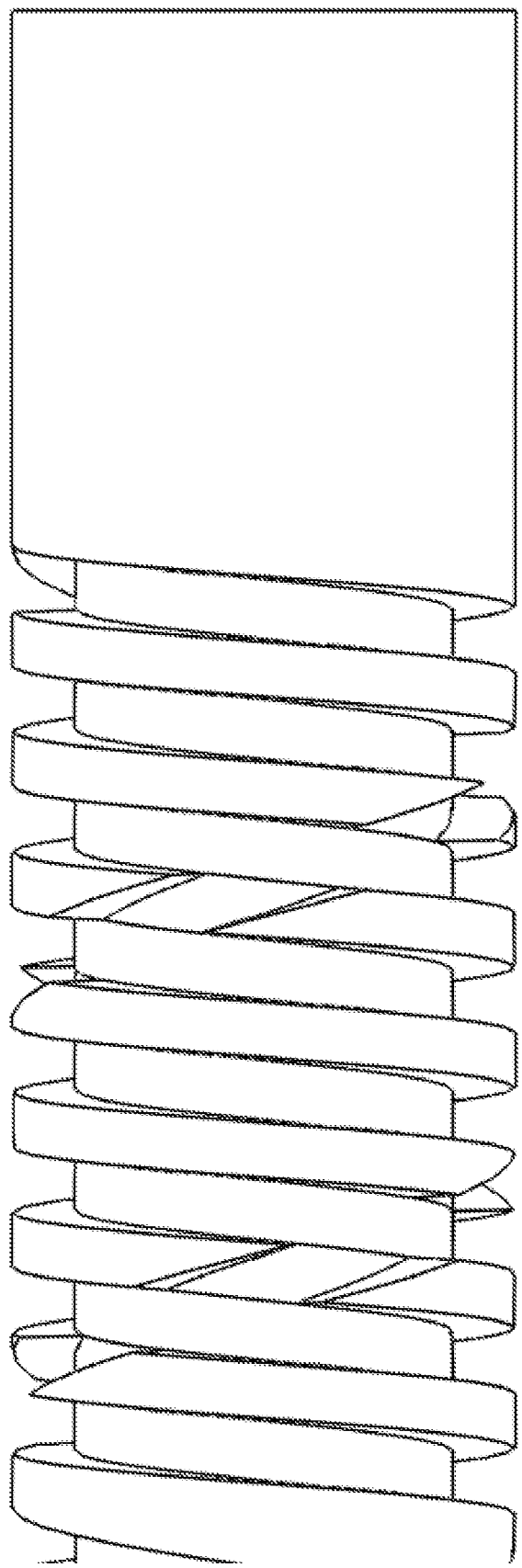
FIG. 72 illustrates an detail diagram of a portion of an exemplary TDS depicting multiple left-hand-threads (LHT) based on a selected reverse traverse rate (RTR) with uniform right-hand-threads (RHT) based on a selected forward traverse rate (FTR) (detail view 6/6)

FIG. 66 (6600)-FIG. 72 (7200) provide an example of an exemplary TDS that may be incorporated within the system and details the ability to have varying screw pitches (and thus varying rates of travel) with respect to rotation of the TDS. FIG. 66 (6600) details the overall driveshaft in which four regions of travel pitch are detailed. The left-hand threads are broken into regions of 1-inch/revolution LHT (6601), 2-inch/revolution LHT (6602), 1-inch/revolution LHT (6603), while the right-hand threads are uniform at 3⅓-inch/revolution RHT (6604). Transition reversal regions (6605, 6606) are at either end of the shaft as depicted and may include a variety of threading forms and/or transition milling within the shaft to allow the DDP to smoothly transition from one direction to the opposite longitudinal direction along the TDS.

The example provided here shows multiple LHT pitches and a single RHT pitch. However, one skilled in the art will recognize that single and/or multiple pitches are possible for either the RHT or the LHT depending on application context. Furthermore, while discrete pitch values have been shown in the diagrams, the use of continuously variable pitches along the TDS is also anticipated by the present invention. Thus, the prototype shaft as presented can be adapted to a variety of situations in which the traversal rate of the TDS or AEC is required to vary along the longitudinal axis of the TDS. Depending on whether the motion driver platform (MDP) is fixed or moveable will determine the relative motion of the TDS and AEC. It should be noted that the directions "forward" and "reverse" may be transposed in some scenarios depending on the relative motion of the TDS and AEC. These distinctions do not impact the scope of the claimed invention as they are merely nomenclature specific to a particular application context.

Level Winder Example (7300)-(8000)

Figure 73:
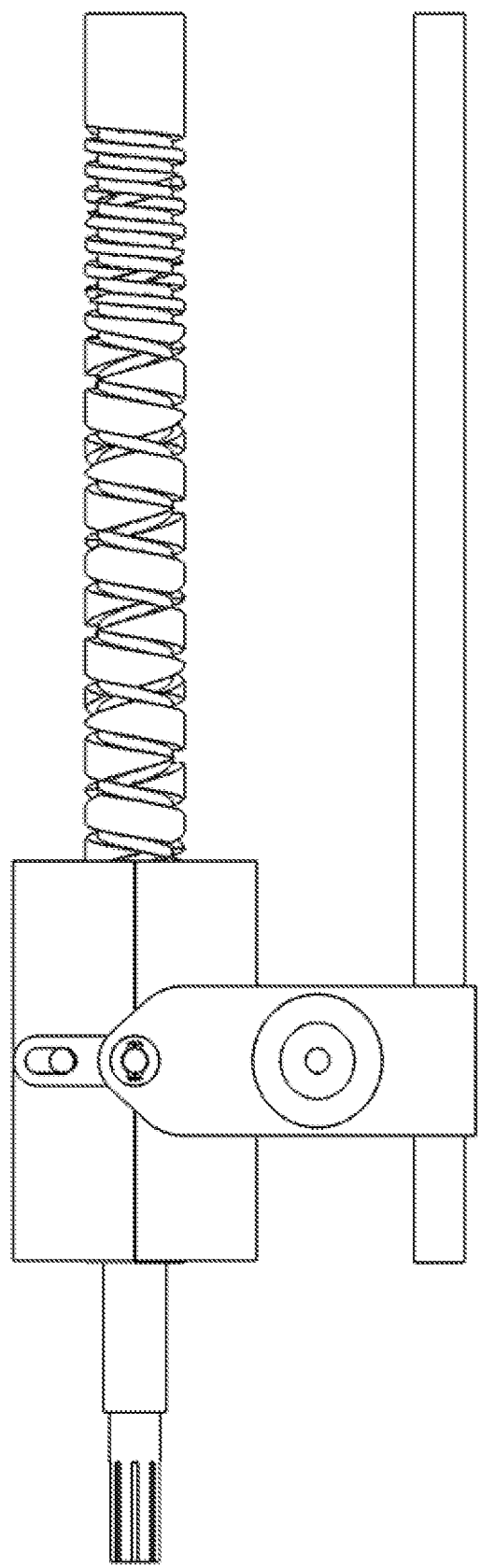
FIG. 73 illustrates a top view diagram depicting a present invention auto-reversing driveshaft applied to a level winder system (far left neutral AEC position)
Figure 74:
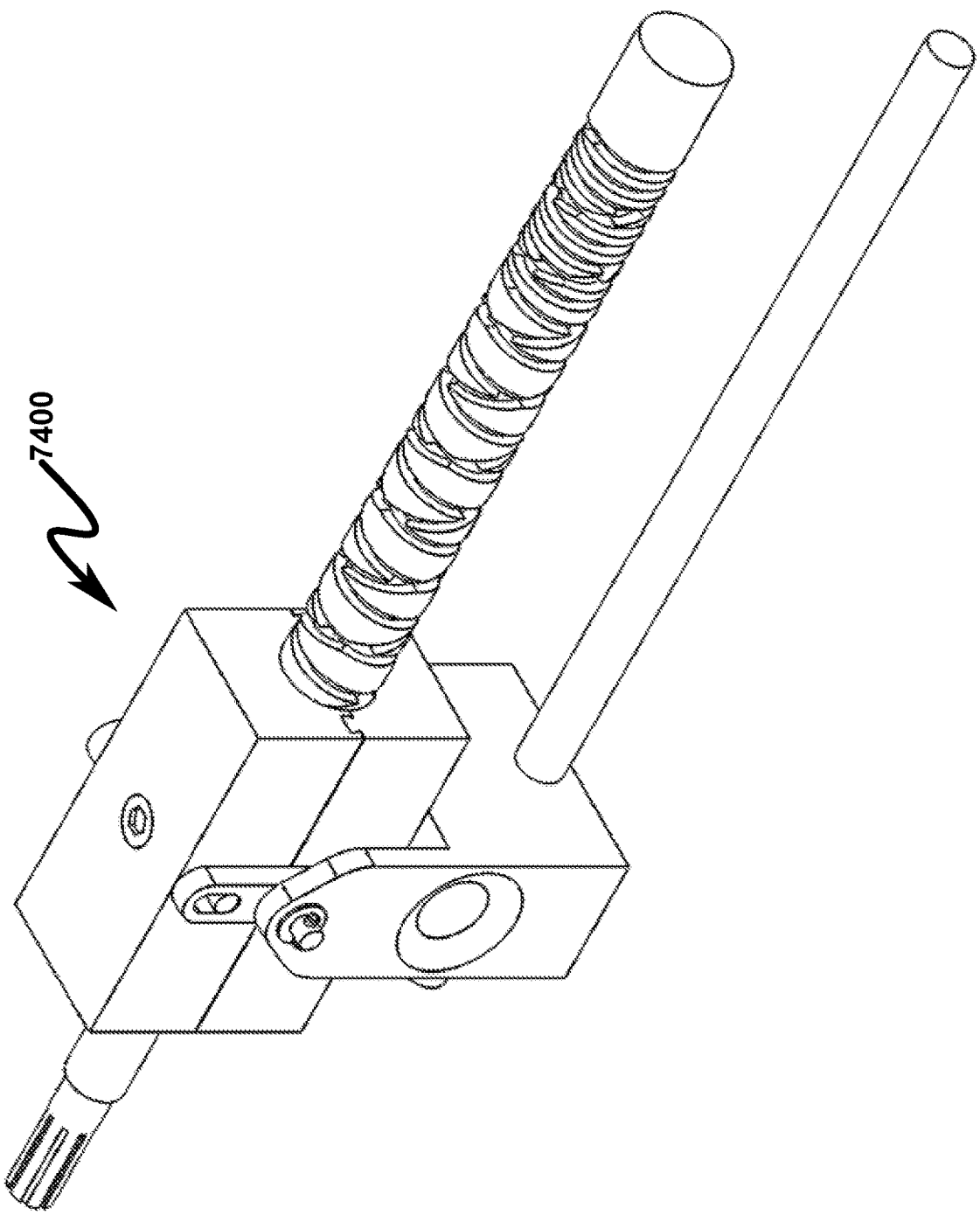
FIG. 74 illustrates a perspective view diagram depicting a present invention auto-reversing driveshaft applied to a level winder system (far left neutral AEC position)
Figure 75:
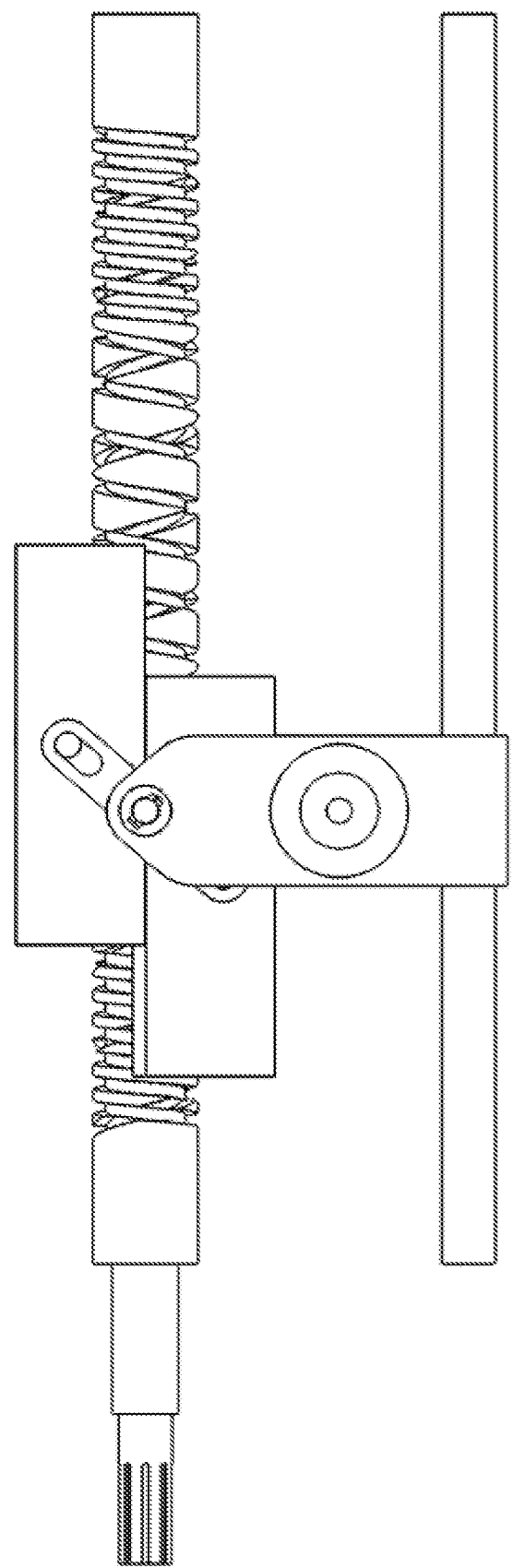
FIG. 75 illustrates a top view diagram depicting a present invention auto-reversing driveshaft applied to a level winder system (middle-left transitioning AEC position)
Figure 76:
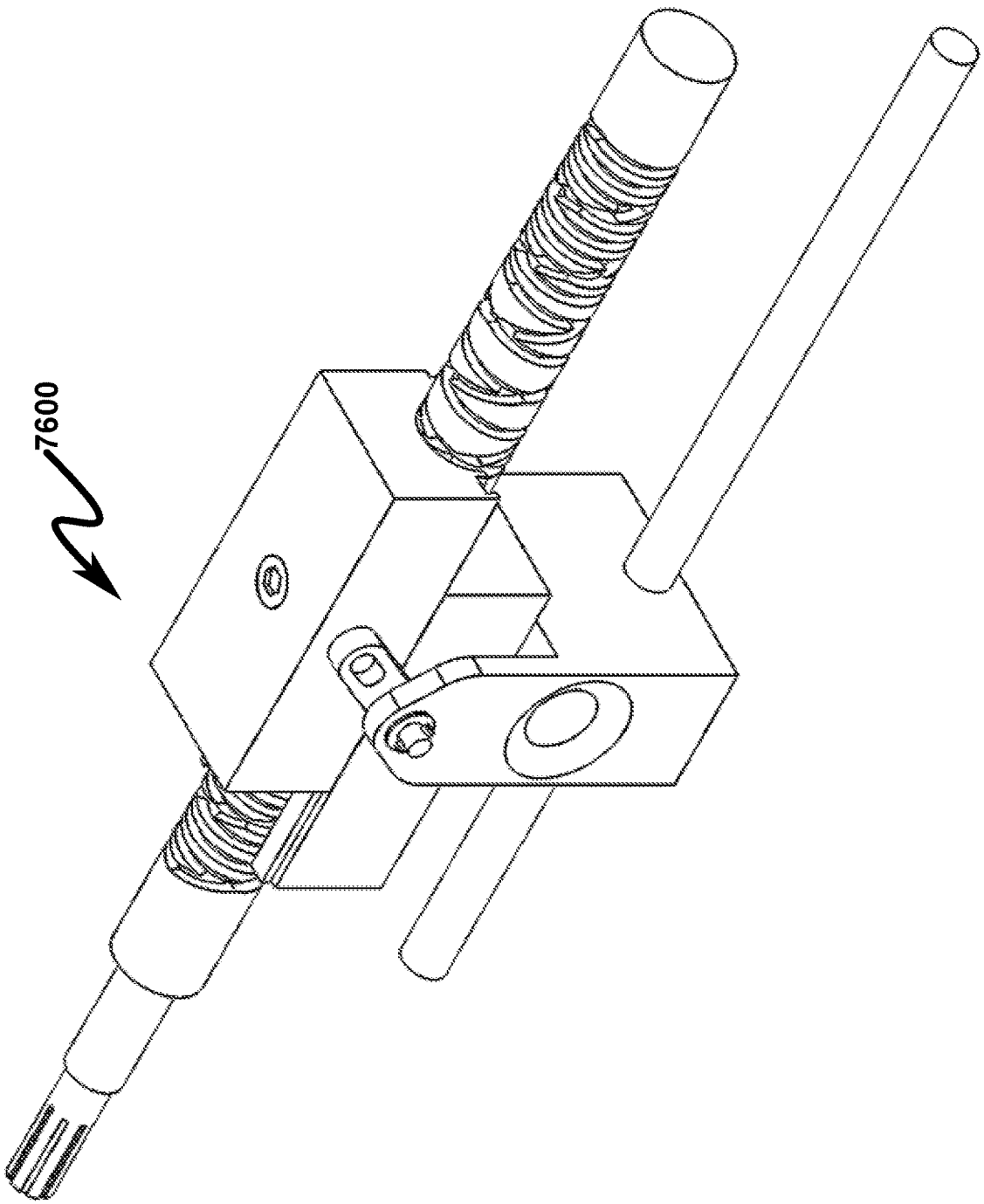
FIG. 76 illustrates a perspective view diagram depicting a present invention auto-reversing driveshaft applied to a level winder system (middle-left transitioning AEC position)
Figure 77:
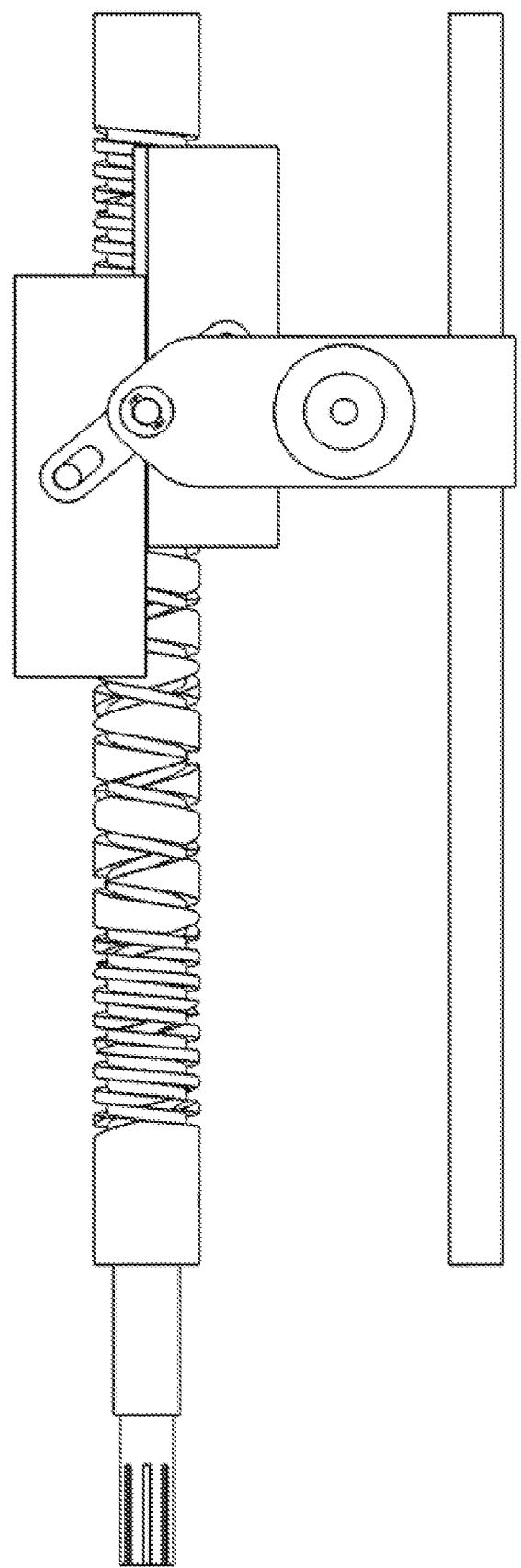
FIG. 77 illustrates a top view diagram depicting a present invention auto-reversing driveshaft applied to a level winder system (middle-right transitioning AEC position)
Figure 78:
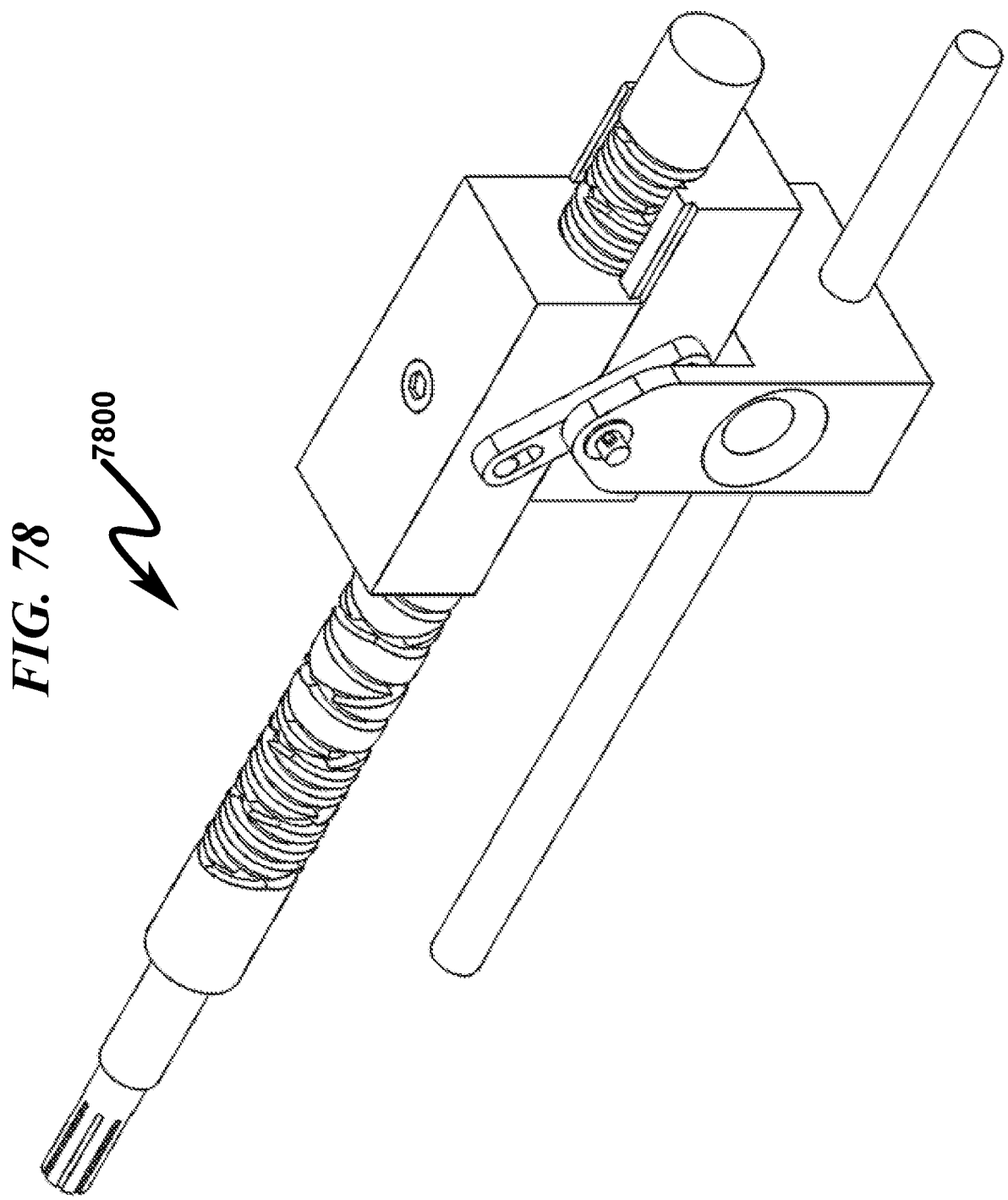
FIG. 78 illustrates a perspective view diagram depicting a present invention auto-reversing driveshaft applied to a level winder system (middle-right transitioning AEC position)
Figure 79:
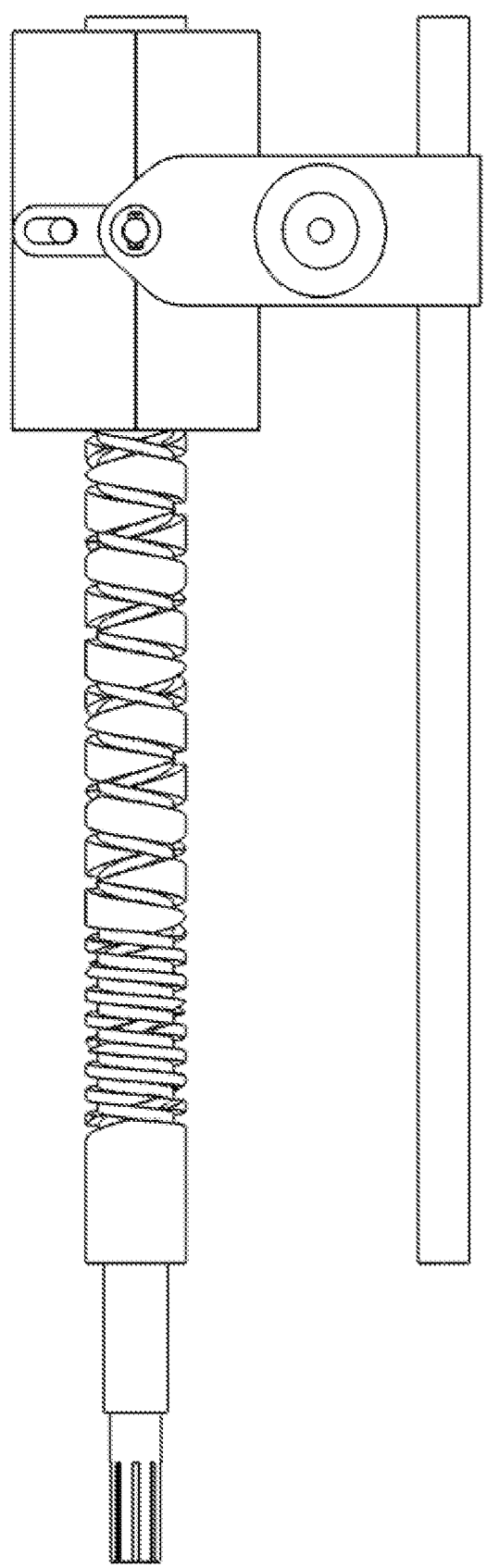
FIG. 79 illustrates a top view diagram depicting a present invention auto-reversing driveshaft applied to a level winder system (far right neutral AEC position)
Figure 80:
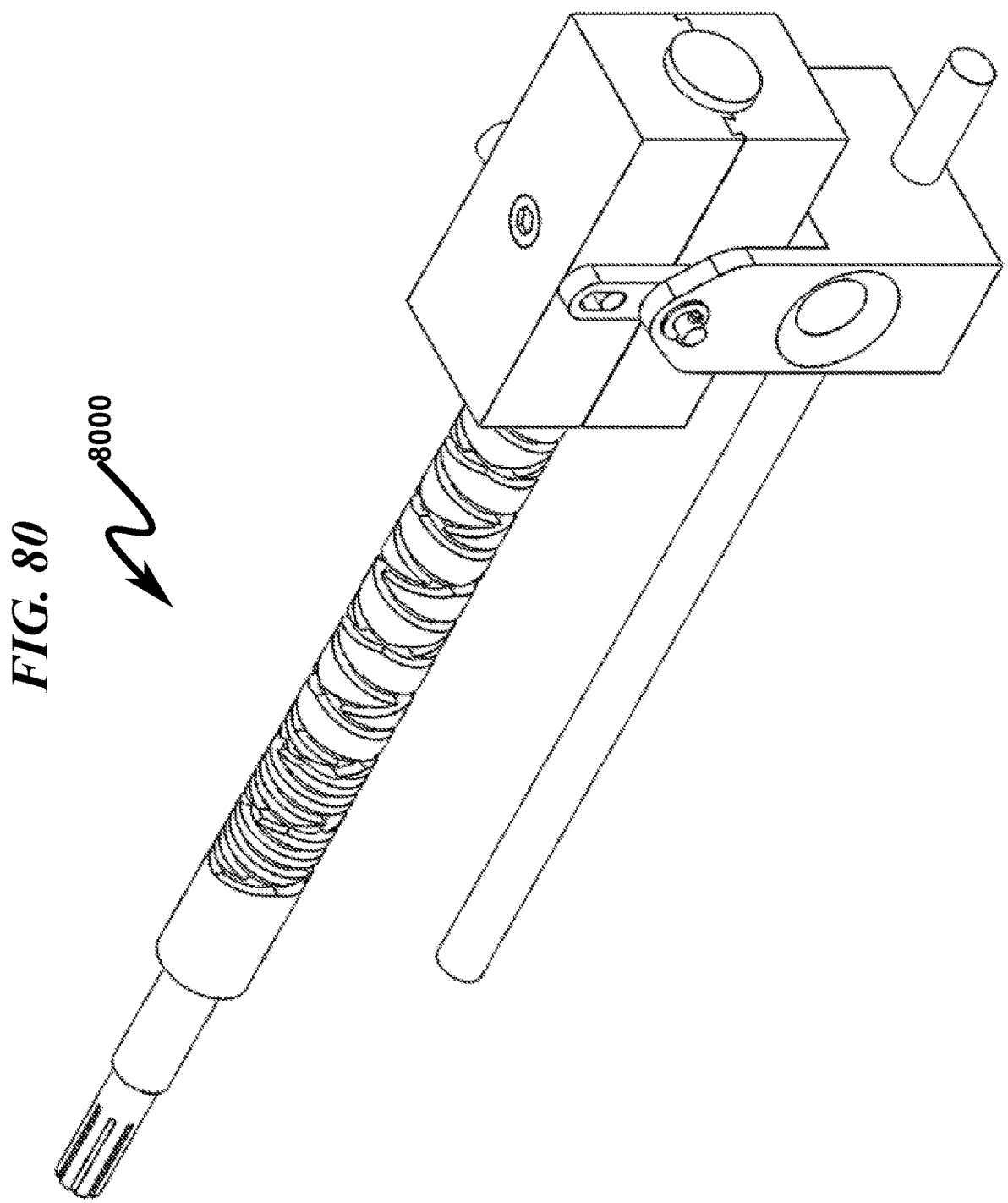
FIG. 80 illustrates a perspective view diagram depicting a present invention auto-reversing driveshaft applied to a level winder system (far right neutral AEC position)

The present invention as applied to a level winder application is generally depicted in FIG. 73 (7300)-FIG. 80 (8000). Here the AEC/MDP traverse on an axis that is parallel to the longitudinal axis of the TDS as it is rotated. FIG. 73 (7300)-FIG. 74 (7400) depict the AEC/MDP in the far left neutral position at the transition between reverse/forward operation. FIG. 75 (7500)-FIG. 76 (7600) depict the AEC/MDP in the middle-left position at the transition between different longitudinal traverse rates of operation along the TDS. FIG. 77 (7700)-FIG. 78 (7800) depict the AEC/MDP in the middle-right position at the transition between different longitudinal traverse rates of operation along the TDS. FIG. 79 (7900)-FIG. 80 (8000) depict the AEC/MDP in the far right neutral position at the transition between forward/reverse operation.

One skilled in the art will recognize that the AEC operation in this example allows both of the DDP to fully engage the TDS while simultaneously allowing for a varying traverse rate to be accommodated along the TDS.

Mechanical Pump Example (8100)-(9400)

Figure 81:
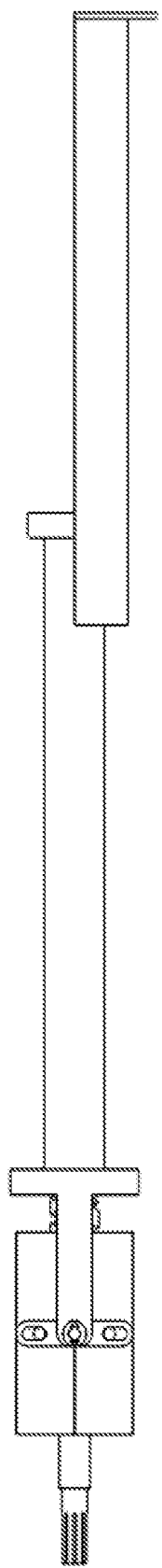
FIG. 81 illustrates a top view diagram depicting a present invention auto-reversing driveshaft applied to a mechanical pumping system (far left neutral AEC position)
Figure 82:
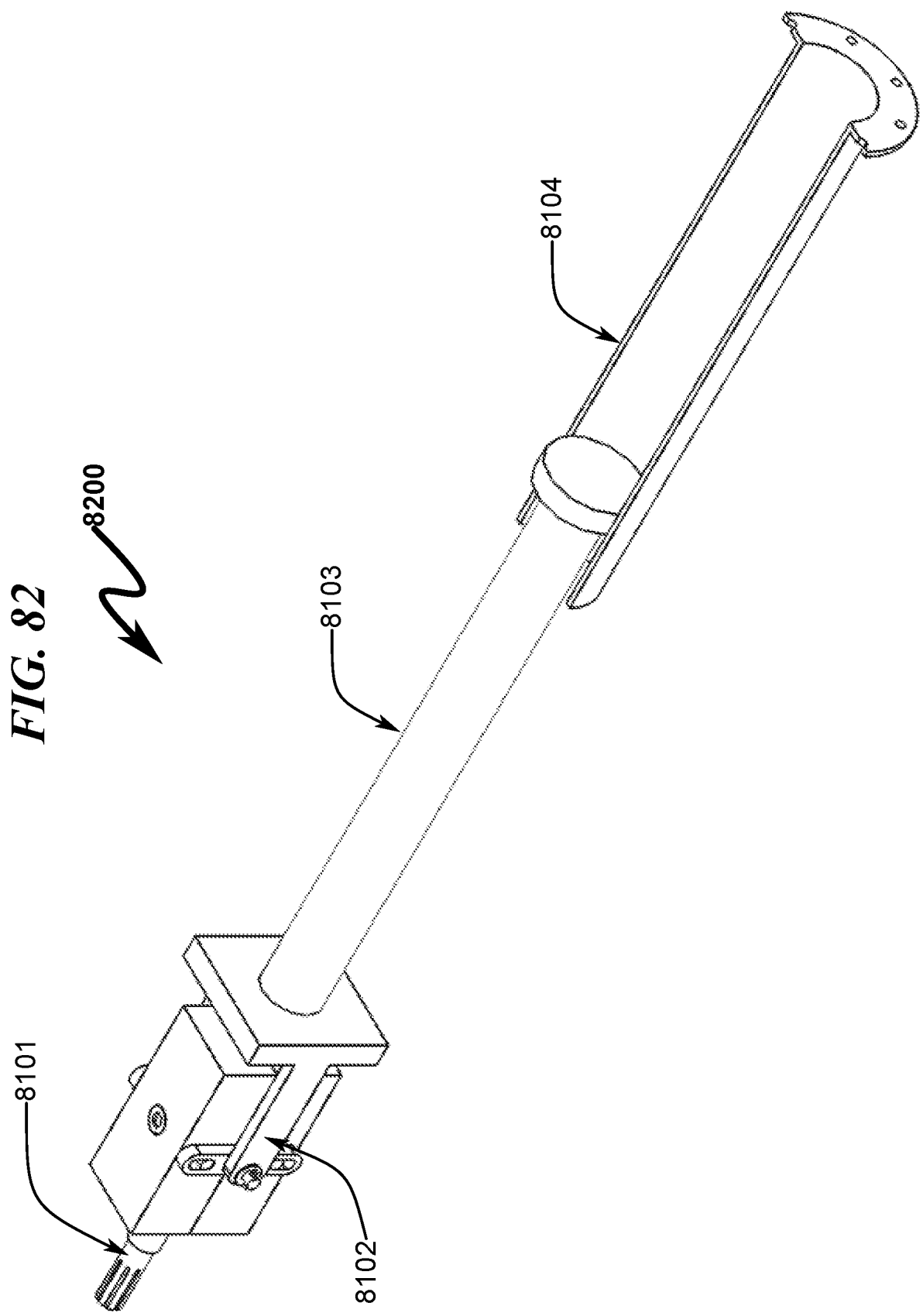
FIG. 82 illustrates a perspective view diagram depicting a present invention auto-reversing driveshaft applied to a mechanical pumping system (far left neutral AEC position)
Figure 83:
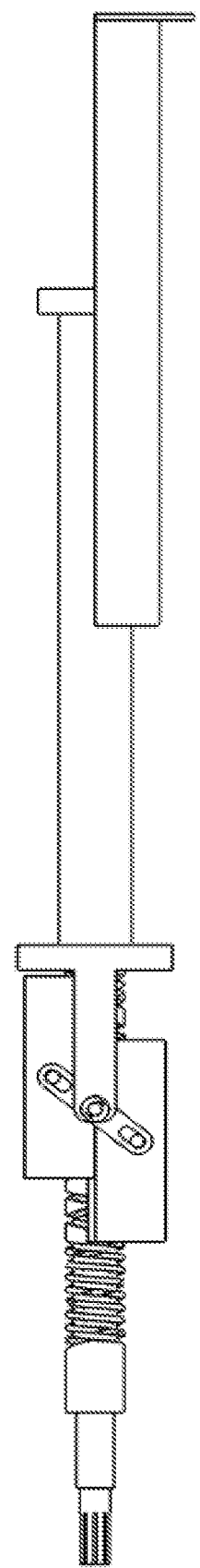
FIG. 83 illustrates a top view diagram depicting a present invention auto-reversing driveshaft applied to a mechanical pumping system (middle-left transitioning AEC position)
Figure 84:
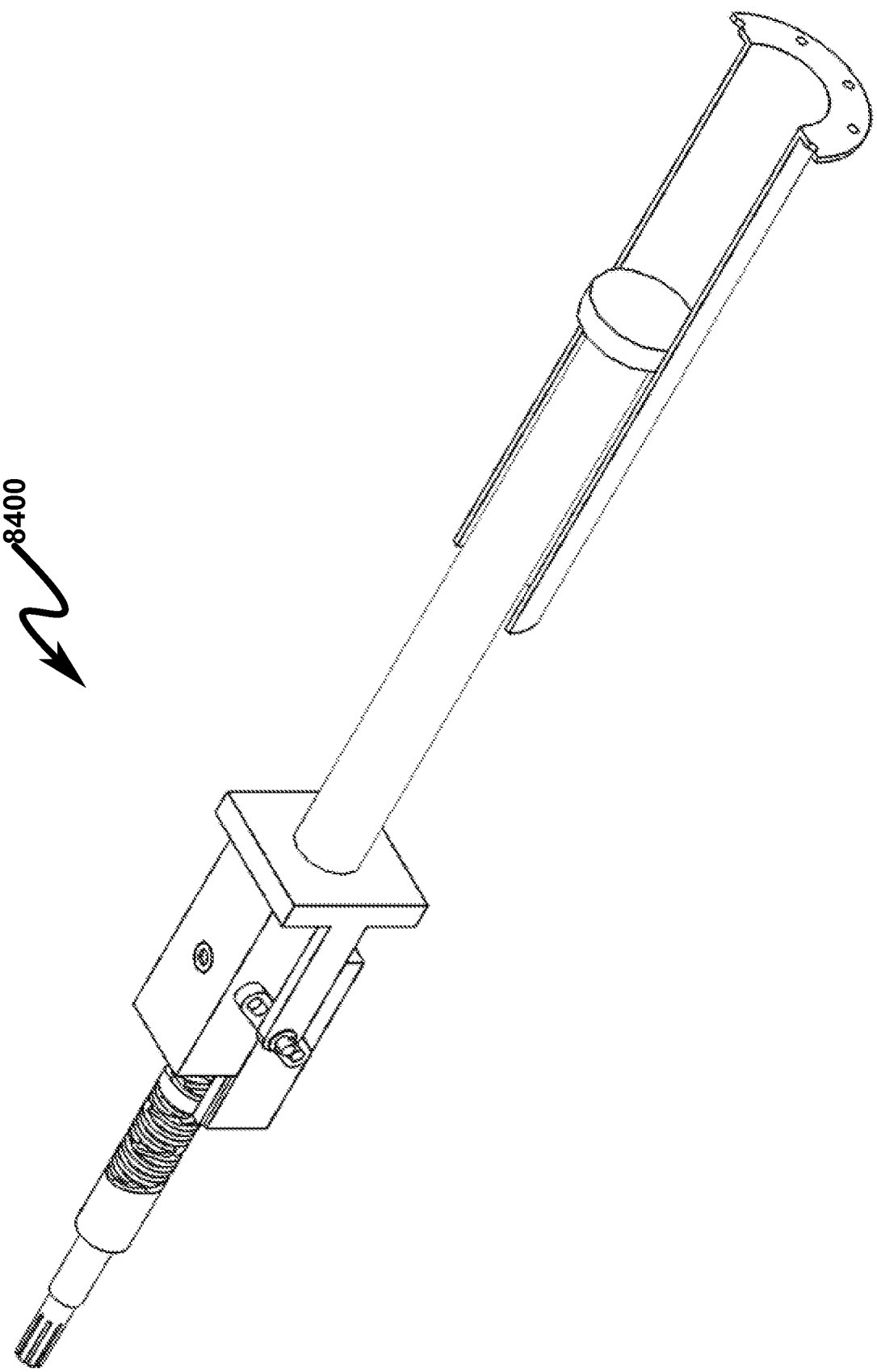
FIG. 84 illustrates a perspective view diagram depicting a present invention auto-reversing driveshaft applied to a mechanical pumping system (middle-left transitioning AEC position)
Figure 85:
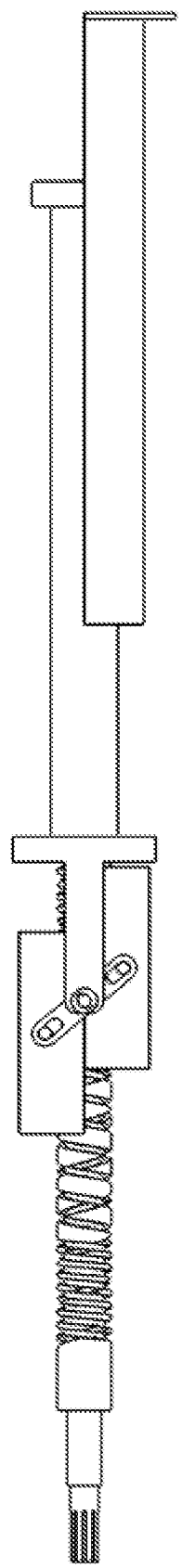
FIG. 85 illustrates a top view diagram depicting a present invention auto-reversing driveshaft applied to a mechanical pumping system (middle-right transitioning AEC position)
Figure 86:
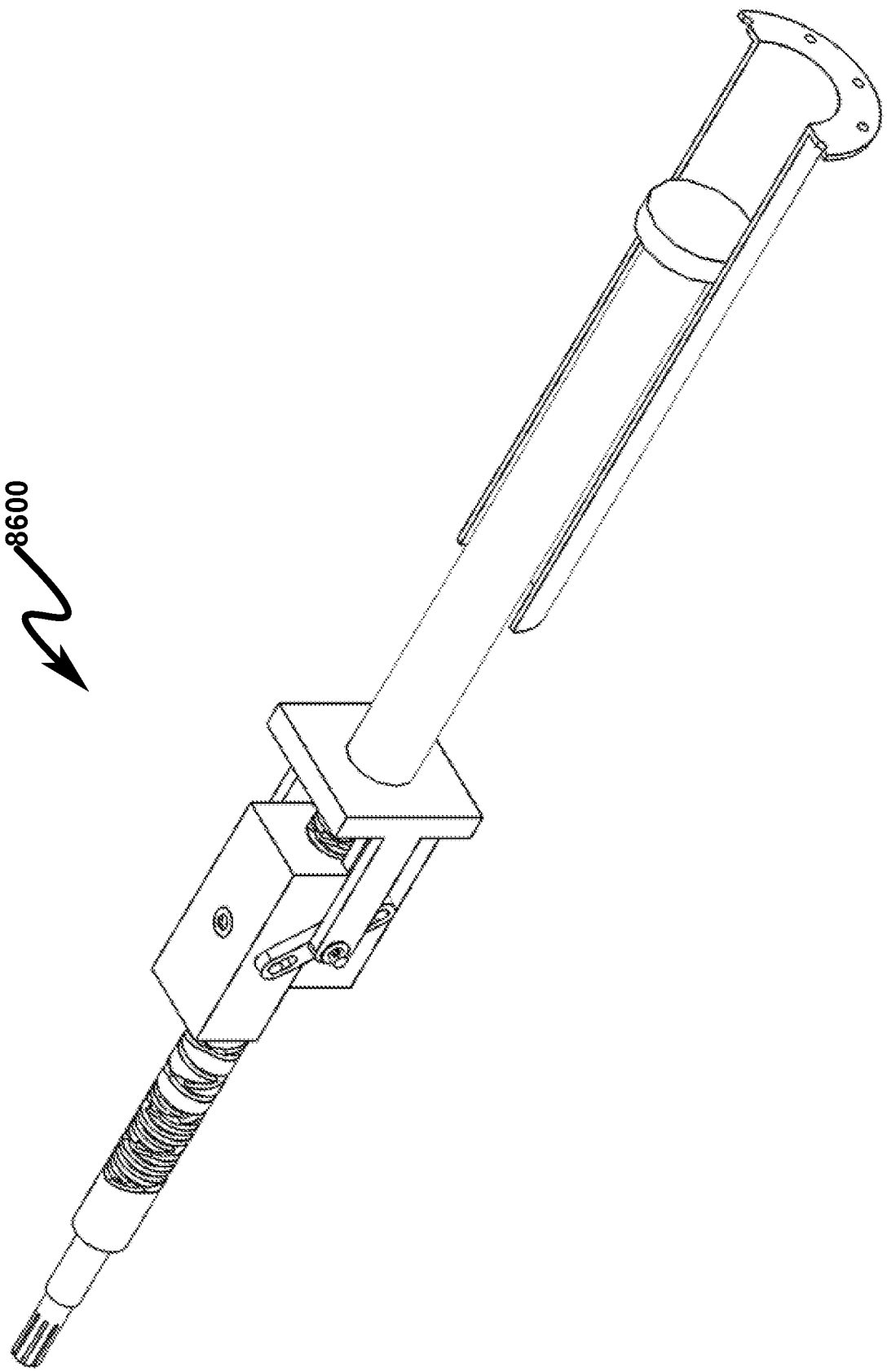
FIG. 86 illustrates a perspective view diagram depicting a present invention auto-reversing driveshaft applied to a mechanical pumping system (middle-right transitioning AEC position)
Figure 87:
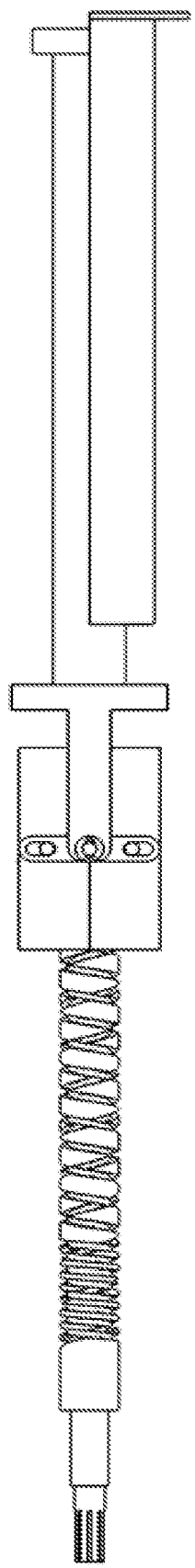
FIG. 87 illustrates a top view diagram depicting a present invention auto-reversing driveshaft applied to a mechanical pumping system (far right neutral AEC position)
Figure 88:
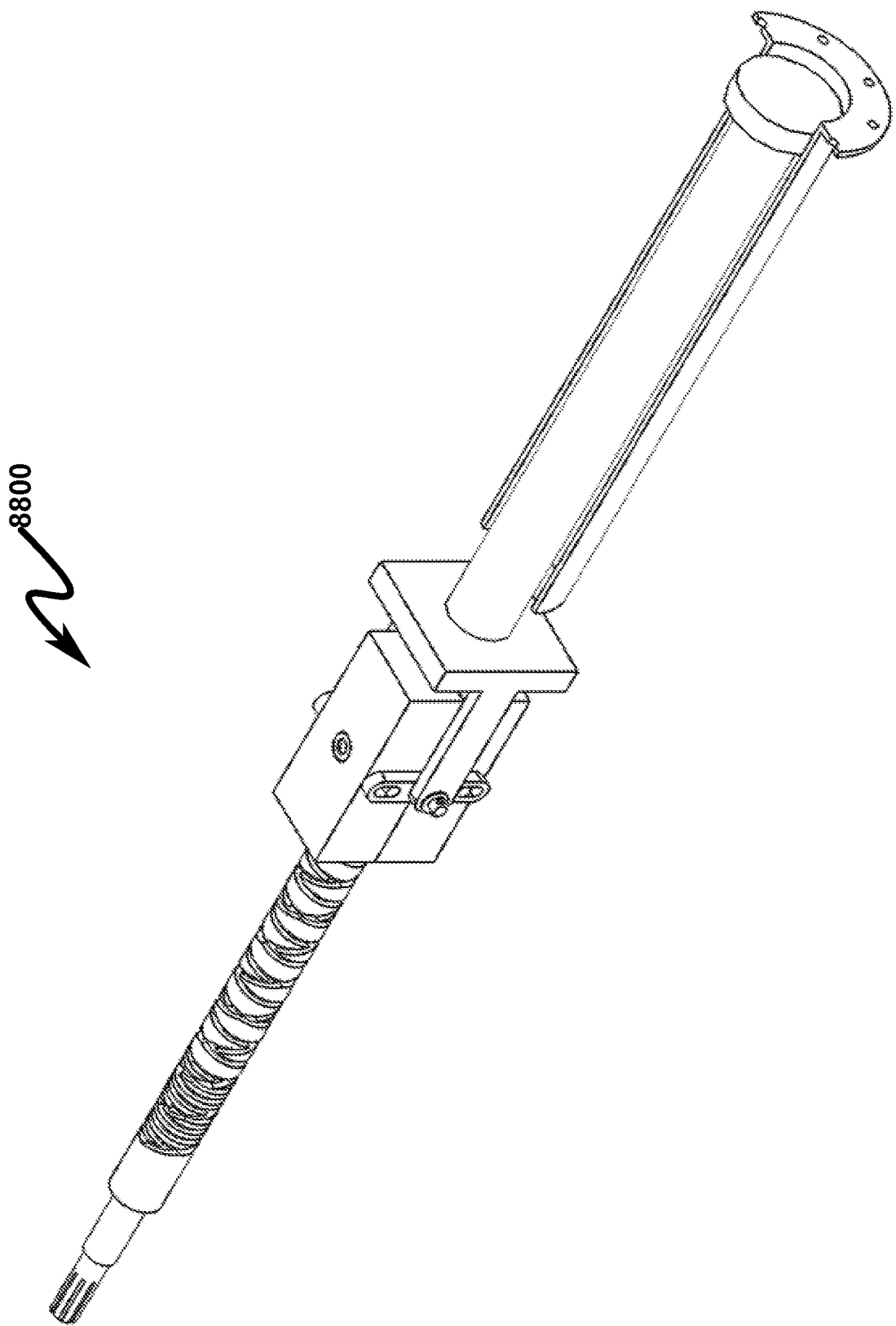
FIG. 88 illustrates a perspective view diagram depicting a present invention auto-reversing driveshaft applied to a mechanical pumping system (far right neutral AEC position)
Figure 89:
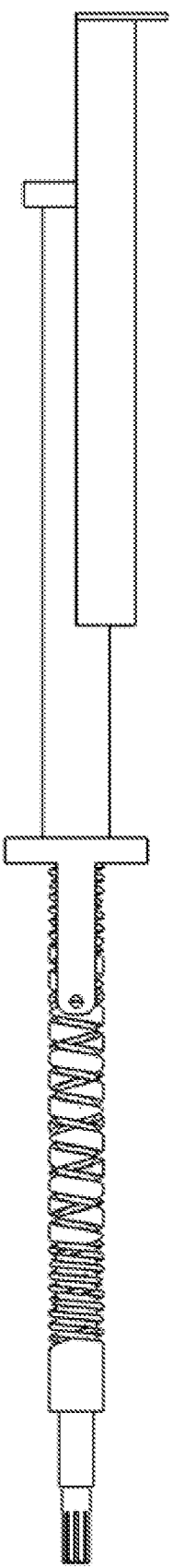
FIG. 89 illustrates a front view depicting a present invention auto-reversing driveshaft applied to a mechanical pumping system (isolation view of TDS, pump piston, and section of pump cylinder)
Figure 91:
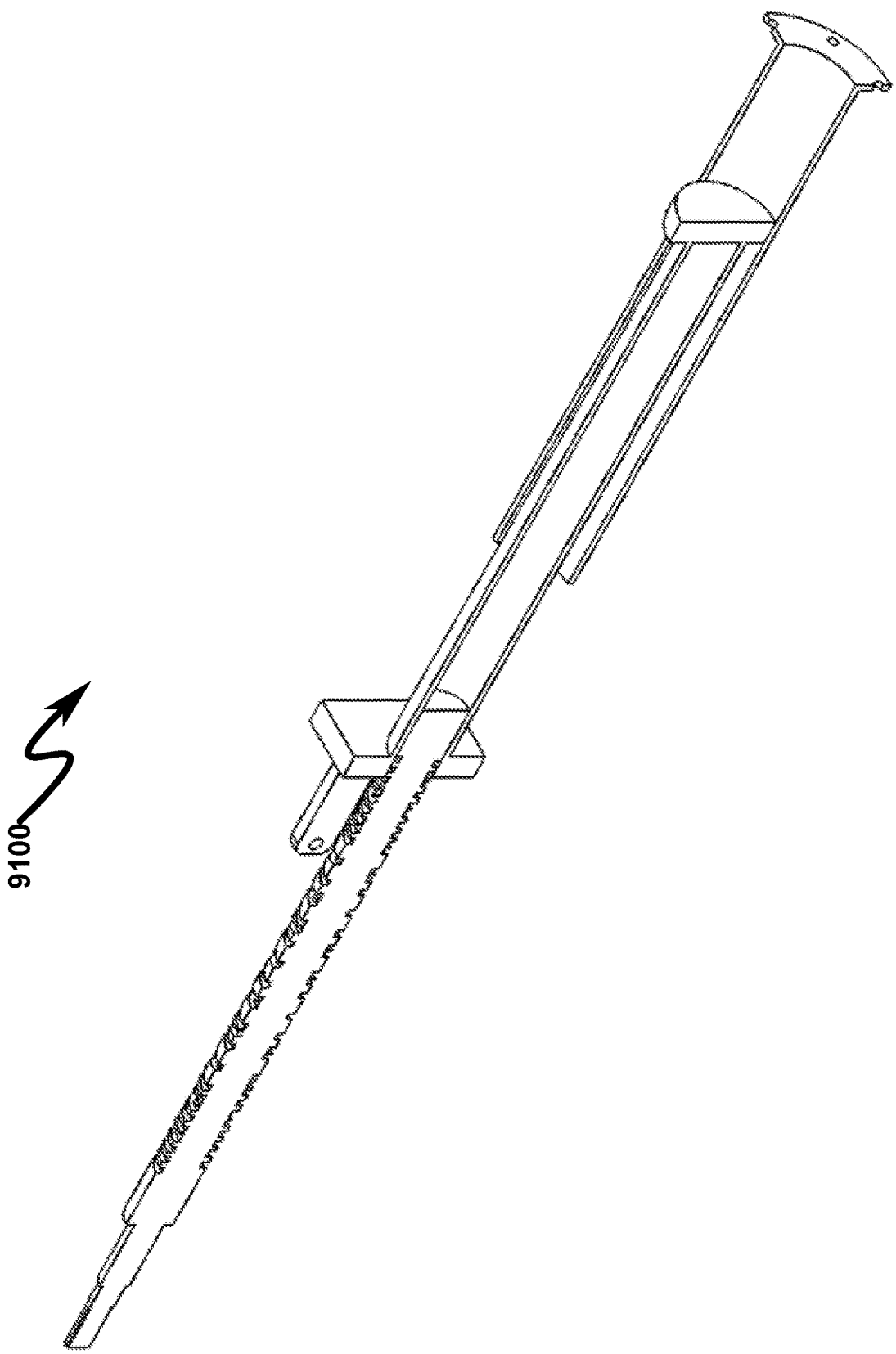
FIG. 91 illustrates a front section perspective view depicting a present invention auto-reversing driveshaft applied to a mechanical pumping system (isolation view of TDS, pump piston, and section of pump cylinder)
Figure 92:
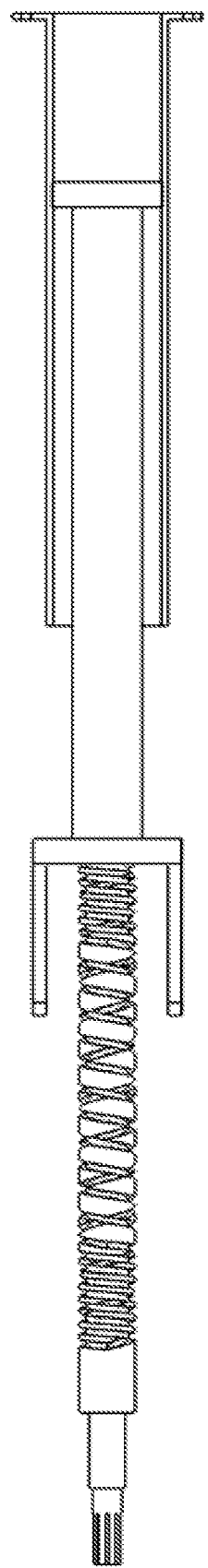
FIG. 92 illustrates a top view depicting a present invention auto-reversing driveshaft applied to a mechanical pumping system (isolation view of TDS, pump piston, and section of pump cylinder)
Figure 93:
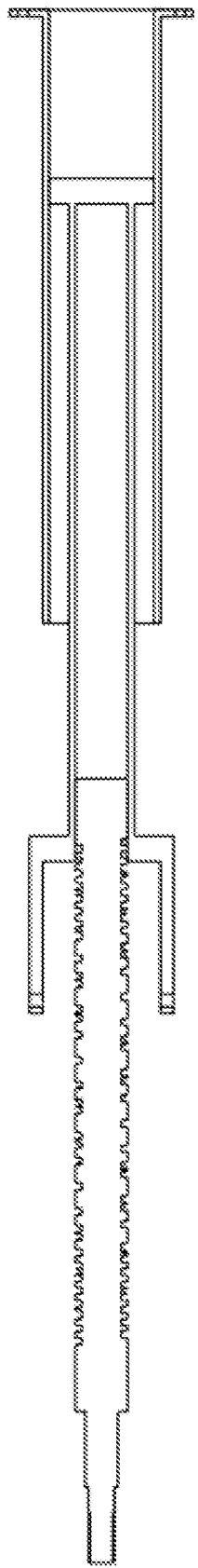
FIG. 93 illustrates a top section view depicting a present invention auto-reversing driveshaft applied to a mechanical pumping system (isolation view of TDS, pump piston, and section of pump cylinder)
Figure 94:
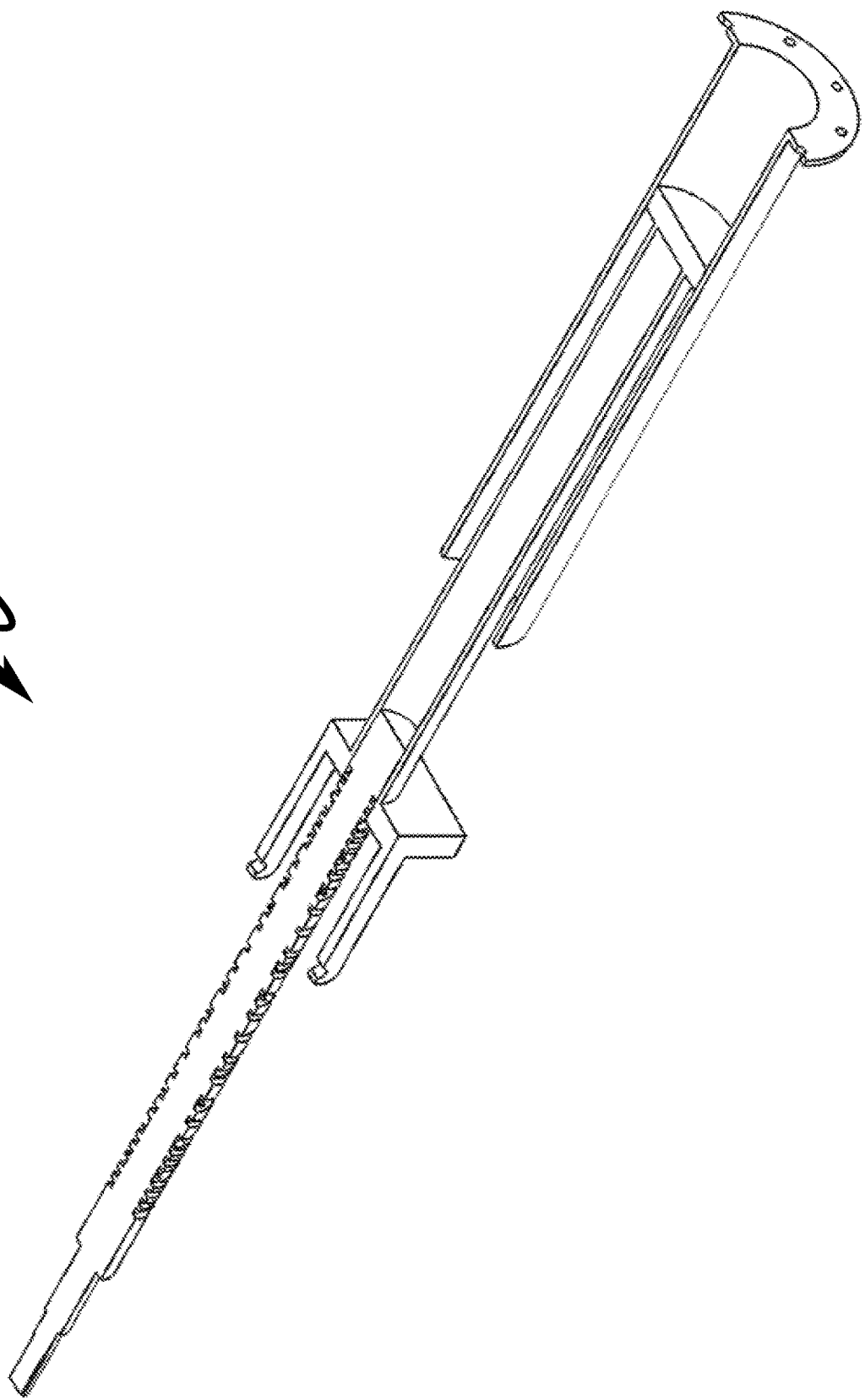
FIG. 94 illustrates a top section perspective view depicting a present invention auto-reversing driveshaft applied to a mechanical pumping system (isolation view of TDS, pump piston, and section of pump cylinder)

The present invention as applied to a generic pumping system is generally depicted in FIG. 81 (8100)-FIG. 94 (9400). The TDS (8101) in this instance is fixed and the MDP (8102) is mechanically coupled to the pump piston (8103) that rides within a pump cylinder housing (8104). FIG. 81 (8100)-FIG. 88 (8800) depict a typical pumping cycle showing neutral end positions and left and right transition regions in which the TDS may make transitions as to the longitudinal travel rate of the MDP (8102) and thus the pump piston (8103) within the pump cylinder housing (8104).

Previously Disclosed Driveshaft Configurations (9500)-(9600)

Previous patent applications have disclosed the driveshaft configuration depicted in FIG. 95 (9500)-FIG. 96 (9600) as it relates to a concrete pump system and method. The present invention anticipates that the AEC detailed herein in FIG. 81 (8100)-FIG. 94 (9400) may be equivalently substituted for the pumping system in these related applications. One skilled in the art will be able to easily migrate the teaching detailed herein to adapt existing driveshaft applications to the use of this new design. A discussion of the previously disclosed concrete pump is included below:

Threaded Driveshaft Operation. As generally depicted in FIG. 95 (9500)-FIG. 96 (9600), the present invention may in some preferred embodiments be applied to a pumping system using a threaded driveshaft (9501) to operate pump cylinder pistons (9502). In this embodiment, gear or chain driven threaded driveshafts (9501) incorporate an automatic reversing channel thread (9604, 9605) that retracts the pump rams (9502) at a faster rate than it extends the pump rams (9502). Within this context, a driveshaft engagement key (9603) rides within the right-handed (9604) and left-handed (9605) channels of the driveshaft (9601) to affect the extension and retraction cycles respectively.

As an operational example, assume a 1.00 thread per inch extension and a 1.25 thread per inch retraction pitch. A 40-inch long thread stroke would thus create one full extension in 40 revolutions and a full retraction in 32 revolutions. Using two units driven simultaneously results in a 4-inch simultaneous extension (pumping) at the beginning and end of every stroke. This varying pumping flow can also be accomplished using a variable thread pitch along the shaft on the extension stroke. For example, the first and last portion of the threaded shaft can be at a lesser TPI than the middle portion of the shaft. This would create pistons that stroke at different rates as they discharge simultaneously during the beginning and end of their strokes than in the middle when discharging singularly. The retraction TPI would still generally be at a faster rate to retract in about half the revolutions as compared to the extension cycle.

Preferred Embodiment System Summary

The present invention preferred exemplary system embodiment anticipates a wide variety of variations in the basic theme of construction, but can be generalized as an auto-reversing driveshaft system comprising:
(a) target driveshaft (TDS);
(b) dual drive pins (DDP); and
(c) axial engagement collar (AEC);
wherein:
the TDS comprises a first distal end (FDE) and a second distal end (SDE);
the TDS is threaded longitudinally with right-hand-threads (RHT) based on a selected forward traverse rate (FTR);
the TDS is threaded longitudinally with left-hand-threads (LHT) based on a selected reverse traverse rate (RTR);
the RHT and the LHT merge at the FDE and the SDE of the TDS
the TDS is engaged bi-axially with the DDP;
the DDP mechanically couples to the AEC; and
the AEC is configured to couple to a motion driver platform (MDP).

One skilled in the art will recognize that this system may be augmented or rearranged without limiting the teachings of the present invention. This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as an auto-reversing driveshaft method comprising:
(1) Determining a desired forward traverse rate (FTR) (6501);
(2) Determining a desired reverse traverse rate (RTR) (6502);
(3) Threading the target driveshaft (TDS) longitudinally with right-hand-threads (RHT) based on the desired FTR (6503);
(4) Threading the TDS longitudinally with left-hand-threads (LHT) based on the desired RTR (6504);
(5) Engaging the TDS bi-axially with dual drive pins (DDP) and an axial engagement collar (AEC) (6505); and
(6) Rotating the TDS to traverse the AEC bi-laterally along a longitudinal axis of the TDS axis or traversing the AEC bi-laterally along the longitudinal axis of the TDS to rotate the TDS (6506).

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:
An embodiment wherein the RHT and the LHT have different pitch values.
An embodiment wherein the RHT and/or the LHT have pitch values that vary along a longitudinal axis of said TDS.
An embodiment wherein the RHT and/or the LHT have pitch values that vary continuously along a longitudinal axis of said TDS.
An embodiment wherein the AEC is comprised of a first half-shell (FHS) and a second half-shell (SHS).
An embodiment wherein the AEC is comprised of a first half-shell (FHS) and a second half-shell (SHS), the FHS and the SHS being identical in construction.
An embodiment wherein the AEC is comprised of a first half-shell (FHS) and a second half-shell (SHS), the FHS and the SHS being mechanically coupled with one or more dovetail joints.
An embodiment wherein the DDP are each individually retained within the AEC a corresponding threaded plug cap (TPC).
An embodiment wherein the DDP are each individually coupled to a corresponding pin tension spring (PTS) within the AEC.
An embodiment wherein the DDP comprises one or more roller bearings configured to make contact with the TDS.
An embodiment wherein the DDP comprises a tapered wing configured to traverse the RHT and the LHT.
An embodiment wherein the AEC is mechanically coupled to a motion driver platform (MDP), the MDP selected from a group consisting of: level winder; mechanical pump; liquid pump; concrete pump; sludge pump; and thick material pump.

One skilled in the art will recognize that other embodiments are possible based on combinations of elements taught within the above invention description.

CONCLUSION

An auto-reversing driveshaft system/method configured to traverse in alternating longitudinal directions along a common driveshaft axis has been disclosed. The system utilizes right-hand-thread (RHT) and left-hand-thread (LHT) channels along a target driveshaft (TDS) to engage dual drive pins (DDP) that are mechanically linked to an axial engagement collar (AEC) mechanically coupled to a motion driver platform (MDP). The AEC may be configured as a two-piece symmetric collar (TSC) in which the DDP are individually retained. The RHT and LHT are configured to implement a selected forward traverse rate (FTR) and reverse traverse rate (RTR) respectively for the DDP and AEC along the longitudinal axis of the TDS. The FTR and RTR may vary along the longitudinal axis of the TDS. The system and method are particularly applicable to the implementation of level winders, pumps, and/or situations where variable longitudinal traversal rates along the TDS are desired.

Claims Interpretation

The following rules apply when interpreting the CLAIMS of the present invention:
The CLAIM PREAMBLE should be considered as limiting the scope of the claimed invention.
"WHEREIN" clauses should be considered as limiting the scope of the claimed invention.
"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. An auto-reversing driveshaft system comprising:
   (a) target driveshaft (TDS);
   (b) dual drive pins (DDP); and
   (c) axial engagement collar (AEC);
   wherein:
   said TDS comprises a first distal end (FDE) and a second distal end (SDE);
   said TDS is threaded longitudinally with right-hand-threads (RHT) based on a selected forward traverse rate (FTR);
   said TDS is threaded longitudinally with left-hand-threads (LHT) based on a selected reverse traverse rate (RTR);
   said RHT and said LHT merge at said FDE and said SDE of said TDS
   said TDS is engaged bi-axially with said DDP;
   said DDP mechanically couples to said AEC; and
   said AEC is configured to couple to a motion driver platform (MDP); wherein said AEC is comprised of a first half-shell (FHS) and a second half-shell (SHS), said FHS and said SHS being mechanically coupled with one or more dovetail joints.

2. The auto-reversing driveshaft system of claim 1 wherein said RHT and said LHT have different pitch values.

3. The auto-reversing driveshaft system of claim 1 wherein said RHT and/or said LHT have pitch values that vary along a longitudinal axis of said TDS.

4. The auto-reversing driveshaft system of claim 1 wherein said AEC is comprised of a first half-shell (FHS) and a second half-shell (SHS).

5. The auto-reversing driveshaft system of claim 1 wherein said DDP are each individually retained within said AEC a corresponding threaded plug cap (TPC).

6. The auto-reversing driveshaft system of claim 1 wherein said DDP are each individually coupled to a corresponding pin tension spring (PTS) within said AEC.

7. The auto-reversing driveshaft system of claim 1 wherein said DDP comprises one or more roller bearings configured to make contact with said TDS.

8. The auto-reversing driveshaft system of claim 1 wherein said DDP comprises a tapered wing configured to traverse said RHT and said LHT.

9. The auto-reversing driveshaft system of claim 1 wherein said AEC is mechanically coupled to a motion driver platform (MDP), said MDP selected from a group consisting of: level winder; mechanical pump; liquid pump; concrete pump; sludge pump; and thick material pump.

10. An auto-reversing driveshaft method comprising:
    (1) Determining a desired forward traverse rate (FTR) (6501);
    (2) Determining a desired reverse traverse rate (RTR) (6502);
    (3) Threading a target driveshaft (TDS) longitudinally with right-hand-threads (RHT) based on said FTR (6503);
    (4) Threading said TDS longitudinally with left-hand-threads (LHT) based on said RTR (6504);
    (5) Engaging said TDS bi-axially with dual drive pins (DDP) and an axial engagement collar (AEC) (6505); and
    (6) rotating said TDS to traverse said AEC bi-laterally along a longitudinal axis of said TDS axis or traversing said AEC bi-laterally along said longitudinal axis of said TDS to rotate said TDS (6506); wherein said AEC is comprised of a first half-shell (FHS) and a second half-shell (SHS), said FHS and said SHS being mechanically coupled with one or more dovetail joints.

11. The auto-reversing driveshaft method of claim 10 wherein said RHT and said LHT have different pitch values.

12. The auto-reversing driveshaft method of claim 10 wherein said RHT and/or said LHT have pitch values that vary along a longitudinal axis of said TDS.

13. The auto-reversing driveshaft method of claim 10 wherein said AEC is comprised of a first half-shell (FHS) and a second half-shell (SHS).

14. The auto-reversing driveshaft method of claim 10 wherein said DDP are each individually retained within said AEC a corresponding threaded plug cap (TPC).

15. The auto-reversing driveshaft method of claim 10 wherein said DDP are each individually coupled to a corresponding pin tension spring (PTS) within said AEC.

16. The auto-reversing driveshaft method of claim 10 wherein said DDP comprises one or more roller bearings configured to make contact with said TDS.

17. The auto-reversing driveshaft method of claim 10 wherein said DDP comprises a tapered wing configured to traverse said RHT and said LHT.

18. The auto-reversing driveshaft method of claim 10 wherein said AEC is mechanically coupled to a motion driver platform (MDP), said MDP selected from a group consisting of: level winder; mechanical pump; liquid pump; concrete pump; sludge pump; and thick material pump.

\* \* \* \* \*